(12) United States Patent
Valenzuela Valdés et al.

(10) Patent No.: US 11,780,112 B2
(45) Date of Patent: Oct. 10, 2023

(54) BINDERS CONTAINING AN ALDEHYDE-BASED RESIN AND AN ISOCYANATE-BASED RESIN AND METHODS FOR MAKING COMPOSITE LIGNOCELLULOSE PRODUCTS THEREFROM

(71) Applicant: BAKELITE CHEMICALS LLC, Penarth (GB)

(72) Inventors: Juan José Joaquin Valenzuela Valdés, San Pedro de la Paz (CL); Ildolfo Alfonso Duran Retamal, Los Ángeles (CL); Carlos Roberto Maldonado Rodríguez, Tome (CL); Bobby Lee Williamson, Conyers, GA (US)

(73) Assignee: BAKELITE CHEMICALS LLC

( * ) Notice: Subject to any disclaimer, the term of this patent is extended or adjusted under 35 U.S.C. 154(b) by 208 days.

(21) Appl. No.: 17/145,976

(22) Filed: Jan. 11, 2021

(65) Prior Publication Data
US 2021/0129375 A1 May 6, 2021

Related U.S. Application Data

(63) Continuation-in-part of application No. 16/302,245, filed as application No. PCT/US2017/034585 on May 25, 2017, now Pat. No. 10,889,716.

(60) Provisional application No. 62/341,717, filed on May 26, 2016.

(51) Int. Cl.
| | |
|---|---|
| B27N 1/02 | (2006.01) |
| C08L 97/02 | (2006.01) |
| C08K 5/21 | (2006.01) |
| C08K 3/22 | (2006.01) |
| C08L 61/32 | (2006.01) |
| C08L 61/14 | (2006.01) |
| C08G 8/26 | (2006.01) |
| C08G 18/76 | (2006.01) |

(52) U.S. Cl.
CPC ............ *B27N 1/0209* (2013.01); *C08G 8/26* (2013.01); *C08K 3/22* (2013.01); *C08K 5/21* (2013.01); *C08L 61/14* (2013.01); *C08L 61/32* (2013.01); *C08L 97/02* (2013.01); *C08G 18/7671* (2013.01); *C08L 2310/00* (2013.01)

(58) Field of Classification Search
CPC .................. C08L 97/02; C09J 175/04
See application file for complete search history.

(56) References Cited

U.S. PATENT DOCUMENTS

| | | |
|---|---|---|
| 3,267,188 A | 8/1966 | Bassett |
| 3,839,251 A | 10/1974 | Bornstein |
| 3,941,743 A | 3/1976 | Skubon |
| 3,965,056 A | 6/1976 | Stout |
| 4,179,427 A | 12/1979 | Gardikes |
| 4,209,433 A | 6/1980 | Use |
| 4,244,846 A | 1/1981 | Edler |
| 4,409,293 A | 10/1983 | Williams |
| 4,435,526 A | 3/1984 | Wooler |
| 4,590,229 A | 5/1986 | Gardikes |
| 4,602,069 A | 7/1986 | Dunnavant |
| 4,683,252 A | 7/1987 | Dunnavant |
| 4,778,530 A | 10/1988 | Ayers |
| 4,915,766 A | 4/1990 | Baxter |
| 4,961,795 A | 10/1990 | Detlefsen |
| 4,992,519 A | 2/1991 | Mukherjee |
| 5,011,886 A * | 4/1991 | Buschfeld ............... C08G 14/08 524/596 |
| 5,032,642 A | 7/1991 | Lemon et al. |
| 5,079,332 A | 1/1992 | Whittemore |
| 5,556,906 A | 9/1996 | Collins |
| 5,637,658 A | 6/1997 | Teodorczyk |
| 5,795,933 A | 8/1998 | Sharp et al. |
| 6,008,150 A | 12/1999 | Thyssen |
| 6,214,265 B1 | 4/2001 | Rosthauser |
| 6,294,117 B1 | 9/2001 | Rosthauser |
| 6,297,313 B1 | 10/2001 | Hsu |
| 6,416,696 B1 | 7/2002 | Miller |
| 6,641,761 B2 | 11/2003 | Rosthauser |
| 6,641,762 B2 | 11/2003 | Rosthauser |
| 7,642,306 B2 | 1/2010 | Charbonneau |

(Continued)

FOREIGN PATENT DOCUMENTS

| | | |
|---|---|---|
| EP | 0949309 A1 | 10/1999 |
| JP | S5763372 A | 4/1982 |

(Continued)

OTHER PUBLICATIONS

Dziurka et al. (DRVNA Industrija 61(4), 245-249, 2010) (Year: 2010).*
Turunen et al. (Journal of Applied Polymer Science, vol. 88, 582-588 (2003)) (Year: 2003).*
Lee et al. (Journal of Applied Polymer Science vol. 105, 1144-1155, 2007) (Year: 2007).*
Batubenga et al., "Isocyanate/Phenolics Wood Adhesives by Catalytic Acceleration of Copolymerization", Holzforschung, vol. 49 (1995) No. 1, p. 84.
BayerMaterial Science, MONDUR 541-Light, Polymeric MDI, Product Information, Dec. 2011, 2 pages.
He et al., "Effect of moisture content on curing kinetics of pMDI resin and wood mixtures", International Journal of Adhesion and Adhesives 25 (2005), pp. 450-455.

(Continued)

*Primary Examiner* — Liam J Heincer
(74) *Attorney, Agent, or Firm* — Edmonds & Cmaidalka, P.C.

(57) ABSTRACT

Binders, methods for making same, and methods for making composite lignocellulose products therefrom. The binder can include about 30 wt % to about 40 wt % of solids that include a urea-modified aldehyde-based resin; about 0.1 wt % to about 3 wt % of solids that include an isocyanate-based resin; about 0.1 wt % to about 12 wt % of an extender; and about 50 wt % to about 62 wt % of water, where all weight percent values are based on a total weight of the binder. The binder can have a sodium hydroxide equivalent weight alkalinity of about 3 wt % to about 9 wt %.

16 Claims, No Drawings

(56) References Cited

U.S. PATENT DOCUMENTS

| | | |
|---|---|---|
| 8,293,821 B1 | 10/2012 | Tillman |
| 9,169,385 B2 | 10/2015 | Baxter |
| 9,683,139 B1 | 6/2017 | Tillman |
| 10,273,388 B1 | 4/2019 | Tillman |
| 2001/0006266 A1 | 7/2001 | Rosthauser |
| 2003/0203998 A1 | 10/2003 | Gres |
| 2003/0205330 A1 | 11/2003 | Foucht |
| 2004/0082713 A1 | 4/2004 | Tutin et al. |
| 2006/0009569 A1 | 1/2006 | Charbonneau |
| 2006/0019024 A1 | 1/2006 | Freeman |
| 2006/0130897 A1 | 6/2006 | Georgeson |
| 2006/0138709 A1 | 6/2006 | Mbachu |
| 2010/0171233 A1 | 7/2010 | Baxter |
| 2010/0273917 A1 | 10/2010 | Breyer |
| 2011/0151180 A1 | 6/2011 | Haupt |
| 2012/0183723 A1 | 7/2012 | Srinivasan |
| 2013/0015262 A1 | 1/2013 | Monchamp |
| 2013/0292863 A1 | 11/2013 | Shoemake |
| 2013/0295319 A1 | 11/2013 | Yeager |
| 2016/0002462 A1 | 1/2016 | Zhang |
| 2016/0096985 A1* | 4/2016 | Knight ................ C09J 197/005 428/355 CP |
| 2017/0021525 A1 | 1/2017 | WeinkÖtz |
| 2019/0153274 A1 | 5/2019 | Markesinis |
| 2019/0270887 A1* | 9/2019 | Valenzuela Valdés ... C08J 3/226 |

FOREIGN PATENT DOCUMENTS

| | | |
|---|---|---|
| JP | S5773062 A | 5/1982 |
| JP | 2001131520 A | 5/2001 |
| JP | 2001254065 A | 9/2001 |
| JP | 2001254066 A | 9/2001 |
| JP | 2001279214 A | 10/2001 |
| JP | 2005075938 | 3/2005 |
| JP | 2006273899 | 10/2006 |
| WO | 2010056213 A1 | 5/2010 |
| WO | 2013049499 A1 | 4/2013 |

OTHER PUBLICATIONS

International Preliminary Report on Patentability for PCT application No. PCT/US2017/034585, dated Nov. 27, 2018, 7 pages.

Pizzi et al., "Non-Emulsifiable, Water-Based, Mixed Diisocyanate Adhesive Systems for Exterior Plywood", Part I, Holzforschung, vol. 46 (1992) No. 6, pp. 541-547.

Pizzi et al., "Non-Emulsifiable, Water-Based, Mixed Diisocyanate Adhesive Systems for Exterior Plywood", Part II, Holzforschung, vol. 47 (1993) No. 1, pp. 68-71.

Riedlinger, "Characterization of PF Resol/Isocyanate Hybrid Adhesives", Master of Science Thesis, Virginia Polytechnic Institute and State University, Feb. 1, 2008, 144 pages.

Search Report dated Aug. 16, 2017 for Application No. PCT/US2017/034585.

Search Report dated Sep. 17, 2013 for Application No. PCT/US2013/039278.

Search Report dated Sep. 25, 2013 for Application No. PCT/US2013/039271.

Search Report dated Sep. 27, 2013 for Application No. PCT/US2013/039268.

Seller, Jr. et al. "Tool wear properties of five extender/fillers in adhesive mixes for plywood", Forest Products Journal, 55 (3), pp. 27-31, Mar. 2005, (Year 2005).

Simon et al., "UF/pMDI Wood Adhesives: Networks Blend versus Copolymerization", Holzforschung, vol. 56 (2002) No. 3, pp. 327-334.

Zheng, "Studies of PF Resol/Isocyanate Hybrid Adhesives", Doctor of Philosophy Dissertation, Virginia Polytechnic Institute and State University, Dec. 17, 2002, 213 pages.

* cited by examiner

BINDERS CONTAINING AN ALDEHYDE-BASED RESIN AND AN ISOCYANATE-BASED RESIN AND METHODS FOR MAKING COMPOSITE LIGNOCELLULOSE PRODUCTS THEREFROM

CROSS-REFERENCE TO RELATED APPLICATION

This application is a continuation-in-part of co-pending U.S. patent application Ser. No. 16/302,245, filed on Nov. 16, 2018, which is a National Stage application under 35 U.S.C. § 371 of PCT/US2017/034585, filed on May 25, 2017, and published as WO 2017/205698, which claims priority to U.S. Provisional Patent Application No. 62/341,717, filed on May 26, 2016, which are all incorporated by reference herein.

FIELD

Embodiments described generally relate to binders, resinated furnishes, and methods for making composite products. More particularly, such embodiments relate to binders containing an aldehyde-based resin, e.g., a urea-modified aldehyde-based resin, and an isocyanate-based resin, resinated furnishes containing such binders, methods for making such binders, and methods for making composite lignocellulose products therefrom.

BACKGROUND

Binders are used in the production of composite lignocellulose products to bond lignocellulose substrates to one another. Typical composite lignocellulose products are plywood, oriented strand board (OSB), particleboard, and fiberboard that are made from discrete sheets, veneers, particulates, fibers, or other lignocellulose materials bonded together using a binder composition.

Lignocellulose substrates have a moisture content and if the moisture content of the lignocellulose substrates is too high, the adhesion between the substrates is compromised and failure of the resulting composite product is eminent. Accordingly, the lignocellulose substrates used to form composite lignocellulose products are typically dried to have a moisture content of less than 9 wt %, prior to combining with a binder composition.

The pot life of the binder also affects the quality and reliability of the resulting composite lignocellulose product. The pot life of the binder refers to the time required for the binder to cure. Typical binders have a pot life from a few minutes to up to about two to three hours. Thereafter, the viscosity of the binder is generally too high to apply and/or adhere to the lignocellulose substrates. As such, binders with a short pot life require the frequent preparation of batches of binder because those binders must be used in a relatively short amount of time. Additionally, binders with a short pot life are more prone to being wasted if a process upset is encountered that prevents the binder from being used quickly enough.

There is a need, therefore, for improved binders for making composite lignocellulose products that have a relatively long pot life and that can be used with lignocellulose substrates having a water content of 10 wt % or more.

SUMMARY

Binders, resinated furnishes, and methods for making composite lignocellulose products therefrom are provided. In one or more embodiments, a binder for making composite lignocellulose products can include about 30 wt % to about 40 wt % of solids that include a urea-modified aldehyde-based resin; about 0.1 wt % to about 3 wt % of solids that include an isocyanate-based resin; about 0.1 wt % to about 12 wt % of an extender; and about 50 wt % to about 62 wt % of a liquid medium, where all weight percent values are based on a total weight of the binder. The binder can have a sodium hydroxide equivalent weight alkalinity of about 3 wt % to about 9 wt %.

In one or more embodiments, a method for making a composite product can include combining a plurality of lignocellulose substrates and a binder to produce a resinated furnish. The binder can include about 30 wt % to about 40 wt % of solids comprising a urea-modified aldehyde-based resin; about 0.1 wt % to about 3 wt % of solids that include an isocyanate-based resin; about 0.1 wt % to about 12 wt % of an extender; and about 50 wt % to about 62 wt % of a liquid medium, where all weight percent values are based on a total weight of the binder. The binder can have a sodium hydroxide equivalent weight alkalinity of about 3 wt % to about 9 wt %. The method can also include heating the resinated furnish to a temperature of about 60° C. to about 300° C. to at least partially cure the binder to produce a composite lignocellulose product.

In one or more embodiments, a method for making a binder can include contacting solids that can include a urea-modified aldehyde-based resin, an isocyanate-based resin, an extender, and a liquid medium to produce the binder. The binder can include about 30 wt % to about 40 wt % of solids that include the urea-modified aldehyde-based resin; about 0.1 wt % to about 3 wt % of solids that include the isocyanate-based resin; about 0.1 wt % to about 12 wt % of the extender; and about 50 wt % to about 62 wt % of the liquid medium, where all weight percent values are based on a total weight of the binder. The binder can have a sodium hydroxide equivalent weight alkalinity of about 3 wt % to about 9 wt %.

DETAILED DESCRIPTION

It has been surprisingly and unexpectedly discovered that a binder including solids that include one or more urea-modified aldehyde-based resins, solids that include one or more isocyanate-based resins, one or more extenders, and a liquid medium, and optionally one or more fillers can have a viscosity of ≤10,000 cP, ≤6,000 cP, ≤3,500 cP, or ≤2,500 cP when maintained at a temperature of about 25° C. for at least the first 12 hours, at least 1 day, at least 2 days, or at least 3 days to about 5 days, about 10 days, about 15 days, about 20 days, about 25 days, about 30 days, or longer upon formation of the binder. The binder can have a sodium hydroxide equivalent weight alkalinity of about 3 wt % to about 9 wt %. In some embodiments, the binder can have a viscosity of about 200 cP to about 3,500 cP when maintained at a temperature of about 25° C. for at least 1 day, at least 3 days, at least 5 days, at least 10 days, at least 15 days, or at least 23 days after formation of the binder.

In some embodiments, one or more first base compounds can be mixed, blended, or otherwise combined with ingredients used to produce the urea-modified aldehyde-based resin. For example, if the urea-modified aldehyde-based resin is a phenol-formaldehyde resin, one or more base compounds can be combined with phenol, formaldehyde, and urea to produce a reaction mixture that can be reacted to produce the urea-modified aldehyde-based resin. During preparation of the binder, one or more second base compounds can be mixed, blended, or otherwise combined with the urea-modified aldehyde-based resin, the isocyanate-based resin, the one or more extenders, and the liquid medium to produce the binder. When the first base compound and/or the second base compound, if present, include one or more base compounds different from sodium hydroxide, the alkalinity content is proportionally equivalent on a molar weight basis. For example, to attain a 4% sodium hydroxide equivalent weight alkalinity content, 4 grams of sodium hydroxide in 100 grams of the binder is required, but 5.61 grams of potassium hydroxide in 100 grams of the binder are required to attain the same alkalinity content.

Without wishing to be bound by theory, it is believed that the urea-modified aldehyde-based resin can include free urea, mono-methylol urea, di-methylol urea, tri-methylol urea, and/or urea reacted into the aldehyde-based resin. In some embodiments, when the urea is reacted into the aldehyde-based resin, at least a portion of the urea in the urea-modified aldehyde-based resin can be covalently bonded with a carbon atom derived from the aldehyde during synthesis of the urea-modified aldehyde-based resin. Without wishing to be bound by theory, it is believed that additional stability of the binder in terms of viscosity, i.e., the viscosity of the binder increases at an acceptably slow rate over time, may be the result of the urea-modified aldehyde-based resin reacting or otherwise interacting or engaging in some manner with the isocyanate-based resin so that there is less or perhaps even no isocyanate-based resin available to react with water, alcohols, ethers, and/or organic solvents that can be present in the binder. Also, without wishing to be bound by theory, it is believed that the free urea, the mono-methylol urea, the di-methylol urea, and/or the tri-methylol urea may react with isocyanate functional groups of the isocyanate-based resin at a faster rate than water, alcohols, ethers, and/or organic solvents that can be present in the binder, thereby forming polyureas that have a relatively stable viscosity in the binder. The viscosity stability of the binder can provide many technical advantages in the manufacture of composite lignocellulose products.

One technical advantage of the binder described herein can be realized in the production of the binder because neither the urea-modified aldehyde-based resin, e.g., a urea-modified phenol-formaldehyde resin, nor the isocyanate-based resin, e.g., polymeric methylene diphenyl diisocyanate, need to be blocked or protected. As such, the additional steps required to block or protect the resins to reduce or prevent chemical reaction therebetween can be avoided. The unprotected or unblocked urea-modified aldehyde-based resin and/or the unprotected or unblocked isocyanate-based resin can be free or substantially free from any modification, e.g., chemical modification, which can be added to protect the functional groups in the respective resins. An example, of a protected phenol-formaldehyde resin can include the acylated phenol-formaldehyde resin discussed and described in U.S. Pat. No. 6,478,998. The aldehyde-based resin discussed and described herein can be a non-acylated aldehyde-based resin. In some embodiments, the urea-modified aldehyde-based resin and the isocyanate-based resin described herein can be free of or substantially free of any intentional chemical modification intended to protect or block the functional group(s) thereof. Said another way, the urea-modified aldehyde-based resin and the isocyanate-based resin described herein can be free or substantially free of any protected groups that can be deprotected under reactive conditions, e.g., heat, electromagnetic radiation, or other condition(s) that can cause or promote chemical reactions.

Another technical advantage of the binder discussed and described herein can be that the application of the binder, e.g., via spraying, brushing, spreading, coating, dipping, or otherwise contacting, to the lignocellulose substrates as a single homogeneous or substantially homogeneous binder. As such, the urea-modified aldehyde-based resin and the isocyanate-based resin do not need to be applied separately to the lignocellulose substrates, which can lead to a non-uniform distribution of the urea-modified aldehyde-based resin and/or the isocyanate-based about the lignocellulose substrates.

Another technical advantage can be that the binder can be sufficiently viscosity stable for an adequate length of time to allow large batches of the binder to be prepared and stored in tanks or other containers and used as needed during the manufacture of composite lignocellulose products.

The binder can include about 30 wt %, about 30.5 wt %, about 31 wt %, about 31.5 wt %, about 32 wt %, about 32.5 wt %, about 33 wt %, about 33.5 wt %, or about 34 wt % to about 35 wt %, about 35.5 wt %, about 36 wt %, about 36.5 wt %, about 37 wt %, about 37.5 wt %, about 38 wt %, about 38.5 wt %, about 39 wt %, about 39.5 wt %, or about 40 wt % of solids that include the urea-modified aldehyde-based resin, based on the total weight of the binder. The solids that include the urea-modified aldehyde-based resin include solids contributed by all components or ingredients used to produce the urea-modified aldehyde-based resin. For example, if the urea-modified aldehyde-based resin is a urea-modified phenol-formaldehyde resin, the solids that include the urea-modified phenol-formaldehyde resin include phenol, formaldehyde, urea, a first base compound, and any optional additional components or ingredients, e.g., a salt, that can be mixed, blended, or otherwise combined with one another and at least partially reacted to produce the urea-modified phenol-formaldehyde resin.

The binder can include about 0.1 wt %, about 0.3 wt %, about 0.5 wt %, about 0.7 wt %, or about 1 wt % to about 1.5 wt %, about 1.7 wt %, about 2 wt %, about 2.3 wt %, about 2.5 wt %, about 2.7 wt %, or about 3 wt % of solids that include the isocyanate-based resin, based on the total weight of the binder. The binder can include about 0.1 wt %, about 0.3 wt %, about 0.5 wt %, about 0.7 wt %, about 1 wt %, about 1.5 wt %, about 2 wt %, about 2.5 wt %, or about 3 wt % to about 5 wt %, about 6 wt %, about 7 wt %, about 8 wt %, about 9 wt %, about 10 wt %, about 11 wt %, about 12 wt %, about 13 wt %, about 14 wt %, or about 15 wt % of the extender, based on the total weight of the binder. The binder can also include about 45 wt %, about 47 wt %, about 50 wt %, about 52 wt %, or about 55 wt % to about 56 wt %, about 58 wt %, about 60 wt %, about 62 wt %, or about 64 wt % of a liquid medium, based on the total weight of the binder. In some embodiments, the binder can optionally include about 0.1 wt %, about 0.3 wt %, about 0.5 wt %, about 0.7 wt %, about 1 wt %, about 1.5 wt %, about 2 wt %, about 2.5 wt %, or about 3 wt % to about 5 wt %, about 6 wt %, about 7 wt %, about 8 wt %, about 9 wt %, about 10 wt %, about 11 wt %, about 12 wt %, about 13 wt %, about 14 wt %, or about 15 wt % of a filler, based on the total weight of the binder. In some embodiments, the binder can include about 30 wt % to about 40 wt % of solids that include the urea-modified aldehyde-based resin, about 0.1 wt % to about 3 wt % of solids that include the isocyanate-based resin, about 0.1 wt % to about 15 wt % of the extender, about 45 wt % to about 64 wt % of the liquid medium, and optionally, about 0.1 wt % to about 15 wt % of the filler, where all weight percent values are based on the total weight of the binder.

The binder can have a sodium hydroxide equivalent weight alkalinity of about 3 wt %, about 3.3 wt %, about 3.5 wt %, about 3.7 wt %, about 4 wt %, about 4.3 wt %, about 4.5 wt %, about 4.7 wt %, or about 5 wt % to about 6 wt %, about 6.3 wt %, about 6.5 wt %, about 6.7 wt %, about 7 wt %, about 7.3 wt %, about 7.5 wt %, about 7.7 wt %, about 8 wt %, about 8.3 wt %, about 8.5 wt %, about 8.7 wt %, or about 9 wt %. In some embodiments, the binder can have a sodium hydroxide equivalent weight alkalinity of at least 3 wt %, at least 3.3 wt %, at least 3.5 wt %, at least 3.7 wt %, at least 4 wt %, at least 4.3 wt %, at least 4.5 wt %, at least 4.7 wt %, at least 5 wt %, at least 5.3 wt % or at least 5.5 wt % to less than 9 wt %, less than 8.5 wt %, less than 8 wt %, less than 7.5 wt %, or less than 7 wt %.

The binder can include about 0.1 wt %, about 0.5 wt %, about 1 wt %, about 1.5 wt %, about 2 wt %, about 2.5 wt %, about 3 wt %, about 3.5 wt %, or about 4 wt % to about 6 wt %, about 6.5 wt %, about 7 wt %, about 7.5 wt %, about 8 wt %, about 8.5 wt %, about 9 wt %, about 9.3 wt %, or about 9.5 wt % of urea, whether the urea be in the form of free urea, mono-methylol urea, di-methylol urea (symmetrical and/or asymmetrical), tri-methylol urea, urea reacted into the aldehyde-based resin, or any combination thereof, based on the total weight of the binder. In some embodiments, the binder can include about 30 wt % to about 40 wt % of solids that include the urea-modified aldehyde-based resin, about 0.1 wt % to about 3 wt % of solids that include the isocyanate-based resin, about 0.1 wt % to about 15 wt % of the extender, about 45 wt % to about 64 wt % of the liquid medium, about 0.1 wt % to about 9.5 wt % of urea, whether the urea be in the form of free urea, mono-methylol urea, di-methylol urea, tri-methylol urea, urea reacted into the aldehyde-based resin, or any combination thereof, and optionally, about 0.1 wt % to about 15 wt % of the filler, where all weight percent values are based on the total weight of the binder.

In some embodiments, the binder can have a percent of total mix solids of about 40 wt %, about 41 wt %, about 42 wt %, about 43 wt %, or about 44 wt % to about 44.5 wt %, about 45 wt %, about 46 wt %, about 47 wt %, or about 48 wt %, based on the total weight of the binder. The terms "percent of total mix solids" or "% Total Mix Solids" refer to the sum of all solids in the binder, such as solids contributed from the urea-modified aldehyde-based resin, the isocyanate-based resin, the extender, any second base compound, the optional filler, and any other optional components that can be included in the binder. In some embodiments, the binder can have a mix resin solids or MRS of about 27 wt %, about 28 wt %, about 29 wt %, about 30 wt %, about 31 wt %, about 32 wt %, or about 33 wt % to about 35 wt %, about 36 wt %, about 37 wt %, about 38 wt %, about 39 wt %, or about 40 wt %, based on the total weight of the binder. The terms "mix resin solids" and "MRS" refer to the total amount of solids contributed by the urea-modified aldehyde-based resin and the isocyanate-based resin. The MRS includes solids contributed by all components used to produce the urea-modified aldehyde-based resin. For example, if the urea-modified aldehyde-based resin includes a urea-modified phenol-formaldehyde resin, the MRS solids from the urea-modified phenol-formaldehyde resin include the phenol, the formaldehyde, the first base compound, the urea, and any optional additional compounds such as a salt that can be combined and at least partially reacted to produce the urea-modified phenol-formaldehyde resin.

In some embodiments, the binder can include about 71 wt % to about 99.7 wt % of at least one urea-modified aldehyde-based resin, about 0.3 wt % to about 29 wt % of at least one isocyanate-based resin, about 10 wt % to about 58 wt % of at least one extender, and about 145 wt % to about 230 wt % of liquid medium, where all weight percent values are based on a combined solids weight of the urea-modified aldehyde-based resin and the isocyanate-based resin. In some embodiments, the binder can include about 0.5 wt %, about 2 wt %, or about 4 wt % to about 6 wt %, about 8 wt %, or about 10 wt % of urea, mono-methylol urea, di-methylol urea, tri-methylol urea, urea reacted into the aldehyde-based resin, or any combination thereof, based on the combined solids weight of the urea-modified aldehyde-based resin and the isocyanate-based resin.

It has also been surprisingly and unexpectedly discovered that a plurality of lignocellulose substrates that have a water content of about 9 wt %, about 10 wt %, about 11 wt %, about 12 wt %, about 13 wt %, or about 14 wt % to about 16 wt %, about 20 wt %, about 30 wt %, or about 40 wt %, based on a dried weight of the lignocellulose substrates, can be bonded to one another with the binder described herein. Such binder can provide a composite product that is better than a comparative composite product made with the same lignocellulose substrates, but at a water content of less than 10 wt %, and with the same urea-modified aldehyde-based resin, but without the isocyanate-based resin. Accordingly, another significant technical advantage of the binder can be the manufacture of composite lignocellulose products from lignocellulose substrates having a relatively high moisture concentration that can be present when the binder is at least partially cured rather than having to remove the moisture from the lignocellulose substrates prior to application of the binder thereto. Significant time and energy savings can be realized by being able to manufacture composite lignocellulose products with lignocellulose substrates having a moisture or water content of at least 9 wt %, at least 10 wt %, at least 11 wt %, at least 12 wt %, at least 15 wt %, at least 18 wt %, or at least 20 wt % to about 40 wt %, based on the dried weight of the lignocellulose substrates.

The lignocellulose substrate(s) and the binder can be mixed, blended, or otherwise combined to produce a mixture or "resinated furnish". The binder in the resinated furnish can be at least partially cured. For example, the resinated furnish can be heated to at least partially cure the binder. The at least partially cured binder can adhere or otherwise bond the plurality of lignocellulose substrates to one another to provide a composite product. In some embodiments, the lignocellulose substrate can have a water content of 10 wt % to about 40 wt %, based on a dried weight of the lignocellulose substrate at the time the binder is combined therewith. In some embodiments, the lignocellulose substrate can have a water content of 10 wt % to about 40 wt % when or during the time the binder is at least partially cured. For example, if the binder is at least partially cured by heating the resinated furnish to a temperature of about 60° C. to about 300° C., the lignocellulose substrate can have a water content of 10 wt % to about 40 wt % when the resinated furnish is heated to a temperature of about 60° C. or more.

In some embodiments, the binder can have a viscosity of about 200 cP, about 700 cP, or about 1,000 cP to about 3,500 cP, about 5,000 cP, about 7,500 cP, or about 10,000 cP at a temperature of about 25° C. when combined with the plurality of lignocellulose substrates to produce the resinated furnish. In some embodiments, the binder can be combined with the plurality of lignocellulose substrates at least 1 hour, at least 2 hours, at least 3 hours, at least 6 hours, at least 12 hours, at least 18 hours, at least 24 hours, at least 30 hours, at least 36 hours, at least 42 hours, at least 48 hours, or longer after at least the urea-modified aldehyde-based resin, the isocyanate-based resin, the extender, the liquid medium, and, if present, any additional ingredients were combined to produce the binder. In other embodiments, the binder can be combined with the plurality of lignocellulose substrates about 1 day, about 2 days, about 3 days, about 4 days, about 5 days, about 6 days, or about 7 days to about 10 days, about 15 days, about 20 days, about 25 days, about 30 days, or longer after at least the urea-modified aldehyde-based resin, the isocyanate-based resin, the extender, the liquid medium, and, if present, any additional ingredients were combined to produce the binder. In some embodiments, the additional ingredients can be or can include, but are not limited to, one or more fillers, one or more surfactants, one or more salts, and/or other compounds discussed and described below.

The aldehyde-based resin can be or include, but is not limited to, one or more of: phenol-formaldehyde (PF) resin, phenol-urea-formaldehyde (PUF) resin, melamine-formaldehyde (MF) resin, melamine-urea-formaldehyde (MUF) resin, phenol-melamine-formaldehyde (PMF) resin, urea-formaldehyde (UF) resin, resorcinol-formaldehyde (RF) resin, phenol-resorcinol-formaldehyde (PRF) resin, copolymers thereof, isomers thereof, or any mixture thereof. In some embodiments, the aldehyde-based resin can include one or more phenol-formaldehyde resins, one or more urea-formaldehyde resins, one or more phenol-urea-formaldehyde resins, or any mixture thereof. For example, urea and a phenol-formaldehyde resin can be combined, phenol and a urea-formaldehyde resin can be combined, or phenol, urea, and formaldehyde can be combined to make a phenol-urea-formaldehyde resin. Suitable methods for synthesizing the urea-modified aldehyde-based resin can include both single step processes and multi-step or "programmed" processes such as a staged monomer/catalyst addition process. While batch operations are generally the standard, continuous processes can also be used.

The aldehyde compound in the urea-modified aldehyde-based resin can be or include one or more substituted aldehyde compounds, one or more unsubstituted aldehyde compounds, or any mixture thereof. Illustrative aldehyde compounds can include, but are not limited to, aldehydes having the chemical formula RCHO, where R is hydrogen or a hydrocarbyl group. Illustrative hydrocarbyl groups can include 1 carbon atom to about 8 carbon atoms. Suitable aldehyde compounds can also include the so-called masked aldehydes or aldehyde equivalents, such as acetals or hemiacetals. Specific aldehyde compounds can include, but are not limited to, formaldehyde, paraformaldehyde, cinnamaldehyde, tolualdehyde, acetaldehyde, propionaldehyde, butyraldehyde, furfural, benzaldehyde, retinaldehyde, glyoxal, malondialdehyde, succindialdehyde, glutaraldehyde, phthaldehyde, derivatives thereof, or any mixture thereof. Still other suitable formaldehyde compounds can include formaldehyde present in a prepolymer or precondensate, such as urea-formaldehyde condensate (UFC) or UF precondensate. In at least one embodiment, the aldehyde compound can be or include formaldehyde.

The phenolic compound, when used to produce the urea-modified aldehyde-based resin, can be or include phenol (also known as monohydroxybenzene), one or more substituted phenol compounds, or any combination or mixture thereof. Illustrative substituted phenol compounds can include, but are not limited to, alkyl-substituted phenols such as the cresols and xylenols; cycloalkyl-substituted phenols such as cyclohexyl phenol; alkenyl-substituted phenols; aryl-substituted phenols such as p-phenyl phenol; alkoxy-substituted phenols such as 3,5-dimethyoxyphenol; aryloxy phenols such as p-phenoxy phenol; halogen-substituted phenols such as p-chlorophenol, or any mixture thereof. Dihydric phenols such as catechol, resorcinol, hydroquinone, bisphenol A and bisphenol F also can also be used. In some embodiments, the phenolic compound can be or can include, but is not limited to, resorcinol, phenol, catechol, hydroquinone, pyrogallol, 5-methylresorcinol, 5-ethylresorcinol, 5-propylresorcinol, 4-methylresorcinol, 4-ethylresorcinol, 4-propylresorcinol, resorcinol monobenzoate, resorcinol monosinate, resorcinol diphenyl ether, resorcinol monomethyl ether, resorcinol monoacetate, resorcinol dimethyl ether, phloroglucinol, benzoylresorcinol, resorcinol rosinate, alkyl substituted resorcinol, aralkyl substituted resorcinol, 2-methylresorcinol, phloroglucinol, 1,2,4-benzenetriol, 3,5-dihydroxybenzaldehyde, 2,4-dihydroxybenzaldehyde, 4-ethylresorcinol, 2,5-dimethylresorcinol, 5-methylbenzene-1,2,3-triol, 3,5-dihydroxybenzyl alcohol, 2,4,6-trihydroxytoluene, 4-chlororesorcinol, 2',6'-dihydroxyacetophenone, 2',4'-dihydroxyacetophenone, 3',5'-dihydroxyacetophenone, 2,4,5-trihydroxybenzaldehyde, 2,3,4-trihydroxybenzaldehyde, 2,4,6-trihydroxybenzaldehyde, 3,5-dihydroxybenzoic acid, 2,4-dihydroxybenzoic acid, 2,6-dihydroxybenzoic acid, 1,3-dihydroxynaphthalene, 2',4'-dihydroxypropiophenone, 2',4'-dihydroxy-6'-methylacetophenone, 1-(2,6-dihydroxy-3-methylphenyl)ethanone, 3-methyl 3,5-dihydroxybenzoate, methyl 2,4-dihydroxybenzoate, gallacetophenone, 2,4-dihydroxy-3-methylbenzoic acid, 2,6-dihydroxy-4-methylbenzoic acid, methyl 2,6-dihydroxybenzoate, 2-methyl-4-nitroresorcinol, 2,4,5-trihydroxybenzoic acid, 3,4,5-trihydroxybenzoic acid, 2,3,4-trihydroxybenzoic acid, 2,4,6-trihydroxybenzoic acid, 2-nitrophloroglucinol, or any mixture thereof. In at least one embodiment, the urea-modified aldehyde-based resin can be or include phenol, resorcinol, or a mixture thereof.

The urea component of the urea-modified aldehyde-based resin can be provided in many forms. For example, solid urea, such as prill, and/or urea solutions, typically aqueous solutions, are commonly available. Further, the urea component can be combined with another moiety, for example, formaldehyde and/or urea-formaldehyde adducts, often in aqueous solution. Any form of urea or urea in combination with formaldehyde (or other aldehyde(s)) can be used to make the urea-modified aldehyde-based resin. Both urea prill and combined urea-aldehyde products can be used. Illustrative urea-formaldehyde products can include, but are not limited to, Urea Formaldehyde (UFC). These types of products can include those described in U.S. Pat. Nos. 5,362,842 and 5,389,716, for example.

The urea-modified aldehyde-based resin can be a thermosetting resin. For example, if the urea-modified aldehyde-based resin includes a phenol-formaldehyde resin, the phenol-formaldehyde resin can be a phenol-formaldehyde resole resin having a molar ratio of formaldehyde to phenol of 1 or greater. The urea-modified aldehyde-based resin can be a thermoplastic resin. For example, if the urea-modified aldehyde-based resin includes a phenol-formaldehyde resin, the phenol-formaldehyde resin can be a phenol-formaldehyde novolac resin having a molar ratio of formaldehyde to phenol of less than 1. Phenol-formaldehyde resins that can be used to make the binder can include a phenol-formaldehyde resin, such as GPR 5815, GPR 5814, GPR 5812, and/or GPR 5772 resins, which are commercially available from Georgia-Pacific Chemicals LLC in South America, a phenol-formaldehyde resin powder, such as WOODWELD® 190C42 spray-dried OSB adhesive, commercially available from Georgia-Pacific Chemicals LLC, or a mixture thereof.

Considering phenolic-aldehyde resole resins in particular, a molar ratio of the aldehyde compound to the phenolic compound in the phenolic-aldehyde resole resin can be about 1.05:1, about 1.1:1, about 1.2:1, about 1.4:1, about 1.6:1, about 1.8:1, or about 2:1 to about 1.2:1, about 2.5:1, about 2.7:1, about 3:1, about 3.5:1, or about 4:1. In some embodiments, the molar ratio of the aldehyde compound to the phenolic compound in the phenolic-aldehyde resole resin can be about 1.5:1 to about 3:1, about 1.9:1 to about 2.6:1, about 2:1 to about 2.5:1, about 2.1:1 to about 2.6:1, about 2.2:1 to about 2.5:1, or about 2.3:1 to about 2.5:1. In some embodiments, the urea-modified aldehyde-based resin can be or can include a phenol-formaldehyde resin having a formaldehyde to phenol molar ratio of about 1.05:1, about 1.1:1, about 1.2:1, about 1.4:1, about 1.6:1, about 1.8:1, about 1.9:1, about 2:1, about 2.1:1, or about 2.2:1 to about 2.3:1, about 2.4:1, about 2.5:1, about 2.6:1, about 2.7:1, about 3:1, about 3.5:1, or about 4:1.

Considering phenolic-urea-aldehyde resins in particular, a molar ratio of the aldehyde compound to the phenolic compound in the phenol-urea-aldehyde resin can be about 1.05:1, about 1.1:1, about 1.2:1, about 1.4:1, about 1.6:1, about 1.8:1, or about 2:1 to about 1.2:1, about 2.5:1, about 2.7:1, about 3:1, about 3.5:1, or about 4:1. In some embodiments, the molar ratio of the aldehyde compound to the phenolic compound in the phenol-urea-aldehyde resin can be about 1.5:1 to about 3:1, about 1.9:1 to about 2.6:1, about 2:1 to about 2.5:1, about 2.1:1 to about 2.6:1, about 2.2:1 to about 2.5:1, or about 2.3:1 to about 2.5:1. In some embodiments, the urea-modified aldehyde-based resin can be or can include a phenol-urea-formaldehyde resin having a formaldehyde to phenol molar ratio of about 1.2:1, about 1.4:1, about 1.6:1, about 1.8:1, about 1.9:1, about 2:1, about 2.1:1, or about 2.2:1 to about 2.3:1, about 2.4:1, about 2.5:1, about 2.6:1, about 2.7:1, about 3:1, about 3.5:1, or about 4:1. In some embodiments, the phenol-urea-aldehyde resin can have a formaldehyde to urea molar ratio of about 3.7:1, about 3.9:1, about 4:1, about 4.5:1, or about 5:1 to about 7:1, about 8.5:1, about 20:1, about 40:1, about 60:1, about 73.5:1, about 100:1, about 120:1, about 130:1, about 140:1, about 147:1, or about 150:1. In some embodiments, the phenol-urea-aldehyde resin can have a phenol to urea molar ratio of about 1.5:1, about 1.7:1, about 2:1, or about 3:1 to about 3.8:1, about 10:1, about 40:1, about 50:1, about 65.4:1, about 100:1, about 125:1, about 150:1, or about 163.4:1.

In some embodiments, the binder can include about 0.1 wt %, about 0.5 wt %, about 1 wt %, about 1.5 wt %, about 2 wt %, about 2.5 wt %, about 3 wt %, about 3.5 wt %, or about 4 wt % to about 6 wt %, about 6.5 wt %, about 7 wt %, about 7.5 wt %, about 8 wt %, about 8.5 wt %, about 9 wt %, about 9.3 wt %, or about 9.5 wt % of urea, whether the urea is in the form of free urea, mono-methylol urea, di-methylol urea, tri-methylol urea, urea reacted into the aldehyde-based resin, or any mixture thereof, based on the total weight of the binder. In some embodiments, the urea-modified aldehyde-based resin can include at least 0.5 wt %, at least 1 wt %, at least 1.5 wt %, at least 2 wt %, at least 2.5 wt %, at least 3 wt %, at least 3.5 wt %, at least 4 wt %, at least 4.5 wt %, at least 5 wt %, at least 6 wt %, at least 6.5 wt %, at least 7 wt %, at least 7.5 wt %, or at least 8 wt % of urea, whether the urea is in the form of free urea, mono-methylol urea, di-methylol urea, tri-methylol urea, urea reacted into the aldehyde-based resin, or any mixture thereof, based on the total weight of the urea-modified aldehyde-based resin. In some embodiments, the urea-modified aldehyde-based resin, on a solids basis, can include about 3.5 wt %, about 4 wt %, about 4.5 wt %, about 5 wt %, about 7 wt %, about 10 wt %, or about 12 wt % to about 15 wt %, about 16 wt %, about 17 wt %, about 18 wt %, about 19 wt %, about 20 wt %, about 23 wt %, or about 27 wt % of urea, whether the urea is in the form of free urea, mono-methylol urea, di-methylol urea, tri-methylol urea, urea reacted into the aldehyde-based resin, or any mixture thereof. In some embodiments, the urea-modified aldehyde-based resin can include about 0.1 wt %, about 0.5 wt %, about 2 wt %, or about 4 wt % to about 6 wt %, about 8 wt %, or about 10 wt % of urea, whether the urea is in the form of free urea, mono-methylol urea, di-methylol urea, tri-methylol urea, urea reacted into the aldehyde-based resin, or any combination thereof, based on a combined solids weight of the urea-modified aldehyde-based resin and the isocyanate-based resin.

In some embodiments, the urea-modified aldehyde-based resin can include a mixture of at least one of: a phenol-formaldehyde resin, a urea-formaldehyde resin, a phenol-urea-formaldehyde resin, a melamine-formaldehyde resin, a melamine-urea-formaldehyde resin, a phenol-melamine-formaldehyde resin, a resorcinol-formaldehyde resin, and a phenol-resorcinol-formaldehyde resin, and at least one of free urea, mono-methylol urea, di-methylol urea, and tri-methylol urea. In some embodiments, the urea-modified aldehyde-based resin can be or can include a phenol-urea-formaldehyde resin. In some embodiments, all or at least a portion of the urea in the urea-modified aldehyde-based resin can be covalently bonded with a carbon atom derived from the aldehyde during synthesis of the urea-modified aldehyde-based resin, e.g., a phenol-urea-formaldehyde resin. As such, in some embodiments, at least a portion of the urea in the urea-modified aldehyde-based resin can be covalently bonded with a carbon atom derived from the aldehyde during synthesis of the urea-modified aldehyde-based resin, e.g., a phenol-urea-formaldehyde resin, and the urea-modified aldehyde-based resin can also include at least one of free urea, mono-methylol urea, di-methylol urea, and tri-methylol urea.

The first and second base compounds can independently be or can independently include, but are not limited to, one or more hydroxides, one or more carbonates, ammonia, one or more amines, one or more borates, or any mixture thereof. Illustrative hydroxides can include, but are not limited to, sodium hydroxide, potassium hydroxide, ammonium hydroxide (e.g., aqueous ammonia), lithium hydroxide, calcium hydroxide, and cesium hydroxide. Illustrative carbonates can be or include, but are not limited to, sodium carbonate, sodium bicarbonate, potassium carbonate, calcium carbonate, and ammonium carbonate. Illustrative amines can include, but are not limited to, trimethylamine, triethylamine, triethanolamine, diisopropylethylamine (Hunig's base), pyridine, 4-dimethylaminopyridine (DMAP), and 1,4-diazabicyclo[2.2.2]octane (DABCO). Illustrative borates can include, but are not limited to, sodium borate, potassium borate, calcium borate, and zinc borate. The alkaline reagent can be used to adjust the pH of the binder.

In some embodiments, the binder can include about 3 wt %, about 3.5 wt %, about 4 wt %, about 4.5 wt %, about 5 wt %, or about 5.5 wt % to about 6 wt %, about 6.5 wt %, about 7 wt %, about 7.5 wt %, about 8 wt %, about 8.5 wt %, or about 9 wt % of the base compound(s), i.e., any first base compound and any second base compound, based on the total weight of the binder. In some embodiments, the urea-modified aldehyde-based resin can include about 0.05 wt %, about 0.1 wt %, about 0.3 wt %, about 0.5 wt %, about 0.7 wt %, about 1 wt %, about 2 wt %, or about 2.5 wt % to about 3 wt %, about 3.5 wt %, about 4 wt %, about 4.5 wt %, about 4.8 wt %, about 5 wt %, about 6 wt %, or about 8 wt % of the first base compound, based on the combined solids weight of the urea-modified aldehyde-based resin and the isocyanate-based resin. In other embodiments, the binder can include the base compound(s), i.e., any first base compound and any second base compound, in an amount of about 0.5 wt % to about 8 wt %, about 0.5 wt % to about 6 wt %, about 0.5 wt % to about 5 wt %, about 0.5 wt % to about 4 wt %, about 0.5 wt % to about 3.5 wt %, about 0.5 wt % to about 3 wt %, about 1 wt % to about 8 wt %, about 1 wt % to about 6 wt %, about 1 wt % to about 5 wt %, about 1 wt % to about 4 wt %, about 1 wt % to about 3.5 wt %, about 1 wt % to about 3 wt %, about 2 wt % to about 8 wt %, about 2 wt % to about 6 wt %, about 2 wt % to about 5 wt %, about 2 wt % to about 4 wt %, about 2 wt % to about 3.5 wt %, about 2 wt % to about 3 wt %, about 2.5 wt % to about 8 wt %, about 2.5 wt % to about 6 wt %, about 2.5 wt % to about 5 wt %, about 2.5 wt % to about 4 wt %, about 2.5 wt % to about 3.5 wt %, or about 2.5 wt % to about 3 wt %, based on the combined solids weight of the urea-modified aldehyde-based resin and the isocyanate-based resin.

In some embodiments, the urea-modified aldehyde-based resin can be in the form of a solution, dispersion, suspension, or other mixture. For example, the urea-modified aldehyde-based resin can include water, alcohol(s), ether(s), and/or other organic solvents. In some embodiment, the urea-modified aldehyde-based resin, if in the form of a solution, dispersion, suspension, or other mixture, can have a solids content of about 20 wt %, about 25 wt %, about 30 wt %, about 35 wt %, or about 40 wt % to about 45 wt %, about 50 wt %, about 55 wt %, about 60 wt %, about 70 wt %, about 80 wt %, about 90 wt %, or about 95 wt %, based on a total weight of the urea-modified aldehyde-based resin. In other embodiments, the urea-modified aldehyde-based resin can have a solids content of about 35 wt % to about 55 wt %, about 40 wt % to about 50 wt %, about 41 wt % to about 47 wt %, about 42 wt % to about 46 wt %, or about 43 wt % to about 45 wt %, based on a total weight of the urea-modified aldehyde-based resin.

As used herein, the terms "solids weight", "solids concentration", and "solids content" of a liquid solution, dispersion, suspension, or other mixture, e.g., an aqueous urea-modified aldehyde-based resin, as understood by those skilled in the art, can be measured by determining the weight loss upon heating about 1 gram of the mixture to a temperature of about 125° C. for a time period of about 1 hour and 45 minutes in triplicate and then then three results can be averaged together. By measuring the weight of the sample before and after heating, the percent solids in the sample can be directly calculated or otherwise estimated.

If the urea-modified aldehyde-based resin is mixed, blended, or otherwise includes any water, alcohol, ether, and/or one or more other organic solvents, the amount of the urea-modified aldehyde-based resin in the binder is discussed in terms of the urea-modified aldehyde-based resins solids. For example, if 500 grams of an aqueous urea-modified aldehyde-based resin that contains about 43.5 wt % of urea-modified aldehyde-based resin solids is in a 1,000 gram sample of a binder, the 1,000 gram sample of binder would be said to contain about 21.75 wt % of solids that include the urea-modified aldehyde-based resin, based on a total weight of the binder.

The urea-modified aldehyde-based resin, when mixed with water, can form an aqueous solution, dispersion, suspension, or other mixture that can have a pH of about 7, about 8, about 9, or about 10 to about 11, about 12, or about 13 at a temperature of about 25° C. For example, a urea-modified aldehyde-based resin having a water content of about 40 wt % to about 70 wt % can form an aqueous solution, dispersion, suspension, or other mixture that can have a pH of about 8 to about 11, about 9 to about 10.5, about 9.5 to about 11.5, about 10 to about 12, about 10.5 to about 12.5, about 10.5 to about 11, about 10.6 to about 12, about 11 to about 12, or about 11.5 to about 12.5 at a temperature of about 25° C.

In some embodiments, the binder can include about 30 wt %, about 30.5 wt %, about 31 wt %, about 31.5 wt %, about 32 wt %, about 32.5 wt %, about 33 wt %, about 33.5 wt %, or about 34 wt % to about 35 wt %, about 35.5 wt %, about 36 wt %, about 36.5 wt %, about 37 wt %, about 37.5 wt %, about 38 wt %, about 38.5 wt %, about 39 wt %, about 39.5 wt %, or about 40 wt % of solids that include the urea-modified aldehyde-based resin, based on the total weight of the binder. In some embodiments, the binder can include about 0.1 wt %, about 0.5 wt %, about 1 wt %, about 1.5 wt %, about 2 wt %, about 2.5 wt %, about 3 wt %, about 3.5 wt %, or about 4 wt % to about 6 wt %, about 6.5 wt %, about 7 wt %, about 7.5 wt %, about 8 wt %, about 8.5 wt %, about 9 wt %, about 9.3 wt %, or about 9.5 wt % of any urea, i.e., free urea, any mono-methylol urea, any di-methylol urea, any tri-methylol urea, any urea reacted into the aldehyde-based resin, or any combination thereof, based on the total weight of the binder. In some embodiments, the binder can include the urea-modified aldehyde-based resin in an amount of about 70 wt %, about 73 wt %, about 75 wt %, about 77 wt %, about 79 wt %, about 81 wt %, about 83 wt %, or about 85 wt % to about 87 wt %, about 89 wt %, about 91 wt %, about 93 wt %, about 95 wt %, about 97 wt %, about 98.5 wt %, about 99.7 wt %, or greater, based on a combined solids weight of the urea-modified aldehyde-based resin and the isocyanate-based resin. In other embodiments, the binder can include the urea-modified aldehyde-based resin in an amount of at least 71 wt %, at least 74 wt %, at least 76 wt %, at least 78 wt %, at least 80 wt %, at least 82 wt %, or at least 84 wt % to about 90 wt %, about 91 wt %, about 92 wt %, about 93 wt %, about 94 wt %, about 95 wt %, about 96 wt %, about 97 wt %, about 98 wt %, about 98.5 wt %, about 99 wt %, about 99.5 wt %, about 99.7 wt %, or greater, based on a combined solids weight of the urea-modified aldehyde-based resin and the isocyanate-based resin.

The isocyanate-based resin can be or include, but is not limited to, one or more of: methylene diphenyl diisocyanate (MDI), polymeric methylene diphenyl diisocyanate (pMDI), emulsified polymer isocyanate (EPI), copolymers thereof, isomers thereof, or any mixture thereof. Illustrative MDI resins and pMDI resins can be or include any one or more isomers, such as 2,2'-methylene diphenyl diisocyanate (2,2'-MDI), 2,4'-methylene diphenyl diisocyanate (2,4'-MDI), 4,4'-methylene diphenyl diisocyanate (4,4'-MDI), or any mixture thereof. In some embodiments, the isocyanate-based resin can be or include pMDI, such as DESMODUR® 44V20L resin, commercially available from Covestro.

In some embodiments, the binder can include about 0.1 wt %, about 0.3 wt %, about 0.5 wt %, about 0.7 wt %, or about 1 wt % to about 1.5 wt %, about 1.7 wt %, about 2 wt %, about 2.3 wt %, about 2.5 wt %, about 2.7 wt %, or about 3 wt % of the isocyanate-based resin, based on the total weight of the binder. In some embodiments, the binder can include about 0.1 wt %, about 0.3 wt %, about 0.5 wt %, about 0.7 wt %, or about 1 wt % to about 1.5 wt %, about 1.7 wt %, about 2 wt %, about 2.3 wt %, about 2.5 wt %, about 2.7 wt %, or about 3 wt % of solids that include the isocyanate-based resin, based on the total weight of the binder. In some embodiments, the binder can include the isocyanate-based resin in an amount of about 0.3 wt %, about 0.5 wt %, about 1 wt %, about 1.5 wt %, about 2 wt %, about 3 wt %, about 4 wt %, about 5 wt %, about 6 wt %, about 7 wt %, about 8 wt %, or about 9 wt % to about 10 wt %, about 11 wt %, about 12 wt %, about 13 wt %, about 14 wt %, about 15 wt %, about 16 wt %, about 17 wt %, about 18 wt %, about 19 wt %, about 20 wt %, about 21 wt %, about 22 wt %, about 23 wt %, about 24 wt %, about 25 wt %, about 26 wt %, about 27 wt %, about 28 wt %, about 29 wt %, or about 30 wt %, based on the combined solids weight of the urea-modified aldehyde-based resin and the isocyanate-based resin. In other embodiments, the binder can include the isocyanate-based resin in an amount of about 0.3 wt %, about 0.5 wt %, about 1 wt %, about 1.5 wt %, about 2 wt %, about 3 wt %, about 4 wt %, about 5 wt %, about 6 wt %, about 7 wt %, about 8 wt %, about 9 wt %, about 10 wt %, about 11 wt %, or about 12 wt % to less than 15 wt %, less than 16 wt %, less than 17 wt %, less than 18 wt %, less than 19 wt %, less than 20 wt %, less than 21 wt %, less than 22 wt %, less than 23 wt %, less than 24 wt %, or less than 25 wt %, based on the combined solids weight of the urea-modified aldehyde-based resin and the isocyanate-based resin.

In other embodiments, the binder can include the isocyanate-based resin in an amount of about 0.5 wt %, about 1 wt %, about 2 wt %, about 3 wt %, about 4 wt %, about 5 wt %, or about 6 wt % to about 10 wt %, about 12 wt %, about 14 wt %, about 16 wt %, about 18 wt %, about 20 wt %, or about 22 wt %, based on the combined solids weight of the urea-modified aldehyde-based resin and the isocyanate-based resin. In other embodiments, the binder can include the isocyanate-based resin in an amount of about 0.3 wt % to about 28.3 wt %, about 0.5 wt % to about 25 wt %, about 1 wt % to about 22 wt %, about 1.5 wt % to about 20.7 wt %, about 3 wt % to about 15 wt %, about 3.3 wt % to about 14.6 wt %, about 1.5 wt % to about 10 wt %, about 7 wt % to about 13 wt %, or about 11 wt % to about 15 wt %, based on the combined solids weight of the urea-modified aldehyde-based resin and the isocyanate-based resin.

In some embodiments, the binder can include the urea-modified aldehyde-based resin in an amount of about 70 wt % to about 99.7 wt % and the isocyanate-based resin in an amount of about 0.3 wt % to about 30 wt %, based on the combined solids weight of the urea-modified aldehyde-based resin and the isocyanate-based resin. In other embodiments, the binder can include the urea-modified aldehyde-based resin in an amount of about 71.7 wt % to about 99.7 wt % and the isocyanate-based resin in an amount of about 0.3 wt % to about 28.3 wt %, based on the combined solids weight of the urea-modified aldehyde-based resin and the isocyanate-based resin. In other embodiments, the binder can include the urea-modified aldehyde-based resin in an amount of about 79.3 wt % to about 98.5 wt % and the isocyanate-based resin in an amount of about 1.5 wt % to about 20.7 wt %, based on the combined solids weight of the urea-modified aldehyde-based resin and the isocyanate-based resin. In other embodiments, the binder can include the urea-modified aldehyde-based resin in an amount of about 85.4 wt % to about 96.7 wt % and the isocyanate-based resin in an amount of about 3.3 wt % to about 14.6 wt %, based on the combined solids weight of the urea-modified aldehyde-based resin and the isocyanate-based resin.

Illustrative liquid mediums that the binder can include can be or can include, but are not limited to, water, one or more alcohols, one or more ethers, one or more other organic solvents, or any mixture thereof. In at least one embodiment, the liquid medium can be water. Illustrative alcohols can include, but are not limited to, methanol, ethanol, propanol, isopropanol, n-butanol, sec-butanol, isobutanol, tert-butanol, ethylene glycol, or any mixture thereof. Illustrative ethers can include, but are not limited to, dimethyl ether, diethyl ether, tetrahydrofuran, or any mixture thereof.

In some embodiments, if the binder, prior to curing, includes one or more liquid mediums (e.g., water), the binder can include about 45 wt %, about 47 wt %, about 50 wt %, about 52 wt %, or about 55 wt % to about 56 wt %, about 58 wt %, about 60 wt %, about 62 wt %, or about 64 wt % of the liquid medium, based on the total weight of the binder. In some embodiments, the binder can include about 145 wt %, about 150 wt %, about 155 wt %, about 160 wt %, about 165 wt %, about 170 wt %, about 175 wt %, or about 180 wt % to about 190 wt %, about 195 wt %, about 200 wt %, about 205 wt %, about 210 wt %, about 215 wt %, about 220 wt %, about 225 wt %, about 230 wt %, or greater of the liquid medium (e.g., water), based on the combined solids weight of the urea-modified aldehyde-based resin and the isocyanate-based resin. For example, the binder, prior to curing, can include one or more liquid mediums (e.g., water) in an amount of about 145 wt % to about to about 225 wt %, about 150 wt % to about 215 wt %, about 155 wt % to about 205 wt %, about 160 wt % to about 210 wt %, about 160 wt % to about 185 wt %, about 160 wt % to about 170 wt %, about 170 wt % to about 185 wt %, or about 165 wt % to about 175 wt %, based on the combined solids weight of the urea-modified aldehyde-based resin and the isocyanate-based resin.

As used herein, the term "extender" refers to materials that can be added to the binder that occupy volume and also contribute to bonding properties of the binder. One example of a suitable extender can be a material that includes one or more proteins. The protein can contribute to the crosslinking of the mixture during at least partial cure thereof. Suitable extenders can be or include, but are not limited to, one or more flours, spray dried blood, or any mixture thereof. Illustrative flours can be or include, but are not limited to, wheat flour, corn flour, soy flour, oat flour, other grain flours, nut or seed flour (e.g., almond, walnut, pecan, cashew, or peanut), millet flour, brands thereof, starches thereof, or any mixture thereof. In some embodiments, the extender can be or include corn flours or corn starches, such as NCS-83, NCS-74, and 4501 flours, commercially available from Didion Milling Company, Inc., Sun Prairie, Wis. In other embodiments, the extender can be or include wheat flours, wheat starches, and/or wheat derived protein-starch composition, such as Glu-X extender, commercially available from Siemer Milling Company, Teutopolis, Ill. Illustrative polysaccharides can include, but are not limited to, starch, cellulose, gums, such as guar and xanthan, alginates, pectin, gellan, or any mixture thereof. Suitable polysaccharide starches can include, for example maize or corn, native corn starch (NCS), waxy maize, high amylose maize, potato, tapioca, wheat starch, or any mixture thereof. Other starches, such as genetically engineered starches, can be or include high amylose potato starches, potato amylopectin starches, or any mixture thereof. In one or more embodiments, the extender can be or include one, two, or more grain flours. For example, the extender can be or include one or more corn flours, one or more wheat flours, a combination thereof, or a mixture thereof.

Illustrative soy flour can be or can include a raw soy protein and/or a soy protein modified as discussed and described in U.S. Pat. No. 6,497,760. Raw soy protein maybe in the form of ground whole beans (including the hulls, oil, protein, minerals, or other components), a meal (extracted or partially extracted), a flour (generally containing less than 1.5 wt % of oil and about 30 wt % to about 35 wt % of carbohydrate), or an isolate (a substantially pure protein flour containing less than 0.5% oil and less than 5% carbohydrate). Suitable soy protein can be derived from any source of soy protein such as soybean concentrate or soybean meal. Protein-rich soybean-derived flours, such as soy protein isolate, protein concentrate, and ordinary defatted soy flour, which contain about 20 wt % to about 95 wt % of protein, can also be used. The source of soy protein (soy flour) can be substantially free of functional urease. Information on soy protein can be found in, for example, Kirk-Othmer, Encyclopedia of Chemical Technology, Fourth Edition, Volume 22, pp. 591-619 (1997). Modified soy protein can be modified with either of two classes of modifiers. The first class of modifiers can include saturated and unsaturated $C_8$-$C_{22}$ sulfates and sulfonates, such as alkali metal salts. Illustrative modifiers in the first class can be or include, but are not limited to, sodium dodecyl sulfate, sodium dodecylbenzene sulfonate, salts thereof, hydrates thereof, or any mixture thereof. The second class of modifiers includes compounds having the chemical formula $R_2NC(=X)NR_2$, where each R group can independently be a hydrogen, a $C_1$-$C_4$ saturated hydrocarbyl group, or an $C_2$-$C_4$ unsaturated hydrocarbyl group; and X can be O, NH, or S. The $C_1$-$C_4$ saturated hydrocarbyl groups refer to alkyl groups (both straight and branched chain) and the $C_2$-$C_4$ unsaturated hydrocarbyl groups refer to alkenyl and alkynyl groups (both straight and branched chain). Illustrative modifiers in the second class can be or include, but are not limited to, urea, guanidine (e.g., guanidine hydrochloride), salts thereof, hydrates thereof, or any mixture thereof. Other suitable modifiers and/or extenders can include, but are not limited to, those discussed and described in U.S. Pat. Nos. 2,507,465; 2,492,510; 2,781,286; 3,285,805; 3,957,703; 4,070,314; 4,244,846; and 4,778,530.

In some embodiments, the binder can include the extender in an amount of about 0.1 wt %, about 0.5 wt %, about 1 wt %, about 2 wt %, about 3 wt %, about 4 wt %, or about 5 wt % to about 6 wt %, about 8 wt %, about 10 wt %, about 12 wt %, or about 15 wt %, based on the total weight of the binder. The binder can include about 8 wt %, about 10 wt %, about 15 wt %, about 20 wt %, about 25 wt %, about 30 wt %, or about 35 wt % to about 40 wt %, about 45 wt %, about 50 wt %, about 55 wt %, about 57 wt %, about 62 wt %, or greater of the extender, based on the combined solids weight of the urea-modified aldehyde-based resin and the isocyanate-based resin. In some embodiments, the binder can include one or more extenders in an amount of about 10 wt % to about 62 wt %, 11 wt % to about 20 wt %, about 13.9 wt % to about 50.6 wt %, about 17 wt % to about 33 wt %, about 23 wt % to about 40 wt %, about 26 wt % to about 42 wt %, about 31 wt % to about 48 wt %, about 46 wt % to about 58 wt %, or about 52 wt % to about 62 wt %, based on the combined solids weight of the urea-modified aldehyde-based resin and the isocyanate-based resin. In another embodiment, the binder can include at least 10 wt %, at least 12 wt %, at least 14 wt %, at least 16 wt %, at least 18 wt %, at least 20 wt %, at least 22 wt %, or at least 24 wt % to about 30 wt %, about 35 wt %, about 40 wt %, about 45 wt %, about 50 wt %, about 55 wt %, about 57 wt %, or about 62 wt %, based on the combined solids weight of the urea-modified aldehyde-based resin and the isocyanate-based resin. In another embodiment, the binder can include about 8 wt %, about 10 wt %, about 12 wt %, about 14 wt %, about 16 wt %, about 18 wt %, or about 20 wt % to less than 26 wt %, less than 30 wt %, less than 35 wt %, less than 40 wt %, less than 45 wt %, less than 50 wt %, less than 55 wt %, or less than 60 wt %, based on the combined solids weight of the urea-modified aldehyde-based resin and the isocyanate-based resin.

In some embodiments, the binder can also include one or more fillers. As used herein, the term "filler" refers to materials that can be added to the binder that occupy volume but do not contribute or do not substantially contribute to bonding properties of the binder. Generally, both extenders and fillers occupy volume of the binder, but extenders further contribute to bonding properties of the binder. Any extender can be used as a filler to occupy volume, but a filler used as an extender does not substantially contribute to bonding properties of the binder.

Suitable fillers can be or include, but are not limited to, nutshell media, corn media or corn cob media, furfural residues, seed shell media, fruit pit media, animal bones, milwhite, clays, glasses, inorganic oxides such as silica and/or alumina, wood flour, ground bark, e.g., alder bark, or any mixture thereof. Nutshell media can be or include whole, broken, chopped, crushed, milled, and/or ground shells from one or more nuts and/or seeds. Illustrative nutshell media can include, but is not limited to, almond shells, walnut shells, pecan shells, chestnut shells, hickory nut shells, cashew nut shells, peanut shells, macadamia nut shells, ivory nut shells, brazil nut shells, pine nut shells, filbert nut (hazel nut) shells, soy nut shells, pistachio nut shells, coconut shells, or the like, or any mixture thereof.

Corn media can be or include broken, chopped, crushed, or ground corn cobs, corn stalks, or other corn derived products, or any mixture thereof. Corn media can also include furfural residue from corn cobs, corn stalks, or other corn derived products and can be referred to as "corn cobs" or "corn cob residue". An illustrative corn derived product can include, but is not limited to, a cellulose byproduct derived from the manufacture of furfural, such as WIL-VACO-FIL® corn cob residue, commercially available from Willamette Valley Company, Inc., Eugene, Oreg. Furfural residues, including floral and furfural-derived compounds, can also come from oat, wheat, wheat bran, barely, wood particles, sawdust, and/or other plant-based products.

Illustrative seed shells (including fruit pits), can include, but are not limited to, the seed shells of fruit, e.g., plum, peach, cherry, apricot, olive, mango, jackfruit, guava, custard apples, pomegranates, pumpkins, and watermelon, ground or crushed seed shells of other plants such as maize (e.g., corn cobs or corn kernels), wheat, rice, jowar, sunflowers, or the like, or any mixture thereof. Other examples of suitable fillers include, but are not limited to, wheat shell, corn husk, olive pit, peanut shell, or any combination thereof. In at least one embodiment, the nut shells and/or seed shells may be ground or powdered, e.g., in a flour form. Suitable flours derived from nuts or nut shells may include, but are not limited to, walnut shell flour, pecan shell flour, almond shell flour, hazelnut shell flour, or any mixture thereof. In other embodiments, a fruit pit flour, i.e., a flour derived from the pits or seed shells of fruits can be or include, but is not limited to, olive pit flour, apricot pit flour, peach pit flour, prune pit flour, or any mixture thereof. In one or more embodiments, the filler can be or include one or more nutshell flours, one or more fruit pit flours, or a mixture thereof. For example, the filler can be or include walnut shell flour, olive pit flour, a combination thereof, or a mixture thereof.

If the binder includes the filler, the binder can include about 0.1 wt %, about 0.3 wt %, about 0.5 wt %, about 0.7 wt %, about 1 wt %, about 1.5 wt %, about 2 wt %, about 2.5 wt %, or about 3 wt % to about 5 wt %, about 6 wt %, about 7 wt %, about 8 wt %, about 9 wt %, about 10 wt %, about 11 wt %, about 12 wt %, about 13 wt %, about 14 wt %, or about 15 wt % of the filler, based on the total weight of the binder. If the binder includes the filler, the binder can include about 1 wt %, about 4 wt %, about 6 wt %, about 8 wt %, about 9 wt %, about 10 wt %, or about 12 wt % to about 14 wt %, about 16 wt %, about 18 wt %, about 20 wt %, about 25 wt %, about 30 wt %, about 40 wt %, about 45 wt %, about 50 wt %, about 55 wt %, about 60 wt %, about 62 wt %, or greater of the filler, based on the combined solids weight of the urea-modified aldehyde-based resin and the isocyanate-based resin. In some embodiments, the binder can include one or more fillers in an amount of about 5 wt % to about 50 wt %, about 8 wt % to about 31 wt %, about 6.5 wt % to about 30 wt %, about 8 wt % to about 62 wt %, about 10 wt % to about 26 wt %, about 7 wt % to about 20 wt %, about 12 wt % to about 30 wt %, about 8 wt % to about 18 wt %, about 8.2 wt % to about 36.3 wt %, about 18 wt % to about 25 wt %, or about 10.5 wt % to about 18.2 wt %, based on the combined solids weight of the urea-modified aldehyde-based resin and the isocyanate-based resin. In another embodiment, the binder can include at least 6 wt %, at least 8 wt %, at least 10 wt %, or at least 12 wt % to 14 wt %, 16 wt %, 18 wt %, about 21 wt %, about 25 wt %, about 30 wt %, about 35 wt %, about 40 wt %, or about 45 wt % of the filler, based on the combined solids weight of the urea-modified aldehyde-based resin and the isocyanate-based resin. In another embodiment, the binder can include about 5 wt %, about 7 wt %, about 9 wt %, or about 11 wt % to less than 20 wt %, less than 25 wt %, less than 30 wt %, less than 35 wt %, less than 40 wt %, or less than 45 wt %, based on the combined solids weight of the urea-modified aldehyde-based resin and the isocyanate-based resin.

In one or more embodiments, the binder can include the extender and the filler. In some embodiments, the extender can be or include, but is not limited to, wheat flour, corn flour, or a mixture thereof and the filler can be or include, but is not limited to, walnut shell flour, olive pit flour, corn cob residue, or a mixture thereof.

The fillers and/or extenders can have an average particle size of about 0.1 μm to about 100 μm. For example, the average particle size of the fillers and/or extenders can be about 1 μm, about 3 μm, about 5 μm, about 8 μm, or about 10 μm to about 30 μm, about 40 μm, about 50 μm, or about 60 μm. In another example, the average particle size of the fillers and/or extenders can be about 7 μm to about 30 μm, about 10 μm to about 30 μm, about 20 μm to about 35 μm, about 0.1 μm to about 10 μm, about 5 μm to about 45 μm, about 15 μm to about 35 μm, or about 10 μm to about 50 μm.

The average particle size and the maximum particle size of the filler and/or extender can be measured with a Cilas 990D Particle Size Analyzer configured with Particle Expert software. A vacuum cleaner equipped with a HEPA filter or equivalent capable of capturing the sample to be measured can be used. It should be ensured that the feeder mechanism, venturi block, and lenses are completely clean. Calibration should be unnecessary unless the detector or laser has been repaired or replaced. If calibration is required, the procedure can use Whitehouse Certified Glass Beads or other material meeting the requirements of ISO 13320:2009.

In some embodiments, if the binder includes both the extender and the filler, the amount of the extender can be about 0.1 wt % to about 99.9 wt %, based on a combined weight of the extender and the filler. In another embodiment, if the binder includes both the extender and the filler, the amount of the extender can be about 0.1 wt %, about 0.5 wt %, about 1 wt %, about 5 wt %, about 10 wt %, about 15 wt %, or about 20 wt % to about 30 wt %, about 40 wt %, about 50 wt %, about 60 wt %, about 70 wt %, about 80 wt %, about 85 wt %, about 90 wt %, about 95 wt %, about 99 wt %, about 99.5 wt %, or about 99.9 wt %, based on the combined weight of the extender and the filler. In some embodiments, the binder can include a greater amount of filler than extender. In other embodiments, the binder can include a greater amount of extender than filler.

In some embodiments, the binder can also include one or more surfactants. The surfactant can be or include one or more nonionic surfactants, one or more anionic surfactants, one or more cationic surfactants, or any mixture thereof. Illustrative nonionic surfactants can be or include, but are not limited to, one or more acetylenic diol compounds and/or ethylene glycol, such as SURFYNOL® 104E nonionic surfactant, wetting agent, and molecular defoamer, commercially available from Air Products, Inc., polyethylene glycol (PEG) including PLURACOL® polyols, PEG-4, PEG-6, PRG-8, PEG-12, PEG-75, and PEG-150, all commercially available from BASF, Co.; polyoxyethylene glycol alkyl ethers, octaethylene glycol monododecyl ether, pentaethylene glycol monododecyl ether, polyoxypropylene glycol alkyl ethers, polyoxyethylene glycol octylphenol ethers (TRITON® X-100), polyoxyethylene glycol alkylphenol ethers (nonoxynol-9), or any mixture thereof. Anionic surfactants can have anionic functional groups at the chain head, such as carboxylates, phosphate, sulfate, sulfonate, and other anionic groups. Illustrative anionic surfactants can be or include, but are not limited to, one or more lignosulfonates, alkyl sulfates (e.g., lauryl sulfates), alkyl-ether sulfates, or any mixture thereof. Exemplary lignosulfonates can include, but are not limited to, sodium lignosulfonate, lithium lignosulfonate, potassium lignosulfonate, calcium lignosulfonate, magnesium lignosulfonate, ammonium lignosulfonate, alkylammonium lignosulfonate, salts thereof, complexes thereof, or any mixture thereof. Illustrative cationic surfactants can be or include, but are not limited to, one or more quaternary ammonium cations, such as, alkyltrimethylammonium salts: cetyl trimethylammonium bromide (CTAB), cetyl trimethylammonium chloride (CTAC), cetylpyridinium chloride (CPC), benzalkonium chloride (BAC), benzethonium chloride (BZT), 5-bromo-5-nitro-1,3-dioxane, dimethyldioctadecylammonium chloride, cetrimonium bromide, dioctadecyldimethylammonium bromide (DODAB), salts thereof, complexes thereof, or any mixture thereof.

In some embodiments, the binder can include the surfactant in an amount of about 0.01 wt %, about 0.05 wt %, about 0.07 wt %, about 0.1 wt %, about 0.13 wt %, or about 0.15 wt % to about 0.2 wt %, about 0.25 wt %, about 0.3 wt %, about 0.35 wt %, about 0.4 wt %, about 0.45 wt %, or about 0.5 wt %, based on the total weight of the binder. In other embodiments, the binder can include the surfactant in an amount of about 0.01 wt %, about 0.02 wt %, about 0.03 wt %, about 0.04 wt %, about 0.05 wt %, about 0.07 wt %, about 0.09 wt %, about 0.1 wt %, about 0.11 wt %, about 0.12 wt %, or about 0.13 wt % to about 0.14 wt %, about 0.15 wt %, about 0.16 wt %, about 0.17 wt %, or about 0.18 wt % to about 0.19 wt %, about 0.2 wt %, about 0.25 wt %, about 0.3 wt %, about 0.35 wt %, about 0.4 wt %, about 0.45 wt %, about 0.5 wt %, about 0.6 wt %, about 0.7 wt %, about 0.8 wt %, about 0.9 wt %, about 1 wt %, about 2 wt %, about 3 wt %, or greater, based on the combined solids weight of the urea-modified aldehyde-based resin and the isocyanate-based resin. In other embodiments, the binder can include about 0.001 wt % to about 3 wt %, about 0.01 wt % to about 3 wt %, about 0.05 wt % to about 3 wt %, about 0.1 wt % to about 3 wt %, about 0.001 wt % to about 2 wt %, about 0.01 wt % to about 2 wt %, about 0.05 wt % to about 2 wt %, about 0.1 wt % to about 2 wt %, about 0.001 wt % to about 1 wt %, about 0.01 wt % to about 1 wt %, about 0.05 wt % to about 1 wt %, about 0.1 wt % to about 1 wt %, about 0.001 wt % to about 0.5 wt %, about 0.01 wt % to about 0.5 wt %, about 0.05 wt % to about 0.5 wt %, or about 0.1 wt % to about 0.5 wt % of the surfactant, based on the combined solids weight of the urea-modified aldehyde-based resin and the isocyanate-based resin.

In some embodiments, the binder can also include one or more salts. The salt can have one or more cations and one or more anions. Illustrative cations can be or include, but are not limited to, sodium, potassium, lithium, cesium, calcium, magnesium, barium, copper, cobalt, zinc, manganese, aluminum, ammonium, alkylammonium, complexes thereof, hydrates thereof, or any mixture thereof. Illustrative anions can be or include, but are not limited to, carbonates, bicarbonates, halides (e.g., chlorides or bromides), hydroxides, nitrates, nitrites, silicates, acetates, citrates, formates, sulfates, phosphates, or any mixture thereof. In some specific embodiments, the salt can be or include one or more carbonates, such as, sodium carbonate (e.g., soda ash), potassium carbonate, calcium carbonate; one or more hydroxides, such as, sodium hydroxide, potassium hydroxide, lithium hydroxide, ammonium hydroxide; salts thereof; hydrates thereof; or any mixture thereof. In some embodiments, the hydroxide can be or include sodium hydroxide and the carbonate can be or include sodium carbonate. In some embodiments, the salt can be or can include, but is not limited to, sodium chloride, potassium chloride, calcium chloride, sodium carbonate, potassium carbonate, calcium carbonate, sodium sulfate, potassium sulfate, calcium sulfate, magnesium sulfate, or any mixture thereof.

In some embodiments, the binder can include the salt, e.g., a carbonate and/or a hydroxide, in an amount of about 0.05 wt %, about 0.1 wt %, about 0.5 wt %, or about 1 wt % to about 2 wt %, about 3 wt %, about 4 wt %, about 5 wt %, about 6 wt %, about 7 wt %, about 8 wt % or about 9 wt %, based on the total weight of the binder. It should be understood that the hydroxides, e.g., sodium hydroxide, and the carbonates, e.g., sodium carbonate, are each encompassed by the term "base compound" and the term "salt". In some embodiments, the binder can include a combined or total amount of any base compound(s) and any salt(s) of up to about 3 wt %, about 4 wt %, about 5 wt %, about 5.5 wt %, about 6 wt %, about 6.5 wt %, about 7 wt %, about 7.5 wt %, about 8 wt %, about 8.5 wt %, or about 9 wt %, based on the total weight of the binder.

In some embodiments, the binder can include the salt, e.g., a carbonate and/or a hydroxide, in an amount of about 0.1 wt %, about 1 wt %, about 3 wt %, about 5 wt %, about 6 wt %, about 7 wt %, or about 8 wt % to about 9 wt %, about 10 wt %, about 12 wt %, about 15 wt %, about 17 wt %, about 20 wt %, about 22 wt %, about 24 wt %, about 26 wt %, or about 27 wt %, based on the combined solids weight of the urea-modified aldehyde-based resin and the isocyanate-based resin. In some embodiments, the binder can include the salt, e.g., a carbonate and/or a hydroxide, in an amount of about 0.05 wt %, about 0.1 wt %, about 0.2 wt %, about 0.3 wt %, about 0.4 wt %, about 0.5 wt %, about 0.6 wt %, about 0.7 wt %, or about 0.8 wt % to about 0.9 wt %, about 1 wt %, about 1.2 wt %, about 1.5 wt %, about 2 wt %, about 2.5 wt %, about 3 wt %, about 3.5 wt %, about 4 wt %, about 4.5 wt %, about 5 wt %, about 6 wt %, about 7 wt %, about 8 wt %, about 9 wt %, about 10 wt %, or greater, based on the combined solids weight of the urea-modified aldehyde-based resin and the isocyanate-based resin. In other embodiments, the binder can include the salt in an amount of about 0.05 wt % to about 5 wt %, about 0.1 wt % to about 5 wt %, about 0.1 wt % to about 4 wt %, about 0.1 wt % to about 3 wt %, about 0.1 wt % to about 2.5 wt %, about 0.1 wt % to about 2 wt %, about 0.1 wt % to about 1.5 wt %, about 0.1 wt % to about 1 wt %, about 0.1 wt % to about 0.5 wt %, about 0.2 wt % to about 5 wt %, about 0.2 wt % to about 4 wt %, about 0.2 wt % to about 3 wt %, about 0.2 wt % to about 2.5 wt %, about 0.2 wt % to about 2 wt %, about 0.2 wt % to about 1.5 wt %, about 0.2 wt % to about 1 wt %, about 0.2 wt % to about 0.5 wt %, about 0.5 wt % to about 5 wt %, about 0.5 wt % to about 4 wt %, about 0.5 wt % to about 3 wt %, about 0.5 wt % to about 2.5 wt %, about 0.5 wt % to about 2 wt %, about 0.5 wt % to about 1.5 wt %, about 0.5 wt % to about 1 wt %, about 0.8 wt % to about 5 wt %, about 0.8 wt % to about 4 wt %, about 0.8 wt % to about 3 wt %, about 0.8 wt % to about 2.5 wt %, about 0.8 wt % to about 2 wt %, about 0.8 wt % to about 1.5 wt %, or about 0.8 wt % to about 1 wt %, based on the combined solids weight of the urea-modified aldehyde-based resin and the isocyanate-based resin.

In some embodiments, the binder, prior to curing, can include a hydroxide in an amount of about 1 wt % to about 20 wt % and a carbonate in an amount of about 0.1 wt % to about 8 wt %, based on the combined solids weight of the urea-modified aldehyde-based resin and the isocyanate-based resin. In other embodiments, the binder, prior to curing, can include a hydroxide in an amount of about 2 wt % to about 19 wt % and a carbonate in an amount of about 0.1 wt % to about 7 wt %, based on the combined solids weight of the urea-modified aldehyde-based resin and the isocyanate-based resin. In other embodiments, the binder, prior to curing, can include a hydroxide in an amount of about 3 wt % to about 18 wt % and a carbonate in an amount of about 0.1 wt % to about 6 wt %, based on the combined solids weight of the urea-modified aldehyde-based resin and the isocyanate-based resin. In other embodiments, the binder, prior to curing, can include a hydroxide in an amount of about 3.5 wt % to about 17 wt % and a carbonate in an amount of about 0.1 wt % to about 5 wt %, based on the combined solids weight of the urea-modified aldehyde-based resin and the isocyanate-based resin.

As noted above, the hydroxides, e.g., sodium hydroxide, and the carbonates, e.g., sodium carbonate, are each a base compound and a salt. In some embodiments, the binder can include about 3 wt %, about 3.5 wt %, about 4 wt %, or about 4.5 wt % to about 5 wt %, about 5.5 wt %, about 6 wt %, about 6.5 wt %, about 7 wt %, about 7.5 wt %, about 8 wt %, about 8.5 wt %, or about 9 wt % of a total amount of any base compound(s) and any salt(s), based on a total weight of the binder. In some embodiments, the binder can include up to 5.8 wt %, up to 6.8 wt %, or up to 7.8 wt % of one or more hydroxides, e.g., sodium hydroxide, and up to 2.3 wt %, up to 2.5 wt %, or up to 2.7 wt % of one or more carbonates, such that the binder can include up to 3.9 wt %, up to 4.1 wt %, up to 8.1 wt %, up to 9.3 wt %, or up to 10.5 wt % of a combined amount of the one or more hydroxides and the one or more carbonates.

In some embodiments, the binder can also include one or more additives. Illustrative additives can include, but are not limited to, waxes and/or other hydrophobic additives, release agents, dyes, fire retardants, formaldehyde scavengers, biocides, or any mixture thereof. In some embodiments, the mixtures, compositions, and products, including, but not limited to, the binder, mixtures that include the binder, resins, and/or lignocellulose substrates, can be produced by agitating, mixing, blending, homogenization, ultrasonication, colloid milling, microfluidic mixing, or processes.

The rate at which the crosslinking reactions occur during curing of the binder can affect what is commonly referred to as the binder "pot life", "shelf life", or "gel time". The terms "pot life", "shelf life", and "gel time" usually refers to the time required for the binder to cure, which can be measured a number of ways, but near the end of the pot life the viscosity of the binder is too high for satisfactory application of the binder to a substrate, such as the lignocellulose substrates.

The binder can be formed by combining together, e.g., mixing, blending, or otherwise contacting, the individual components while maintaining a flowable condition, such as having a relatively low viscosity (e.g., about 10,000 cP or less, about 9,000 cP or less, about 8,000 cP or less, about 7,000 cP or less, about 6,000 cP or less, about 5,000 cP or less, about 4,000 cP or less, or about 3,500 cP or less at a temperature of about 25° C.), prior to spreading, spraying, coating, or otherwise applying the binder onto the lignocellulose substrates. In this way, the binder can have a pot life long enough for performing commercial bonding applications. Depending on the particular use or application for the binder, the viscosity of the binder can increase to a point at which the binder can no longer be efficiently or effectively applied to the lignocellulose substrates, e.g., a plurality of wood particles, a wood composite, and/or veneer substrate. The usable pot life of the binder has been exceeded once the viscosity of the binder increases to a point that causes the binder to be too thick or viscous to apply or otherwise use. The binder can have pot life of at least 6 hours, at least 12 hours, at least 18 hours, at least 1 day, at least 2 days, about 3 days, about 5 days, about 7 days, or about 10 days to about 12 days, about 14 days, about 18 days, about 22 days, about 25 days, about 28 days, about 30 days, or longer, after formation of the binder. After formation of the binder is the period of time starting when the binder is initially mixed, produced, or otherwise formed. The binder can be maintained at a temperature of about 10° C. to about 40° C. or about 20° C. to about 30° C., such as about 25° C., during the period of time. The binder can be continuously or intermittently stirred when in storage to reduce or prevent phase separation of the binder. The binder can have a solids content of about 40 wt %, about 41 wt %, about 42 wt %, about 43 wt %, or about 44 wt % to about 45 wt %, about 46 wt %, about 47 wt %, about 48 wt %, about 49 wt %, or about 50 wt %. In at least one embodiment, the binder can have a solids content of about 42 wt %, about 43 wt %, or about 44 wt % to about 45 wt %, about 46 wt %, about 47 wt %, or about 48 wt %, based on the total weight of the binder.

In one or more embodiments, the binder, prior to being cured, can have a viscosity of about 100 cP, about 200 cP, about 300 cP, about 400 cP, about 500 cP, about 600 cP, about 700 cP, about 800 cP, about 900 cP, about 1,000 cP, about 1,100 cP, about 1,200 cP, about 1,300 cP, or about 1,400 cP to about 1,500 cP, about 1,800 cP, about 2,000 cP, about 2,200 cP, about 2,500 cP, about 2,800 cP, about 3,000 cP, about 3,200 cP, about 3,500 cP, about 4,000 cP, about 5,000 cP, about 6,000 cP, about 8,000 cP, about 10,000 cP, or greater at a temperature of about 25° C. In some embodiments, the binder, prior to being cured, can have a viscosity of about 500 cP to about 10,000 cP, about 100 cP to about 3,000 cP, about 100 cP to about 2,500 cP, about 100 cP to about 2,000 cP, about 100 cP to about 1,500 cP, about 100 cP to about 1,000 cP, about 100 cP to about 900 cP, about 100 cP to about 800 cP, about 200 cP to about 3,000 cP, about 200 cP to about 2,500 cP, about 200 cP to about 2,000 cP, about 200 cP to about 1,500 cP, about 200 cP to about 1,200 cP, about 200 cP to about 1,000 cP, about 200 cP to about 900 cP, about 200 cP to about 800 cP, about 200 cP to about 3,000 cP, about 400 cP to about 2,500 cP, about 400 cP to about 2,000 cP, about 400 cP to about 1,500 cP, about 400 cP to about 1,200 cP, about 400 cP to about 1,000 cP, about 400 cP to about 900 cP, about 400 cP to about 800 cP, about 500 cP to about 3,000 cP, about 500 cP to about 2,500 cP, about 500 cP to about 2,000 cP, about 500 cP to about 1,500 cP, about 500 cP to about 1,200 cP, about 500 cP to about 1,000 cP, about 500 cP to about 900 cP, about 500 cP to about 800 cP, about 500 cP to about 700 cP, about 500 cP to about 600 cP, about 500 cP to about 550 cP, about 600 cP to about 3,000 cP, about 600 cP to about 2,500 cP, about 600 cP to about 2,000 cP, about 600 cP to about 1,500 cP, about 600 cP to about 1,000 cP, about 600 cP to about 800 cP, about 600 cP to about 700 cP, or about 600 cP to about 650 cP at a temperature of about 25° C.

The viscosity of the compositions, e.g., the binder, discussed and described herein can be determined using a viscometer at a temperature of about 25° C. For example, a Model DV-II+ viscometer, commercially available from Brookfield Company, Inc., equipped with a number 3 spindle can be used to measure viscosity. The binder can be maintained at a temperature of about 25° C.

In one or more embodiments, the binder can have an initial viscosity of less than 10,000 cP, less than 9,000 cP, less than 8,000 cP, less than 7,000 cP, less than 6,000 cP, less than 5,000 cP, less than 4,000 cP, or less than 3,500 cP at a temperature of about 25° for at least the first 12 hours after formation of the binder. In some embodiments, the binder can have an initial viscosity of about 50 cP, about 100 cP, about 200 cP, about 400 cP, about 500 cP, about 800 cP, about 1,000 cP, about 1,200 cP, or about 1,500 cP to about 1,600 cP, about 1,800 cP, about 2,000 cP, about 2,200 cP, about 2,500 cP, about 2,800 cP, about 3,000 cP, about 3,200 cP, about 3,500 cP, 5,000 cP, about 7,000 cP, about 8,000 cP, or about 10,000 cP at a temperature of about 25° C. for about 6 hours, about 12 hours, about 18 hours, about 24 hours, about 36 hours, about 2 days, about 3 days, about 5 days, or about 8 days to about 10 days, about 12 days, about 14 days, about 18 days, about 22 days, about 25 days, about 28 days, about 30 days, or longer, after formation of the binder. In other embodiments, the binder can have an initial viscosity of 500 cP to about 10,000 cP, about 80 cP to about 3,400 cP, about 80 cP to about 3,100 cP, about 80 cP to about 2,900 cP, about 200 cP to about 3,500 cP, about 200 cP to about 3,100 cP, about 200 cP to about 2,900 cP, about 400 cP to about 3,500 cP, about 400 cP to about 3,100 cP, or about 400 cP to about 2,900 cP at a temperature of about 25° C. for about 6 hours, about 12 hours, about 24 hours, about 2 days, about 5 days, or about 8 days to about 10 days, about 15 days, about 20 days, about 25 days, about 30 days, or longer, after formation of the binder.

In other embodiments, the binder can have an initial viscosity of about 50 cP, about 100 cP, about 200 cP, about 400 cP, about 600 cP, about 800 cP, about 1,000 cP, about 1,200 cP, or about 1,500 cP to less than 2,000 cP, less than 2,200 cP, less than 2,500 cP, less than 2,800 cP, less than 3,000 cP, less than 3,200 cP, less than 3,500 cP, less than 4,000 cP, less than 6,000 cP, less than 8,000 cP, or less than 10,000 cP at a temperature of about 25° C. for at least the first 6 hours, at least the first 12 hours, at least 1 day, at least 2 days, at least 3 days, at least 5 days, or at least 8 days to about 10 days, about 12 days, about 14 days, about 18 days, about 22 days, about 25 days, about 28 days, about 30 days, or longer, after formation of the binder. In some embodiments, the binder can have an initial viscosity of about 900 cP to less than 10,000 cP, about 80 cP to less than 3,500 cP, about 80 cP to less than 3,100 cP, about 80 cP to less than 2,900 cP, about 200 cP to less than 3,500 cP, about 200 cP to less than 3,300 cP, about 200 cP to less than 3,100 cP, about 200 cP to less than 3,000 cP, about 400 cP to less than 3,500 cP, about 400 cP to less than 3,300 cP, about 400 cP to less than 3,100 cP, or about 400 cP to less than 3,000 cP at a temperature of about 25° C. for at least the first 6 hours, at least the first 12 hours, at least 1 day, at least 2 days, at least 5 days, or at least 8 days to about 10 days, about 15 days, about 20 days, about 25 days, or about 30 days, after formation of the binder.

In one or more embodiments, the binder, prior to being cured, can have a viscosity of about 100 cP, about 200 cP, about 300 cP, about 400 cP, about 500 cP, about 600 cP, about 700 cP to about 800 cP, about 900 cP, about 1,000 cP, about 1,100 cP, about 1,200 cP, about 1,500 cP, about 1,800 cP, about 2,000 cP, about 2,200 cP, about 2,500 cP, about 2,800 cP, about 3,000 cP, about 3,200 cP, about 3,500 cP, about 4,000 cP, about 6,000 cP, about 8,000 cP, or about 10,000 cP at a temperature of about 25° C. and a solids content of about 43 wt % to about 46 wt % or about 44 wt % to about 45 wt %. In some embodiments, the binder, prior to being cured, can have a viscosity of about 900 cP to about 10,000 cP, about 1,000 cP to about 9,000 cP, about 1,000 cP to about 3,500 cP, about 100 cP to about 3,000 cP, about 100 cP to about 2,500 cP, about 100 cP to about 2,000 cP, about 100 cP to about 1,500 cP, about 100 cP to about 1,000 cP, about 100 cP to about 900 cP, about 100 cP to about 800 cP, about 200 cP to about 3,000 cP, about 200 cP to about 2,500 cP, about 200 cP to about 2,000 cP, about 200 cP to about 1,500 cP, about 200 cP to about 1,200 cP, about 200 cP to about 1,000 cP, about 200 cP to about 900 cP, about 200 cP to about 800 cP, about 200 cP to about 3,000 cP, about 400 cP to about 2,500 cP, about 400 cP to about 2,000 cP, about 400 cP to about 1,500 cP, about 400 cP to about 1,200 cP, about 400 cP to about 1,000 cP, about 400 cP to about 900 cP, about 400 cP to about 800 cP, about 500 cP to about 3,000 cP, about 500 cP to about 2,500 cP, about 500 cP to about 2,000 cP, about 500 cP to about 1,500 cP, about 500 cP to about 1,200 cP, about 500 cP to about 1,000 cP, about 500 cP to about 900 cP, about 500 cP to about 800 cP, about 500 cP to about 700 cP, about 500 cP to about 600 cP, about 500 cP to about 550 cP, about 600 cP to about 3,000 cP, about 600 cP to about 2,500 cP, about 600 cP to about 2,000 cP, about 600 cP to about 1,500 cP, about 600 cP to about 1,000 cP, about 600 cP to about 800 cP, about 600 cP to about 700 cP, or about 600 cP to about 650 cP at a temperature of about 25° C. and a solids content of about 43 wt % to about 46 wt % or about 44 wt % to about 45 wt %.

In one or more embodiments, the binder, prior to being cured, can have an initial viscosity of less 10,000 cP, less than 8,000 cP, less than 6,000 cP, less than 4,000 cP, or than 3,500 cP at a temperature of about 25° C. and a solids content of about 43 wt % to about 45 wt % for at least the first 12 hours after formation of the binder. In some embodiments, the binder can have an initial viscosity of about 50 cP, about 100 cP, about 200 cP, about 400 cP, about 500 cP, about 800 cP, about 1,000 cP, about 1,200 cP, or about 1,500 cP to about 1,600 cP, about 1,800 cP, about 2,000 cP, about 2,200 cP, about 2,500 cP, about 2,800 cP, about 3,000 cP, about 3,200 cP, about 3,500 cP, about 4,000 cP, about 5,000 cP, about 6,000 cP, about 7,000 cP, about 8,000 cP, or about 9,000 cP at a temperature of about 25° C. and a solids content of about 43 wt % to about 45 wt % for about 6 hours, about 12 hours, about 18 hours, about 24 hours, about 36 hours, about 2 days, about 3 days, about 5 days, or about 8 days to about 10 days, about 12 days, about 14 days, about 18 days, about 22 days, about 25 days, about 28 days, about 30 days, or longer, after formation of the binder. In other embodiments, the binder, prior to curing, can have an initial viscosity at about 80 cP to about 3,400 cP, about 80 cP to about 3,100 cP, about 80 cP to about 2,900 cP, about 200 cP to about 3,500 cP, about 200 cP to about 3,100 cP, about 200 cP to about 2,900 cP, about 400 cP to about 3,500 cP, about 400 cP to about 3,100 cP, or about 400 cP to about 2,900 cP at a temperature of about 25° C. and a solids content of about 43 wt % to about 45 wt % for about 6 hours, about 12 hours, about 24 hours, about 2 days, about 5 days, or about 8 days to about 10 days, about 15 days, about 20 days, about 25 days, about 30 days, or longer, after formation of the binder.

In other embodiments, the binder can have an initial viscosity of about 50 cP, about 100 cP, about 200 cP, about 400 cP, about 600 cP, about 800 cP, about 1,000 cP, about 1,200 cP, or about 1,500 cP to less than 2,000 cP, less than 2,200 cP, less than 2,500 cP, less than 2,800 cP, less than 3,000 cP, less than 3,200 cP, less than 3,500 cP, less than 4,000 cP, less than 6,000 cP, less than 8,000 cP, or less than 10,000 cP at a temperature of about 25° C. and a solids content of about 43 wt % to about 45 wt % for at least the first 6 hours, at least the first 12 hours, at least 1 day, at least 2 days, at least 3 days, at least 5 days, or at least 8 days to about 10 days, about 12 days, about 14 days, about 18 days, about 22 days, about 25 days, about 28 days, about 30 days, or longer, after formation of the binder. In some embodiments, the binder can have an initial viscosity at about 80 cP to less than 3,500 cP, about 80 cP to less than 3,100 cP, about 80 cP to less than 2,900 cP, about 200 cP to less than 3,500 cP, about 200 cP to less than 3,300 cP, about 200 cP to less than 3,100 cP, about 200 cP to less than 3,000 cP, about 400 cP to less than 3,500 cP, about 400 cP to less than 3,300 cP, about 400 cP to less than 3,100 cP, or about 400 cP to less than 3,000 cP at a temperature of about 25° C. and a solids content of about 43 wt % to about 45 wt % for at least the first 6 hours, at least the first 12 hours, at least 1 day, at least 2 days, at least 5 days, or at least 8 days to about 10 days, about 15 days, about 20 days, about 25 days, or about 30 days, after formation of the binder.

The binder, prior to curing, can have a pH of greater than 7. In some embodiments, the binder, prior to curing, can have a pH of about 7.5, about 8.0, about 9.0, about 9.5, about 10.0, about 10.5, or about 11.0 to about 11.2, about 11.5, about 11.7, about 12.0, about 12.2, about 12.5, or about 13.0 at a temperature of about 25° C. In another embodiment, the binder, prior to curing, can have a pH of about 8 to about 13, about 9 to about 13, about 10 to about 13, about 11 to about 13, about 12 to about 13, about 9 to about 12.5, about 10 to about 12.5, about 11 to about 12.5, about 12 to about 12.5, about 9 to about 12, about 10 to about 12, about 11 to about 12, about 11.5 to about 12, about 11.2 to about 12.5, about 11.5 to about 12.5, or about 11.7 to about 12.5 at a temperature of about 25° C. In one or more embodiments, prior to curing, the binder can have a pH of about 10.5 to about 13.0 at a temperature of about 25° C.

In some embodiments, the binder, prior to curing, can have a pH of about 7.5, about 8.0, about 9.0, about 9.5, about 10.0, about 10.5, or about 11.0 to about 11.2, about 11.5, about 11.7, about 12.0, about 12.2, about 12.5, or about 13.0 at a temperature of about 25° C. and a solids content of about 43 wt % to about 46 wt % or about 44 wt % to about 45 wt %. In another embodiment, the binder, prior to curing, can have a pH of about 8 to about 13, about 9 to about 13, about 10 to about 13, about 11 to about 13, about 12 to about 13, about 9 to about 12.5, about 10 to about 12.5, about 11 to about 12.5, about 12 to about 12.5, about 9 to about 12, about 10 to about 12, about 11 to about 12, about 11.5 to about 12, about 11.2 to about 12.5, about 11.5 to about 12.5, or about 11.7 to about 12.5 at a temperature of about 25° C. and a solids content of about 43 wt % to about 45 wt %. In one or more embodiments, prior to curing, the binder can have a pH of about 10.5 to about 13.0 at a temperature of about 25° C. and a solids content of about 43 wt % to about 46 wt % or about 44 wt % to about 45 wt %.

In some embodiments, the binder, prior to curing, can have a sodium hydroxide equivalent weight alkalinity of about 3 wt %, about 4 wt %, about 5 wt %, about 5.3 wt %, about 5.5 wt %, about 5.7 wt %, or about 6 wt % to about 6.3 wt %, about 6.5 wt %, about 6.7 wt %, about 7 wt %, about 7.3 wt %, about 7.5 wt %, about 8 wt %, about 8.5 wt %, or about 9 wt %. In some embodiments, the binder, prior to curing, can have a sodium hydroxide equivalent weight alkalinity of about 3 wt %, about 4 wt %, about 5 wt %, about 5.3 wt %, about 5.5 wt %, about 5.7 wt %, or about 6 wt % to about 6.3 wt %, about 6.5 wt %, about 6.7 wt %, about 7 wt %, about 7.3 wt %, or about 7.5 wt %, about 8 wt %, about 8.5 wt %, or about 9 wt % at a temperature of about 25° C. In some embodiments, the binder, prior to curing, can have a sodium hydroxide equivalent weight alkalinity of about 3 wt %, about 4 wt %, about 5 wt %, about 5.3 wt %, about 5.5 wt %, about 5.7 wt %, or about 6 wt % to about 6.3 wt %, about 6.5 wt %, about 6.7 wt %, about 7 wt %, about 7.3 wt %, or about 7.5 wt %, about 8 wt %, about 8.5 wt %, or about 9 wt % at a temperature of about 25° C. and a solids content of about 43 wt % to about 46 wt % or about 44 wt % to about 45 wt %.

In some embodiments, prior to curing, the binder can be free of formaldehyde, i.e., the binder can have no detectable free formaldehyde concentration. In other embodiments, prior to curing, the binder can have a free formaldehyde concentration of about 1 ppm, about 10 ppm, about 100 ppm, about 200 ppm, about 500 ppm, or about 700 ppm to about 800 ppm, about 900 ppm, about 0.1 wt %, about 0.15 wt %, about 0.2 wt %, about 0.25 wt %, about 0.3 wt %, or about 0.4 wt %, based on the based on the combined solids weight of the urea-modified aldehyde-based resin and the isocyanate-based resin. In other embodiments, prior to curing, the binder can have a free formaldehyde concentration of less than 1 ppm, less than 10 ppm, less than 100 ppm, less than 200 ppm, less than 500 ppm, less than 700 ppm, less than 800 ppm, less than 900 ppm, less than 0.1 wt %, less than 0.15 wt %, less than 0.2 wt %, less than 0.25 wt %, less than 0.3 wt %, or less than 0.4 wt %, based on the based on the combined solids weight of the urea-modified aldehyde-based resin and the isocyanate-based resin.

As used herein, the term "lignocellulose" refers to a material that includes lignin and cellulose, hemicellulose, or a combination of cellulose and hemicelluloses. The starting material, from which the lignocellulose substrates can be or can be derived from, can be shaped, reduced, or otherwise formed to the appropriate dimensions by various processes such as hogging, grinding, hammer milling, tearing, shredding, and/or flaking. Other processes for producing the substrates can include skiving, cutting, slicing, and/or sawing. Suitable forms of the lignocellulose substrates can include, but are not limited to, chips, flakes, wafers, fibers, powder, shavings, sawdust or dust, veneer, strands, and/or the like. Accordingly, the term "substrate" when used in conjunction with "lignocellulose" refers to lignocellulose material or lignocellulose containing material having any desired shape such as chips, flakes, fibers, powder, shavings, sawdust or dust, veneer, strands, and/or the like. Other suitable lignocellulose substrates can include, but are not limited to, wood chips, wood fibers, wood flakes, wood strands, wood wafers, wood shavings, wood particles, wood veneer, or any mixture thereof.

Lignocellulose substrates can be or include, but are not limited to, one or more hardwoods, one or more softwoods, a mixture of hardwood and softwood, other plant materials, or any combination thereof. The lignocellulose substrates (material that includes both cellulose and lignin) can include, but is not limited to, straw, hemp, sisal, cotton stalk, wheat, bamboo, sabai grass, rice straw, banana leaves, paper mulberry (i.e., bast fiber), abaca leaves, pineapple leaves, esparto grass leaves, fibers from the genus *Hesperaloe* in the family Agavaceae jute, salt water reeds, palm fronds, flax, ground nut shells, hardwoods, softwoods, recycled fiberboards such as high density fiberboard, medium density fiberboard, low density fiberboard, oriented strand board, particleboard, animal fibers (e.g., wool, hair), recycled paper products (e.g., newspapers, cardboard, cereal boxes, and magazines), or any combination thereof. Suitable woods can include softwoods and/or hardwoods. Illustrative types of wood can include, but are not limited to, one or more of: alder, almond, apple, ash, aspen, basswood, beech, birch, cedar, cherry, chinaberry, cottonwood, cypress, douglas fir, elm, fir, gum, hackberry, helm, hickory, huiache, jessamine, lenga, maple, oak, olive, pear, pecan, pine, poplar, redwood, *sassafras*, spruce, sycamore, tallow, tepa, walnut, and willow.

The lignocellulose substrates can include or contain water on, about, and/or within the substrates. In some embodiments, the lignocellulose substrates can have a moisture or water content of about 9 wt %, about 10 wt %, about 11 wt %, about 12 wt %, or about 13 wt % to about 14 wt %, about 15 wt %, about 16 wt %, about 17 wt %, about 18 wt %, about 19 wt %, about 20 wt %, about 25 wt %, about 30 wt %, about 35 wt %, about 40 wt %, or greater, based on the dry weight of the lignocellulose substrates. In other embodiments, the lignocellulose substrates can have water content of about 9 wt % to about 40 wt %, about 10 wt % to about 40 wt %, about 10 wt % to about 35 wt %, about 10 wt % to about 30 wt %, about 10 wt % to about 25 wt %, about 10 wt % to about 20 wt %, about 10 wt % to about 18 wt %, about 10 wt % to about 16 wt %, about 10 wt % to about 15 wt %, about 10 wt % to about 14 wt %, about 10 wt % to about 13 wt %, about 10 wt % to about 12 wt %, about 10 wt % to about 11 wt %, about 12 wt % to about 40 wt %, about 12 wt % to about 35 wt %, about 12 wt % to about 30 wt %, about 12 wt % to about 25 wt %, about 12 wt % to about 20 wt %, about 12 wt % to about 18 wt %, about 12 wt % to about 16 wt %, about 12 wt % to about 15 wt %, about 12 wt % to about 14 wt %, about 12 wt % to about 13 wt %, about 14 wt % to about 40 wt %, about 14 wt % to about 35 wt %, about 14 wt % to about 30 wt %, about 14 wt % to about 25 wt %, about 14 wt % to about 20 wt %, about 14 wt % to about 18 wt %, about 14 wt % to about 16 wt %, or about 14 wt % to about 15 wt %, based on the dry weight of the lignocellulose substrate. In another embodiment, the lignocellulose substrates can have water content of at least 9 wt %, at least 10 wt %, at least 11 wt %, at least 12 wt %, at least 13 wt %, at least 14 wt %, at least 15 wt %, at least 16 wt %, at least 17 wt %, at least 18 wt %, at least 19 wt %, or at least 20 wt % to about 21 wt %, about 23 wt %, about 25 wt %, about 27 wt %, about 30 wt %, about 33 wt %, about 35 wt %, about 37 wt %, about 40 wt %, or greater, based on the dry weight of the lignocellulose substrates.

The lignocellulose substrates can be fresh, e.g., not treated or dried, or dried and/or treated. In some embodiments, the lignocellulose substrates and/or the starting material from which the lignocellulose substrates were derived can be at least partially dried. As such, in some embodiments, the lignocellulose substrates can have a moisture or water content of less than 9 wt %, less than 8 wt %, less than 7 wt %, e.g., from about 3 wt % to about 7 wt %, based on the dry weight of the lignocellulose substrates. In other embodiments, the lignocellulose substrates can be washed and/or leached with an aqueous medium such as water.

In one or more embodiments, the binder composition can be mixed, blended, sprayed, applied, or otherwise contacted with the lignocellulose substrates to produce a mixture or resinated furnish. The resinated furnish can be heated in air. The resinated furnish can be heated in an inert atmosphere or a substantially an inert atmosphere such as nitrogen. If the mixture is heated in a substantially inert atmosphere, the amount of oxygen can be less than 5 mol %, less than 3 mol %, less than 1 mol %, less than 0.5 mol %, or less than 0.1 mol % oxygen relative to the balance of gases in the inert atmosphere. Suitable inert gases can include, but are not limited to, nitrogen, argon, helium, or a mixture thereof.

Heating the binder and/or the resinated furnish can cause or promote the at least partial curing of the binder to produce the composite product. As used herein, the terms "curing," "cured," "at least partially curing," "at least partially cured," and similar terms are intended to refer to the structural and/or morphological change that occurs in the mixture, such as by covalent chemical reaction (crosslinking), ionic interaction or clustering, phase transformation or inversion, and/or hydrogen bonding when the is subjected to conditions sufficient, e.g., sufficiently heated, to cause the properties of a flexible, porous substrate, such as a nonwoven mat or blanket of lignocellulose substrates and/or a rigid or semi-rigid substrate, such as a wood or other lignocellulose containing board or sheet, to which an effective amount of the binder has been applied, to be altered. The lignocellulose substrates can have the moisture content (e.g., about or at least 10 wt % to about 40 wt % or more, based on the dry weight of the lignocellulose substrates), at the time the binder is at least partially cured (e.g., heated to a temperature of about 60° C. to about 300° C.) to produce the composite lignocellulose product.

Illustrative composite products can be or include, but are not limited to, plywood (e.g., hardwood plywood and/or softwood plywood), oriented strand board ("OSB"), engineered wood flooring, particleboard, fiberboard (e.g., medium density fiberboard ("MDF") and/or high density fiberboard ("HDF")), chipboard, flakeboard, or waferboard, structural composite lumber, glue-laminated lumber (Glulam) other wood and non-wood products. Structural composite lumber can include, but is not limited to, laminated veneer lumber (LVL), parallel strand lumber (PSL), laminated strand lumber (LSL), and oriented strand lumber (OSL).

The lignocellulose substrates can be arranged, positioned, stacked, combined, mixed, or otherwise disposed within a resinated furnish containing one or more binders or adhesives in an uncured configuration of the desired composite product or wood-based product. For example, a plurality of lignocellulose substrates, such as multiple wood veneers and/or wood sheets, can be arranged with a binder therebetween to produce a resinated furnish having an uncured configuration of plywood, LVL, PSL, LSL, OSL, Glulam, or other engineered composite product. In other examples, the plurality of lignocellulose substrates can be strands, chips, flakes, and/or particles that can be arranged with a binder therebetween to produce a resinated furnish having an uncured configuration of OSB, LVL, PSL, LSL, OSL, particleboard, fiberboard, MDF, HDF, chipboard, flakeboard, or waferboard.

Composite products such as particleboard, fiberboard, plywood, and oriented strand board, can have a thickness of about 1.5 mm, about 5 mm, or about 10 mm to about 15 mm, about 20 mm, about 25 mm, about 30 mm, about 50 mm, about 100 mm, about 200 mm, or about 300 mm. The composite products can have a length of about 0.1 m, about 0.5 m, about 1 m, about 1.2 m, about 1.5 m, about 1.8 m, about 2.4 m, about 3 m, or about 3.6 m. The composite products can have a width of about 0.1 m, about 0.5 m, about 1 m, about 1.2 m, about 1.5 m, about 1.8 m, about 2.4 m, or about 3 m.

In some embodiments, the composite product can include one or more veneers or other wood sheets. For example, a composite product can include two, three, four, five, six, seven, eight, nine, ten, or more veneers or other wood sheets. The veneers or wood sheets can have any suitable shape, e.g., rectangular, circular, or any other geometrical shape. Typically, the veneers can be rectangular and can have a width ranging from a low of about 1 cm, about 5 cm, about 10 cm, about 15 cm, about 20 cm, or about 25 cm to a high of about 0.6 m, about 0.9 m, about 1.2 m, about 1.8 m, or about 2.4 m. The veneers can have a length ranging from a low of about 0.3 m, about 0.6 m, about 0.9 m, about 1.2 m, or about 1.8 m to a high of about 2.4 m, or about 3 m, about 3.6 m, about 4.3 m, about 4.9 m, about 5.5 m, about 6.1 m, about 6.7 m, about 7.3 m, or about 7.9 m. For example, in a typical veneer product such as plywood, the veneers can have a width of about 1.2 m and a length of about 2.4 m. The veneers can have a thickness ranging from a low of about 0.8 mm, about 0.9 mm, about 1 mm, about 1.1 mm or about 1.2 mm to a high of about 3 mm, about 4 mm, about 5 mm, about 6 mm, about 7 mm, about 8 mm, about 9 mm, or about 10 mm.

Composite products in the shape or form of a panel, sheet, board, veneer, or the like can be in the form of a rectangular prism that includes six outer surfaces, e.g., three pairs of oppositely facing surfaces. The first pair of oppositely facing surfaces of the composite product can include a first or "top" surface and an opposing second or "bottom" surface. The second and third pairs of oppositely facing surfaces of the composite product can be referred to as the "side surfaces" that have a surface area less than the surface area of the first and second surfaces. As such, composite products in the shape or form of a panel, sheet, board, or the like can have an average thickness, where the average thickness is the length or distance between the first and second surfaces.

If the composite product is in the form of a panel, sheet, board, or the like, the amount or length of time the resinated furnish can be heated can be about 5 seconds per millimeter (s/mm), about 10 s/mm, about 12 s/mm, or about 15 s/mm to about 17 s/mm, about 19 s/mm, about 21 s/mm, about 23 s/mm, about 25 s/mm, about 27 s/mm, about 30 s/mm, about 35 s/mm, about 40 s/mm, about 50 s/mm, or about 60 s/mm, where the length refers to the average thickness of the composite product. For example, the resinated furnish can be heated for a time of about 5 s/mm to about 55 s/mm, about 10 s/mm to about 45 s/mm, about 15 s/mm to about 40 s/mm, about 5 s/mm to about 25 s/mm, about 7 s/mm to about 27 s/mm, about 9 s/mm to about 24 s/mm, about 11 s/mm to about 22 s/mm, about 8 s/mm to about 20 s/mm, about 14 s/mm to about 18 s/mm, about 6 s/mm to about 14 s/mm, about 10 s/mm to about 18 s/mm, or about 10 s/mm to about 16 s/mm, where the length refers to the average thickness of the composite product. In another embodiment, the resinated furnish can be heated for a time less than 120 s/mm, less than 110 s/mm, less than 100 s/mm, less than 90 s/mm, less than 80 s/mm, less than 70 s/mm, less than 60 s/mm, less than 50 s/mm, less than 40 s/mm, less than 30 s/mm, less than 25 s/mm, less than 22 s/mm, less than 20 s/mm, less than 18 s/mm, less than 17 s/mm, less than 16 s/mm, less than 15 s/mm, less than 14 s/mm, less than 13 s/mm, or less than 12 s/mm, where the length refers to the average thickness of the composite product. In one specific embodiment, a composite product in the form of a panel, sheet, board, or the like and having an average thickness of about 15 mm and subjected to a total heating time of about 4 minutes would correspond to heating the mixture for about 16 s/mm. In at least one specific embodiment, the resinated furnish can be heated to a temperature of about 100° C. to about 300° C., about 100° C. to about 250° C., about 100° C. to about 200° C., about 100° C. to about 170° C., about 140° C. to about 170° C., or about 160° C. to about 170° C. for a time of about 10 s/mm to about 30 s/mm, about 13 s/mm to about 19 s/mm, about 15 s/mm to about 40 s/mm, or about 8 s/mm to about 50 s/mm.

Pressure can optionally be applied to the resinated furnish before, during, and/or after the resinated furnish is heated to produce the composite product. For example, if the desired composite product shape or structure is a panel, sheet, board, or the like, an amount of the resinated furnish sufficient to produce a composite product of the desired size, can be transported, directed, placed, introduced, disposed, or otherwise located within a press capable of pressing the mixture before the mixture is heated and/or when the mixture is heated. The press can be an open press or a closed press. In at least one specific embodiment, an open press can be used to press the resinated furnish when the resinated furnish is heated, e.g., to a temperature of about 100° C. to about 300° C. or about 100° C. to about 250° C. In another embodiment, the resinated furnish can be extruded through a die (extrusion process) and heated to produce the composite lignocellulose product. The resinated furnish can be pressed under a pressure of about 0.5 MPa, about 1 MPa, about 3 MPa, or about 5 MPa to about 7 MPa, about 9 MPa, about 11 MPa, about 13 MPa, about 15 MPa, or about 20 MPa. In one embodiment, the resinated furnish can be heated to a temperature of at least 100° C. to about 160° C. and can be pressed to a pressure of about 0.8 MPa to about 2 MPa for about 2 min to about 20 min to produce the composite product. In some embodiments, the resinated furnish can be heated to a temperature of about 100° C. to about 160° C., about 120° C. to about 160° C., or about 140° C. to about 160° C. and can be pressed to a pressure of about 1 MPa to about 2 MPa or about 1.5 MPa to about 2 MPa for about 2 min, about 3 min, about 5 min, or about 8 min to about 10 min, about 15 min, about 18 min, or about 20 min to produce the composite product.

Illustrative open presses can be as discussed and described in U.S. Pat. Nos. 4,017,248; 5,337,655; 5,611,269; 5,950,532; 6,098,532; and 6,782,810. Suitable, commercially available, open presses can include, but are not limited to, the CONTIROLL® press available from Siempelkamp, GmbH and the CPS press available from Dieffenbacher, GmbH.

The resinated furnish can be made via a continuous process or a semi-continuous mixing process in one or more mixers, blenders, or other agitators. The mixer can be configured to contain a few hundred kilograms to several thousand kilograms. For example, in a single mixer about 500 kg/hr, about 5,000 kg/hr, about 10,000 kg/hr, or about 13,000 kg/hr to about 16,000 kg/hr, about 20,000 kg/hr, about 25,000 kg/hr, or about 30,000 kg/hr of the mixture can be recovered from the mixer. As the binder or the resinated furnish exits the mixer, the composition or mixture can be deposited onto a conveyor belt and can be transported to one or more dryers, moistening systems, presses, and/or other processing equipment. For example, in at least one specific embodiments, a particleboard product can be made by blending, mixing, or otherwise combining a first or "face" mixture in a first mixer and a second or "core" mixture in a second mixer. The first mixer can produce about 13,600 kg/hr to about 15,900 kg/hr of a "face" mixture and the second mixer can produce about 18,100 kg/hr to about 20,400 kg/hr of a "core" mixture. The "face" and "core" mixtures can be used to produce a particleboard panel or sheet, where the "face" mixture makes up the outer layers of the particleboard and the "core" mixture makes up the inner or core layer of the particleboard.

The composite product can have physical-mechanic properties, such as internal bond (IB) strength, blending, density, and/or moisture content, according to EN 13986, EN 314, EN 310, EN 323, and/or EN 322. The composite product can have a Wood Failure according to PS1-09.

Referring to particleboard in particular, particleboard made according to one or more embodiments described herein can meet or exceed the requirements for H-1, H-2, H-3, M-0, M-1, M-S, M-2, M-3i, LD-1, and/or LD-2 grade particleboard as described in the American National Standards Institute (ANSI) for particleboard, i.e., ANSI A208.1-2009 Particleboard, approved Feb. 2, 2009. Particleboard made according to one or more embodiments described herein can meet or exceed the requirements for PBU, D-2, D-3, and/or M-3 as defined by the ANSI for particleboard, i.e., ANSI A208.1-2009 Particleboard, approved Feb. 2, 2009. For example, Tables A and B set out certain requirements for the different grades of particleboard. Referring to oriented strand board (OSB) in particular, OSB made according to one or more embodiments described herein can meet or exceed the U.S. Department of Commerce Voluntary Performance Standard PS 2. Referring to plywood in particular, plywood made according to one or more embodiments described herein can meet or exceed the U.S. Department of Commerce Voluntary Product Standard PS 1-09 (May 2007) and/or PS 2-10 (June 2011).

Internal bond strength of the composite product can be measured by pulling the composite apart in a direction perpendicular to the plane formed by the test piece. The internal bond strength and/or the water absorption of the finished product can be measured according to ASTM D1037-96a. Swell due to water absorption can be measured by measuring the thickness of the finished product before and after the water absorption test. The temperature of the lignocellulose substrates can be measured using any type of thermocouple or other temperature sensing device. For example, the temperature of the lignocellulose substrates can be measured using an infrared temperature sensor.

In one embodiment, the manufacture of a composite product can include combining a core, a first outer layer, a second outer layer, and a binder to produce a mixture and heating the mixture to produce a composite lignocellulose product. The mixture can include the binder disposed on at least a portion of each of the core, the first outer layer, and the second outer layer. For example, the binder can be disposed between the first outer layer and the first side of the core and between the second outer layer and the second side of the core. The composite product can include the at least partially cured binder, the first outer layer bonded to a first side of the core by the binder and the second outer layer bonded to a second side of the core by the at least partially cured binder. The first side and the second side of the core oppose one another. Each of the core, the first outer layer, and the second outer layer can independently include a lignocellulose substrate (e.g., veneer or wood sheet) or material having a water content of about 10 wt % to about 40 wt %, based on a dried weight of the lignocellulose substrates. Each of the first binder and the second binder, prior to curing, can independently include: a urea-modified aldehyde-based resin in an amount of about 90 wt % to about 99.5 wt % and an isocyanate-based resin in an amount of about 0.5 wt % to about 10 wt %, based on a combined solids weight of the urea-modified aldehyde-based resin and the isocyanate-based resin.

In some embodiments, the composite product can include the plurality of lignocellulose substrates and one or more binders disposed on at least a portion of each lignocellulose substrate. The lignocellulose substrates can have a water content of about 10 wt % to about 40 wt %, based on a dried weight of the lignocellulose substrates. In some embodiments, the binder can include about 30 wt % to about 40 wt % of solids that can include the urea-modified aldehyde-based resin, about 0.1 wt % to about 3 wt % of the isocyanate-based resin, about 0.1 wt % to about 12 wt % of the extender, and about 50 wt % to about 62 wt % of water, where all weight percent values are based on a total weight of the binder. In other embodiments, the binder can include the urea-modified aldehyde-based resin in an amount of about 90 wt % to about 99.5 wt %, the isocyanate-based resin in an amount of about 0.5 wt % to about 10 wt %, the extender in an amount of about 3 wt % to about 20 wt %, and water in an amount of about 145 wt % to about 230 wt %, based on a combined solids weight of the urea-modified aldehyde-based resin and the isocyanate-based resin. The binder can have a pH of about 10.5 to about 13.0 and can have a viscosity of about 200 cP to about 10,000 cP, about 500 cP to about 9,000 cP, about 1,000 to about 8,700 cP, about 1,100 cP to about 7,000 cP, about 1,200 cP to about 6,600 cP, about 1,000 cP to about 3,500 cP, about 900 cP to about 3,000 cP, about 800 cP to about 2,000 cP, or about 700 cP to about 1,500 cP at a temperature of about 25° C. upon formation of the binder.

In one or more embodiments, the composite products made with the binder can be structural products. The structural products can be formed by bonding a plurality of lignocellulose substrates together with the binder to provide a structural product for use as a structural member or support in the construction of floors, walls, roofs, and other structural components. As such, the binder or composite products made therewith can satisfy any one or more of the following standardized tests: ASTM D2559-12a(2018), Standard Specification for Adhesives for bonded Structural Wood Products for Use under Exterior Exposure Conditions; ASTM D3737-18e1, Standard Practice for Establishing Allowable Properties for Structural Glued Laminated Timber (Glulam); ASTM D5456-19, Standard Specification for Evaluation of Structural Composite Lumber Products; ASTM D5764-97a(2018), Standard Test Method for Evaluating Dowel-Bearing Strength of Wood and Wood-based Products; ASTM D6815-09(2015), Standard Specification for Evaluation of Duration of Load and Creep Effects of Wood and Wood-Based Products; ASTM D7247-17 Standard Test Method for Evaluating the Shear Strength of Adhesive Bonds in Laminated Wood Products of Elevated temperatures; ASTM D3535-07a(2013) Standard Test Method for Resistance to creep Under Static Loading for Structural Wood Laminating Adhesives Used Under Exterior Exposure Conditions; CSA 0112.9 (2014) Evaluation of Adhesives for Structural Wood Products (Exterior Exposure); and/or CSA 0112.10-2008 (R2017) Evaluation of Adhesives for Structural Wood Products (Limited Moisture Exposure). In some embodiments, the composite lignocellulose product can be a structural composite lumber. The structural composite lumber can be laminated veneer lumber, parallel strand lumber, and/or laminated strand lumber.

EXAMPLES

In order to provide a better understanding of the foregoing discussion, the following non-limiting examples are offered. Although the examples may be directed to specific examples, they are not to be viewed as limiting the invention in any specific respect. All parts, proportions, and percentages are by weight unless otherwise indicated.

In Examples (Exs.) 1-50 and Comparative Examples (CExs.) 1-11, the phenol-formaldehyde resin was GPR 5815 resin, commercially available from Georgia-Pacific Chemicals LLC in South America. The phenol-formaldehyde resin had a formaldehyde to phenol molar ratio of about 2.35:1, a solids content of about 42 wt % to about 45 wt % (e.g., about 43.5 wt %), a pH of about 11 to about 12, and a viscosity of about 350 cP to about 800 cP at a temperature of about 25° C., a density of about 1.175 g/cm$^3$ to about 1.195 g/cm$^3$, a free formaldehyde content of about 0.3% or less, a gel time of about 10 minutes to about 18 minutes, and an alkalinity of about 5.5 to about 6.5. The surfactant was the nonionic wetting agent and molecular defoamer SURFYNOL® 104E, commercially available from Air Products, Inc. The surfactant contained ethylene glycol and 2,4,7,9-tetramethyl-5-decyne-4,7-diol. The surfactant was a clear to pale yellow liquid, had an activity of about 50%, a viscosity of about 100 mPa·s at a temperature of about 20° C., a specific gravity of about 1 at a temperature of about 21° C., a flash point of about 111° C., and a pour point of about −17° C. The pMDI was DESMODUR® 44V20L resin, commercially available from Covestro. The pMDI was a liquid, dark brown polymeric isocyanate based on 4,4'-methylene diphenyl diisocyanate with isomers and homologues of higher functionality. The pMDI had an NCO content of about 30.5 wt % to about 32.5 wt %, a viscosity of about 160 cP to about 240 cP at a temperature of about 25° C., a density of about 1.23 g/cm$^3$, a maximum phenylisocyanate content of 50 ppm, and a specific heat of about 1.51 kJ/kgK.

The viscosity of the binders made in Exs 1-50 and CEx 1-11 were determined at a temperature of about 25° C. using a Model DV-II+ viscometer, commercially available from Brookfield Company, Inc., with a number 3 spindle. The binders made in Exs 1-50 and CEx 1-11 were maintained in a water bath at a temperature of about 25° C., during the 30 days after formation of the respective binder. The binders were periodically stirred when stored to reduce or prevent phase separation of the respective binder.

Examples 1-10—Binder Compositions

For Exs. 1-10, each binder was prepared according to the following procedure. To a blend tank equipped with an agitator, about 143 g of water and about 670 g of phenol-formaldehyde resin were added. The agitator was started. To the blend tank, in the following order and time frame: about 77 g of total extender (wheat flour and/or corn flour per respective example, as listed in Table 1) was added over about 2 min to about 5 min; about 2 g of soda ash was added over about 0.1 min to about 1 min; about 55 g of total filler (olive pit flour and/or walnut shell flour per respective example, as listed in Table 1) was added over about 2 min to about 5 min; about 1 g of the surfactant was added over about 0.1 min to about 1 min; and about 32 g of aqueous sodium hydroxide solution (about 50 wt % of solid sodium hydroxide and about 50 wt % of water) was added over about 2 min to about 4 min. The components of the binder were mixed at a temperature of about 15° C. to about 40° C. The mixture was agitated for about 2 min to about 3 min, then agitation was stopped. To the mixture, about 10 g of pMDI was added over about 1 min to about 3 min. The agitator was started. To the mixture, about 10 g of water was added over about 1 min to about 5 min, then agitation was stopped, and the mixture, i.e., the binder composition, was discharged into a container.

The binder composition of Exs. 1-10 contained about 96.7 wt % of phenol-formaldehyde resin solids, about 3.3 wt % of pMDI solids, about 25.5 wt % of total extender, about 18.2 wt % of total filler, and about 181.6 wt % of water, based on a combined solids weight of the phenol-formaldehyde resin and the pMDI. As such, the binder compositions had a solids content of about 44.2 wt % and a water content of about 55.8 wt %, based on the total weight of the binder. The binders of Exs. 1-10 all had a pH of about 11.5 to about 12.3 at a temperature of about 25° C.

TABLE 1

Binder Compositions for Examples 1-10

| | Extenders | | Fillers | |
|---|---|---|---|---|
| Ex. | Wheat Flour (wt %)[1] | Corn Flour (wt %)[1] | Olive Pit Flour (wt %)[2] | Walnut Shell Flour (wt %)[2] |
| 1 | 100 | 0 | 0 | 100 |
| 2 | 75 | 25 | 0 | 100 |
| 3 | 50 | 50 | 0 | 100 |
| 4 | 25 | 75 | 0 | 100 |
| 5 | 0 | 100 | 0 | 100 |
| 6 | 100 | 0 | 100 | 0 |
| 7 | 75 | 25 | 100 | 0 |
| 8 | 50 | 50 | 100 | 0 |
| 9 | 25 | 75 | 100 | 0 |
| 10 | 0 | 100 | 100 | 0 |

[1]wt % based on the combined weight of the corn and wheat flours
[2]wt % based on the combined weight of the olive pit and walnut shell flours Examples 1-10—Binder Viscosities For the binders of Exs. 1-10, the viscosity was measured and recorded at a temperature of 25° C. on the referenced days for each respective example, as listed in Table 2, starting immediately after the binder was formed (Day 1). Accordingly, the viscosity values on Day 2 were measured 24 hours after the binder was formed, the viscosity values on Day 3 were measured 48 hours after the binder was formed, and so on with each subsequent day adding another 24 hours of time.

TABLE 2

Binder Viscosities (cP) for Examples 1-10

| | Days | | | | | | | | |
|---|---|---|---|---|---|---|---|---|---|
| Ex. | 1 | 2 | 4 | 8 | 9 | 10 | 11 | 12 | 15 |
| 1 | 1093 | 2130 | 2580 | 2660 | 3020 | 3047 | 3233 | 3467 | 3740 |
| 2 | 745 | 1450 | 1597 | 1737 | 1913 | 2013 | 2117 | 2173 | 2457 |
| 3 | 600 | 1050 | 1192 | 1337 | 1457 | 1457 | 1567 | 1553 | 1850 |
| 4 | 441 | 693 | 723 | 846 | 874 | 865 | 950 | 976 | 1155 |
| 5 | 330 | 416 | 450 | 502 | 588 | 586 | 582 | 604 | 687 |
| 6 | 638 | 1423 | 1727 | 1787 | — | 1930 | — | — | 2020 |
| 7 | 621 | 1145 | 1240 | 1417 | — | 1440 | — | — | 1523 |
| 8 | 444 | 716 | 781 | 886 | — | 911 | — | — | 1027 |
| 9 | 369 | 518 | 533 | 577 | — | 632 | — | — | 680 |
| 10 | 286 | 348 | 339 | 375 | — | 401 | — | — | 407 |

| | Days | | | | | |
|---|---|---|---|---|---|---|
| Ex. | 16 | 17 | 19 | 22 | 23 | 26 | 30 |
| 1 | 3760 | 3967 | 4037 | — | — | — | — |
| 2 | 2420 | 2500 | 2630 | 2800 | 2927 | 3193 | 3360 |
| 3 | 1937 | 1920 | 1907 | 2020 | 2163 | 2420 | 2780 |
| 4 | 1197 | 1190 | 1250 | 1360 | 1377 | 1587 | 1867 |
| 5 | 692 | 738 | 760 | 800 | 845 | 905 | 969 |
| 6 | — | 2013 | 2087 | 2162 | — | 2242 | 2404 |
| 7 | — | 1523 | 1567 | 1605 | — | 1662 | 1800 |
| 8 | — | 987 | 1075 | 1101 | — | 1141 | 1278 |
| 9 | — | 697 | 731 | 761 | — | 795 | 875 |
| 10 | — | 407 | 449 | 460 | — | 481 | 568 |

Surprisingly and unexpectedly, the binders of Exs. 1-10 all maintained a viscosity of less than 3,500 cP at a temperature of about 25° C. for at least 12 days after formation of the binders.

Examples 11-20—Binder Compositions

For Exs. 12-20, each binder was prepared according to the following procedure. To a blend tank equipped with an agitator, about 134 g of water and about 670 g of phenol-formaldehyde resin were added. The agitator was started. To the mixture, in the following order and time frame: about 71 g of total extenders (wheat flour and/or corn flour per respective example, as listed in Table 3) was added over about 2 min to about 5 min; about 2 g of soda ash was added over about 0.1 min to about 1 min; about 50 g of total fillers (olive pit flour and/or walnut shell flour per respective example, as listed in Table 3) was added over about 2 min to about 5 min; about 1 g of surfactant was added over about 0.1 min to about 1 min; and about 32 g of aqueous sodium hydroxide solution (about 50 wt % of solid sodium hydroxide and about 50 wt % of water) was added over about 2 min to about 4 min. The components of the binder were mixed at a temperature of about 15° C. to about 40° C. The mixture was agitated for about 2 min to about 3 min, then agitation was stopped. To the mixture, about 20 g of pMDI was added over about 1 min to about 3 min. The agitator was started. To the mixture, about 20 g of water was added over about 1 min to about 5 min, then agitation was stopped, and the mixture, i.e., the binder composition, was discharged into a container.

The binder composition of Exs. 11-20 contained about 93.6 wt % of phenol-formaldehyde resin solids, about 6.4 wt % of pMDI solids, about 22.8 wt % of total extender, about 16.1 wt % of total filler, and about 176.1 wt % of water, based on a combined solids weight of the phenol-formaldehyde resin and the pMDI. As such, the binder compositions had a solids content of about 44.1 wt % and a water content of about 55.9 wt %, based on the total weight of the binder. The binders of Exs. 11-20 all had a pH of about 11.5 to about 12.3 at a temperature of about 25° C.

TABLE 3

Binder Compositions for Examples 11-20

| | Extenders | | Fillers | |
|---|---|---|---|---|
| Ex. | Wheat Flour (wt %)[1] | Corn Flour (wt %)[1] | Olive Pit Flour (wt %)[2] | Walnut Shell Flour (wt %)[2] |
| 11 | 100 | 0 | 0 | 100 |
| 12 | 75 | 25 | 0 | 100 |
| 13 | 50 | 50 | 0 | 100 |
| 14 | 25 | 75 | 0 | 100 |
| 15 | 0 | 100 | 0 | 100 |
| 16 | 100 | 0 | 100 | 0 |
| 17 | 75 | 25 | 100 | 0 |
| 18 | 50 | 50 | 100 | 0 |
| 19 | 25 | 75 | 100 | 0 |
| 20 | 0 | 100 | 100 | 0 |

[1] wt % based on the combined weight of the corn and wheat flours
[2] wt % based on the combined weight of the olive pit and walnut shell flours Examples 11-20—Binder Viscosities For the binders of Exs. 11-20, the viscosity was measured and recorded at a temperature of 25° C. on the referenced days for each respective example, as listed in Table 4, starting immediately after the binder was formed (Day 1). Accordingly, the viscosity values on Day 2 were measured 24 hours after the binder was formed, the viscosity values on Day 3 were measured 48 hours after the binder was formed, and so on with each subsequent day adding another 24 hours of time.

TABLE 4

Binder Viscosities (cP) for Examples 11-20

| | Days | | | | | | | | | | |
|---|---|---|---|---|---|---|---|---|---|---|---|
| Ex. | 1 | 2 | 3 | 4 | 7 | 8 | 9 | 10 | 11 | 14 | 15 |
| 11 | 1340 | — | 2773 | — | 3220 | 3393 | 3400 | 3813 | 4053 | — | — |
| 12 | 1275 | — | 2560 | — | 3060 | 3427 | 3540 | 3767 | 3920 | 4100 | — |
| 13 | 703 | — | 1220 | — | 1443 | 1533 | 1540 | 1667 | 1697 | 1950 | 2110 |
| 14 | 510 | — | 768 | — | 885 | 905 | 940 | 1080 | 1123 | 1300 | 1390 |
| 15 | 351 | — | 458 | — | 517 | 593 | 617 | 672 | 685 | 828 | 844 |
| 16 | 740 | 1477 | — | 1753 | — | 1907 | — | 2043 | — | — | 2230 |
| 17 | 621 | 1208 | — | 1423 | — | 1500 | — | 1717 | — | — | 1827 |
| 18 | 412 | 716 | — | 863 | — | 916 | — | 966 | — | — | 1017 |
| 19 | 337 | 508 | — | 544 | — | 608 | — | 642 | — | — | 701 |
| 20 | 263 | 322 | — | 329 | — | 362 | — | 383 | — | — | 411 |

| | Days | | | | | | | | | |
|---|---|---|---|---|---|---|---|---|---|---|
| Ex. | 16 | 17 | 18 | 19 | 21 | 22 | 25 | 26 | 29 | 30 |
| 11 | — | — | — | — | — | — | — | — | — | — |
| 12 | — | — | — | — | — | — | — | — | — | — |
| 13 | 2183 | — | 2290 | — | 2597 | 2887 | 3393 | — | 3787 | — |
| 14 | 1447 | — | 1593 | — | 1770 | 1870 | 2300 | — | 2523 | — |
| 15 | 835 | — | 928 | — | 1035 | 1103 | 1190 | — | 1485 | — |
| 16 | — | 2200 | — | 2353 | — | 2408 | — | 2490 | — | 2602 |
| 17 | — | 1830 | — | 1850 | — | 1890 | — | 1925 | — | 1946 |
| 18 | — | 1043 | — | 1097 | — | 1111 | — | 1136 | — | 1190 |
| 19 | — | 713 | — | 770 | — | 832 | — | 841 | — | 867 |
| 20 | — | 421 | — | 438 | — | 449 | — | 490 | — | 504 |

Surprisingly and unexpectedly, the binders of Exs. 11-20 all maintained a viscosity of less than 3,500 cP at a temperature of about 25° C. for at least 8 days after formation of the binders.

Examples 21-30—Binder Compositions

For Exs. 21-30, each binder was prepared according to the following procedure. To a blend tank equipped with an agitator, about 125 g of water and about 670 g of phenol-formaldehyde resin were added. The agitator was started. To the mixture, in the following order and time frame: about 64 g of total extenders (wheat flour and/or corn flour per respective example, as listed in Table 5) was added over about 2 min to about 5 min; about 2 g of soda ash was added over about 0.1 min to about 1 min; about 45 g of total fillers (olive pit flour and/or walnut shell flour per respective example, as listed in Table 5) was added over about 2 min to about 5 min; about 1 g of surfactant was added over about 0.1 min to about 1 min; and about 32 g of aqueous sodium hydroxide solution (about 50 wt % of solid sodium hydroxide and about 50 wt % of water) was added over about 2 min to about 4 min. The components of the binder were mixed at a temperature of about 15° C. to about 40° C. The mixture was agitated for about 2 min to about 3 min, then agitation was stopped. To the mixture, about 30 g of pMDI was added over about 1 min to about 3 min. The agitator was started. To the mixture, about 30 g of water was added over about 1 min to about 5 min, then agitation was stopped, and the mixture, i.e., the binder composition, was discharged into a container.

The binder composition of Exs. 21-30 contained about 90.7 wt % of phenol-formaldehyde resin solids, about 9.3 wt % of pMDI solids, about 19.9 wt % of total extender, about 14.0 wt % of total filler, and about 171.0 wt % of water, based on a combined solids weight of the phenol-formaldehyde resin and the pMDI. As such, the binder compositions had a solids content of about 43.9 wt % and a water content of about 56.1 wt %, based on the total weight of the binder. The binders of Exs. 21-30 all had a pH of about 11.5 to about 12.3 at a temperature of about 25° C.

TABLE 5

Binder Compositions for Examples 21-30

| | Extenders | | Fillers | |
|---|---|---|---|---|
| Ex. | Wheat Flour (wt %)[1] | Corn Flour (wt %)[1] | Olive Pit Flour (wt %)[2] | Walnut Shell Flour (wt %)[2] |
| 21 | 100 | 0 | 0 | 100 |
| 22 | 75 | 25 | 0 | 100 |
| 23 | 50 | 50 | 0 | 100 |
| 24 | 25 | 75 | 0 | 100 |
| 25 | 0 | 100 | 0 | 100 |
| 26 | 100 | 0 | 100 | 0 |
| 27 | 75 | 25 | 100 | 0 |
| 28 | 50 | 50 | 100 | 0 |
| 29 | 25 | 75 | 100 | 0 |
| 30 | 0 | 100 | 100 | 0 |

[1]wt % based on the combined weight of the corn and wheat flours
[2]wt % based on the combined weight of the olive pit and walnut shell flours Examples 21-30—Binder Viscosities For the binders of Exs. 21-30, the viscosity was measured and recorded at a temperature of 25° C. on the referenced days for each respective example, as listed in Table 6, starting immediately after the binder was formed (Day 1). Accordingly, the viscosity values on Day 2 were measured 24 hours after the binder was formed, the viscosity values on Day 3 were measured 48 hours after the binder was formed, and so on with each subsequent day adding another 24 hours of time.

TABLE 6

Binder Viscosities (cP) for Examples 21-30

| | Days | | | | | | | | |
|---|---|---|---|---|---|---|---|---|---|
| Ex. | 1 | 3 | 4 | 7 | 8 | 9 | 10 | 11 | 14 |
| 21 | 1178 | 3490 | 4120 | — | — | — | — | — | — |
| 22 | 780 | 1850 | — | 2290 | 2630 | 2887 | 3133 | 3447 | 4340 |
| 23 | 630 | 1317 | — | 1510 | 1847 | 1930 | 2117 | 2400 | 3073 |
| 24 | 437 | 745 | — | 934 | 1050 | 1122 | 1195 | 1322 | 1643 |
| 25 | 335 | 487 | — | 504 | 602 | 670 | 740 | 845 | 997 |
| 26 | 650 | 1720 | — | 2007 | — | 2150 | — | — | 2303 |
| 27 | 569 | 1283 | — | 1410 | — | 1520 | — | — | 1760 |
| 28 | 394 | 753 | — | 836 | — | 930 | — | — | 993 |
| 29 | 331 | 492 | — | 558 | — | 600 | — | — | 673 |
| 30 | 260 | 309 | — | 325 | — | 349 | — | — | 384 |

| | Days | | | | | | | | |
|---|---|---|---|---|---|---|---|---|---|
| Ex. | 15 | 16 | 18 | 21 | 22 | 25 | 26 | 29 | 30 |
| 21 | — | — | — | — | — | — | — | — | — |
| 22 | — | — | — | — | — | — | — | — | — |
| 23 | 3513 | 3707 | 4087 | — | — | — | — | — | — |
| 24 | 1690 | 1837 | 2073 | 2450 | 2880 | 3547 | — | 4237 | — |
| 25 | 1145 | 1183 | 1373 | 1693 | 1903 | 2287 | — | 3087 | — |
| 26 | — | 2520 | 2753 | 2980 | — | — | 3540 | — | 4010 |
| 27 | — | 1887 | 2043 | 2343 | — | — | 2621 | — | 3024 |
| 28 | — | 1000 | 1037 | 1102 | — | — | 1257 | — | 1556 |
| 29 | — | 680 | 757 | 789 | — | — | 876 | — | 934 |
| 30 | — | 414 | 447 | 498 | — | — | 579 | — | 646 |

Surprisingly and unexpectedly the binders of Exs. 22-30 all maintained a viscosity of less than 3,500 cP at a temperature of about 25° C. for at least 3 days after formation of the binders.

Examples 31-40—Binder Compositions

For Exs. 31-40, each binder was prepared according to the following procedure. To a blend tank equipped with an agitator, about 117 g of water and about 670 g of phenol-formaldehyde resin were added. The agitator was started. To the mixture, in the following order and time frame: about 57 g of total extenders (wheat flour and/or corn flour per respective example, as listed in Table 7) was added over about 2 min to about 5 min; about 2 g of soda ash was added over about 0.1 min to about 1 min; about 41 g of total fillers (olive pit flour and/or walnut shell flour per respective example, as listed in Table 7) was added over about 2 min to about 5 min; about 1 g of surfactant was added over about 0.1 min to about 1 min; and about 32 g of aqueous sodium hydroxide solution (about 50 wt % of solid sodium hydroxide and about 50 wt % of water) was added over about 2 min to about 4 min. The components of the binder were mixed at a temperature of about 15° C. to about 40° C. The mixture was agitated for about 2 min to about 3 min, then agitation was stopped. To the mixture, about 40 g of pMDI was added over about 1 min to about 3 min. The agitator was started. To the mixture, about 40 g of water was added over about 1 min to about 5 min, then agitation was stopped, and the mixture, i.e., the binder composition, was discharged into a container.

The binder composition of Exs. 31-40 contained about 87.9 wt % of phenol-formaldehyde resin solids, about 12.1 wt % of pMDI solids, about 17.2 wt % of total extender, about 12.4 wt % of total filler, and about 166.4 wt % of water, based on a combined solids weight of the phenol-formaldehyde solids and the pMDI. As such, the binder compositions had a solids content of about 43.8 wt % and a water content of about 56.2 wt %, based on the total weight of the binder. The binders of Exs. 31-40 all had a pH of about 11.5 to about 12.3 at a temperature of about 25° C.

TABLE 7

Binder Compositions for Examples 31-40

| | Extenders | | Fillers | |
|---|---|---|---|---|
| Ex. | Wheat Flour (wt %)[1] | Corn Flour (wt %)[1] | Olive Pit Flour (wt %)[2] | Walnut Shell Flour (wt %)[2] |
| 31 | 100 | 0 | 0 | 100 |
| 32 | 75 | 25 | 0 | 100 |
| 33 | 50 | 50 | 0 | 100 |
| 34 | 25 | 75 | 0 | 100 |
| 35 | 0 | 100 | 0 | 100 |
| 36 | 100 | 0 | 100 | 0 |
| 37 | 75 | 25 | 100 | 0 |
| 38 | 50 | 50 | 100 | 0 |
| 39 | 25 | 75 | 100 | 0 |
| 40 | 0 | 100 | 100 | 0 |

[1]wt % based on the combined weight of the corn and wheat flours
[2]wt % based on the combined weight of the olive pit and walnut shell flours Examples 31-40—Binder Viscosities For the binders of Exs. 31-40, the viscosity was measured and recorded at a temperature of 25° C. on the referenced days for each respective example, as listed in Table 8, starting immediately after the binder was formed (Day 1). Accordingly, the viscosity values on Day 2 were measured 24 hours after the binder was formed, the viscosity values on Day 3 were measured 48 hours after the binder was formed, and so on with each subsequent day adding another 24 hours of time.

TABLE 8

Binder Viscosities (cP) for Examples 31-40

| | Days | | | | | | | | |
|---|---|---|---|---|---|---|---|---|---|
| Ex. | 1 | 3 | 6 | 7 | 8 | 9 | 10 | 13 | 14 |
| 31 | 1467 | 3673 | 5500 | — | — | — | — | — | — |
| 32 | 980 | 2250 | 3020 | 3627 | 4217 | — | — | — | — |
| 33 | 695 | 1350 | 1530 | 2030 | 2300 | 2597 | 3240 | 4513 | — |
| 34 | 490 | 804 | 946 | 1160 | 1210 | 1373 | 1617 | 2230 | 2503 |
| 35 | 374 | 564 | 646 | 736 | 762 | 874 | 1047 | 1413 | 1597 |
| 36 | 540 | 1793 | — | 2210 | — | 2567 | — | — | 3033 |
| 37 | 501 | 1232 | — | 1557 | — | 1770 | — | — | 2060 |
| 38 | 394 | 881 | — | 1003 | — | 1127 | — | — | 1357 |
| 39 | 298 | 502 | — | 581 | — | 648 | — | — | 810 |
| 40 | 250 | 339 | — | 394 | — | 431 | — | — | 515 |

| | Days | | | | | | | | |
|---|---|---|---|---|---|---|---|---|---|
| Ex. | 15 | 16 | 17 | 18 | 20 | 21 | 22 | 26 | 30 |
| 31 | — | — | — | — | — | — | — | — | — |
| 32 | — | — | — | — | — | — | — | — | — |
| 33 | — | — | — | — | — | — | — | — | — |
| 34 | 2940 | — | 3360 | — | 4560 | — | — | — | — |
| 35 | 1853 | — | 2260 | — | 3060 | 3533 | 4087 | — | — |
| 36 | — | 3307 | — | 3727 | — | 4433 | — | — | — |
| 37 | — | 2293 | — | 2567 | — | 2976 | — | 3942 | 4765 |
| 38 | — | 1473 | — | 1707 | — | 1978 | — | 2495 | 3022 |
| 39 | — | 903 | — | 1033 | — | 1200 | — | 1506 | 1999 |
| 40 | — | 575 | — | 652 | — | 828 | — | 1102 | 1431 |

Surprisingly and unexpectedly the binders of Exs. 31-40 all maintained a viscosity of less than 3,500 cP at a temperature of about 25° C. for at least 1 day after formation of the binders.

Examples 41-50—Binder Compositions

For Exs. 41-50, each binder was prepared according to the following procedure. To a blend tank equipped with an agitator, about 108 g of water and about 670 g of phenol-formaldehyde resin were added. The agitator was started. To the mixture, in the following order and time frame: about 51 g of total extenders (wheat flour and/or corn flour per respective example, as listed in Table 9) was added over about 2 min to about 5 min; about 2 g of soda ash was added over about 0.1 min to about 1 min; about 36 g of total fillers (olive pit flour and/or walnut shell flour per respective example, as listed in Table 9) was added over about 2 min to about 5 min; about 1 g of surfactant was added over about 0.1 min to about 1 min; and about 32 g of aqueous sodium hydroxide solution (about 50 wt % of solid sodium hydroxide and about 50 wt % of water) was added over about 2 min to about 4 min. The components of the binder were mixed at a temperature of about 15° C. to about 40° C. The mixture was agitated for about 2 min to about 3 min, then agitation was stopped. To the mixture, about 50 g of pMDI was added over about 1 min to about 3 min. The agitator was started. To the mixture, about 50 g of water was added over about 1 min to about 5 min, then agitation was stopped, and the mixture, i.e., the binder composition, was discharged into a container.

The binder composition of Exs. 41-50 contained about 85.4 wt % of phenol-formaldehyde resin solids, about 14.6 wt % of the pMDI solids, about 14.9 wt % of total extender, about 10.5 wt % of total filler, and about 161.8 wt % of water, based on a combined solids weight of the phenol-formaldehyde resin and the pMDI. As such, the binder compositions had a solids content of about 43.7 wt % and a water content of about 56.3 wt %, based on the total weight of the binder. The binders of Exs. 41-50 all had a pH of about 11.5 to about 12.3 at a temperature of about 25° C.

TABLE 9

Binder Compositions for Examples 41-50

| | Extenders | | Fillers | |
|---|---|---|---|---|
| Ex. | Wheat Flour (wt %)[1] | Corn Flour (wt %)[1] | Olive Pit Flour (wt %)[2] | Walnut Shell Flour (wt %)[2] |
| 41 | 100 | 0 | 0 | 100 |
| 42 | 75 | 25 | 0 | 100 |
| 43 | 50 | 50 | 0 | 100 |
| 44 | 25 | 75 | 0 | 100 |
| 45 | 0 | 100 | 0 | 100 |
| 46 | 100 | 0 | 100 | 0 |
| 47 | 75 | 25 | 100 | 0 |
| 48 | 50 | 50 | 100 | 0 |
| 49 | 25 | 75 | 100 | 0 |
| 50 | 0 | 100 | 100 | 0 |

[1] wt % based on the combined weight of the corn and wheat flours
[2] wt % based on the combined weight of the olive pit and walnut shell flours Examples 41-50—Binder Viscosities For the binders of Exs. 41-50, the viscosity was measured and recorded at a temperature of 25° C. on the referenced days for each respective example, as listed in Table 10, starting immediately after the binder was formed (Day 1). Accordingly, the viscosity values on Day 2 were measured 24 hours after the binder was formed, the viscosity values on Day 3 were measured 48 hours after the binder was formed, and so on with each subsequent day adding another 24 hours of time.

TABLE 10

Binder Viscosities (cP) for Examples 41-50

| | Days | | | | | | | |
|---|---|---|---|---|---|---|---|---|
| Ex. | 1 | 3 | 5 | 6 | 7 | 8 | 9 | 10 |
| 41 | 1390 | 6400 | — | — | — | — | — | — |
| 42 | 951 | 3513 | — | 5480 | — | — | — | — |
| 43 | 625 | 1750 | — | 3033 | 3667 | 4303 | — | — |
| 44 | 417 | 948 | — | 1240 | 1587 | 2030 | 2317 | 3060 |
| 45 | 365 | 623 | — | 875 | 1061 | 1212 | 1533 | 1837 |
| 46 | 656 | — | 2827 | — | 3280 | — | — | — |
| 47 | 462 | — | 1833 | — | 1860 | — | — | — |
| 48 | 399 | — | 1265 | — | 1200 | — | — | — |
| 49 | 318 | — | 673 | — | 703 | — | — | — |
| 50 | 263 | — | 408 | — | 453 | — | — | — |

| | Days | | | | | | |
|---|---|---|---|---|---|---|---|
| Ex. | 12 | 13 | 14 | 16 | 18 | 21 | 26 | 30 |
| 41 | — | — | — | — | — | — | — | — |
| 42 | — | — | — | — | — | — | — | — |

TABLE 10-continued

Binder Viscosities (cP) for Examples 41-50

| | | | | | | | | |
|---|---|---|---|---|---|---|---|---|
| 43 | — | — | — | — | — | — | — | — |
| 44 | — | 6800 | — | — | — | — | — | — |
| 45 | — | 3187 | 4207 | — | — | — | — | — |
| 46 | 4680 | — | — | — | — | — | — | — |
| 47 | 2895 | — | 3333 | 4370 | — | — | — | — |
| 48 | 1693 | — | 2263 | 2933 | 3811 | 4990 | — | — |
| 49 | 1000 | — | 1222 | 1513 | 2002 | 2778 | 4265 | — |
| 50 | 596 | — | 728 | 938 | 1222 | 1668 | 2877 | 3869 |

Surprisingly and unexpectedly the binders of Exs. 41-50 all maintained a viscosity of less than 3,500 cP at a temperature of about 25° C. for at least 1 day.

Comparative Examples 1-6—Binder Compositions

For CExs. 1-6, each binder was prepared according to the following procedure. Binder compositions were made that did not include an extender or a filler, but varied the amount of pMDI throughout the comparative examples. For each of CEx. 1-6, to a blend tank equipped with an agitator, 1,000 g, 990 g, 980 g, 970 g, 960 g, and 950 g, respectively, of phenol-formaldehyde resin (about 43.5 wt % phenol-formaldehyde resin solids) were added to the blend tank. The agitator was started. To the mixture, in the following order and time frame: The components of the binder were mixed at a temperature of about 15° C. to about 40° C. The mixture was agitated for about 2 min to about 3 min, then agitation was stopped. To the mixture, pMDI (none for CEx. 1; about 10 g for CEx. 2; about 20 g for CEx. 3; about 30 g for CEx. 4; about 40 g for CEx. 5; and about 50 g for CEx. 6) was added over about 1 min to about 3 min. The mixture was agitated for about 1 min to about 5 min, then agitation was stopped, and the mixture, i.e., the binder composition, was discharged into a container. The binder composition of CExs. 1-6 contained about 53 wt % of water to about 57 wt % of water, based on the combined weight of the phenol-formaldehyde resin solids, the pMDI solids, and water. The binders of CExs. 1-6 all had a pH of about 11.5 to about 12.3 at a temperature of about 25° C.

TABLE 11

Binder Compositions for CExs. 1-6

| CEx. | PF Resin (wt %)[1] | pMDI (wt %)[1] | Water Content (wt %)[2] |
|---|---|---|---|
| 1 | 100 | 0 | 56.5 |
| 2 | 97.7 | 2.3 | 55.9 |
| 3 | 95.5 | 4.5 | 55.4 |
| 4 | 93.4 | 6.6 | 54.8 |

TABLE 11-continued

Binder Compositions for CExs. 1-6

| CEx. | PF Resin (wt %)[1] | pMDI (wt %)[1] | Water Content (wt %)[2] |
|---|---|---|---|
| 5 | 91.3 | 8.7 | 54.2 |
| 6 | 89.2 | 10.8 | 53.6 |

[1]wt % based on the combined solids weight of the PF resin and the pMDI
[2]wt % based on the combined weight of water, PF resin solids, and pMDI solids Comparative Examples 1-6—Binder Viscosities For the binders of CExs. 1-6, the viscosity was measured and recorded at a temperature of 25° C. on the referenced days for each respective example, as listed in Table 12, starting immediately after the binder was formed (Day 1). Accordingly, the viscosity values on Day 2 were measured 24 hours after the binder was formed, the viscosity values on Day 3 were measured 48 hours after the binder was formed, and so on with each subsequent day adding another 24 hours of time.

TABLE 12

Binder Viscosities (cP) for CExs. 1-6

| | Days | | | | | | | | | | | |
|---|---|---|---|---|---|---|---|---|---|---|---|---|
| CEx. | 1 | 2 | 3 | 6 | 7 | 8 | 9 | 10 | 13 | 14 | 15 | 30 |
| 1 | 1077 | 1135 | 1230 | 1640 | 1800 | 1963 | 2400 | 2463 | 3707 | 4320 | — | — |
| 2 | 1157 | 1398 | 1680 | 2260 | 2800 | 3270 | 3600 | 4460 | — | — | — | — |
| 3 | 1133 | 1694 | 2110 | 3660 | 4400 | — | — | — | — | — | — | — |
| 4 | 1025 | 2600 | 3892 | 8420 | — | — | — | — | — | — | — | — |
| 5 | 1022 | 3687 | 6700 | — | — | — | — | — | — | — | — | — |
| 6 | 910 | 4190 | — | — | — | — | — | — | — | — | — | — |

Comparative Examples 7-11—Binder Compositions

For CExs. 7-11, each binder was prepared according to the following procedure. Binder compositions were made that did not include an extender or a filler, but varied the amount of pMDI throughout the comparative examples. To a blend tank equipped with an agitator, about 1,475 g, about 1,423 g, about 1,373 g, about 1,328 g, and about 1,287 g of the phenol-formaldehyde resin (GPR 5815 resin that had a solids content of about 43.5 wt %) were added thereto for CExs. 7-11, respectively. The agitator was started and the phenol-formaldehyde resin was agitated for about 2 min to about 3 min, then agitation was stopped. To the blend tank, the pMDI resin (DESMODUR® 44V20L resin) was added over about 1 min to about 3 min (about 22 g for CEx. 7; about 42 g for CEx. 8; about 61 g for CEx. 9; about 79 g for CEx. 10; and about 96 g for CEx. 11). To the mixture, water was added over about 1 min to about 5 min (about 4 g for CEx. 7; about 34 g for CEx. 8; about 66 g for CEx. 9; about 93 g for CEx. 10; and about 117 g for CEx. 11), then agitation was stopped, and the mixture, i.e., the binder composition, was discharged into a container. The components of the binder were mixed at a temperature of about 15° C. to about 40° C. The binders of CExs. 7-11 all had a pH of about 11.3 at a temperature of about 25° C.

TABLE 13

Binder Compositions for CExs. 7-11

| CEx. | PF Resin (wt %)[1] | pMDI (wt %)[1] | Water Content (wt %)[2] |
|---|---|---|---|
| 7 | 96.7 | 3.3 | 55.8 |
| 8 | 93.6 | 6.4 | 55.9 |

TABLE 13-continued

Binder Compositions for CExs. 7-11

| CEx. | PF Resin (wt %)[1] | pMDI (wt %)[1] | Water Content (wt %)[2] |
|---|---|---|---|
| 9 | 80.7 | 9.3 | 56.1 |
| 10 | 87.9 | 12.1 | 56.2 |
| 11 | 85.4 | 14.6 | 56.3 |

[1]wt % based on the combined solids weight of the PF resin and the pMDI
[2]wt % based on the combined weight of water, PF resin solids, and pMDI solids Comparative Examples 7-11—Binder Viscosities For the binders of CExs. 7-11, the viscosity was measured and recorded at a temperature of 25° C. on the referenced days for each respective example, as listed in Table 14, starting immediately after the binder was formed (Day 1). Accordingly, the viscosity values on Day 2 were measured 24 hours after the binder was formed, the viscosity values on Day 3 were measured 48 hours after the binder was formed, and so on with each subsequent day adding another 24 hours of time.

TABLE 14

Binder Viscosities (cP) for CExs. 7-11

| CEx. | \multicolumn{12}{c}{Days} |
|---|---|---|---|---|---|---|---|---|---|---|---|---|

| CEx. | 1 | 2 | 3 | 6 | 7 | 8 | 9 | 10 | 13 | 14 | 20 | 28 |
|---|---|---|---|---|---|---|---|---|---|---|---|---|
| 7 | 323 | 390 | 451 | 489 | 577 | 634 | 698 | 755 | 831 | 998 | 1309 | 2423 |
| 8 | 270 | 405 | 501 | 599 | 750 | 849 | 1008 | 1244 | 1555 | 1810 | 2985 | 6253 |
| 9 | 230 | 370 | 689 | 888 | 1379 | 1654 | 2040 | 2601 | 3989 | 5620 | | |
| 10 | 195 | 420 | 600 | 2010 | 3813 | 5840 | | | | | | |
| 11 | 193 | 360 | 1308 | 4780 | | | | | | | | |

Example 51—Binder Composition

To a blend tank equipped with an agitator, about 14.56 g of water and about 60.76 g of phenol-formaldehyde resin were added therein. The agitator was started. To the mixture, in the following order and time frame: about 3.82 g of wheat flour was added over about 2 min to about 5 min; about 2.54 g of corn flour was added over about 2 min to about 5 min; about 0.37 g of soda ash was added over about 0.1 min to about 1 min; about 3.27 g of nutshell flour was added over about 2 min to about 5 min; about 3.27 g of olive pit flour was added over about 1 min to about 4 min; about 0.13 g of surfactant was added over about 0.1 min to about 1 min; and about 2.84 g of aqueous sodium hydroxide solution (about 50 wt % of solid sodium hydroxide and about 50 wt % of water) was added over about 2 min to about 4 min. The mixture was agitated for about 2 min to about 3 min, then agitation was stopped. To the mixture, about 4.23 g of pMDI was added over about 1 min to about 3 min. The agitator was started. To the mixture, about 4.23 g of water was added over about 1 min to about 5 min, then agitation was stopped, and the mixture was discharged into a container.

Table 15 provides a step-wise listing of the components and process used to make the binder described in Example 51. The components of the binder were mixed at a temperature of about 15° C. to about 40° C. The binder had a solids concentration of about 43 wt % to about 46 wt % and a pH of about 11.5 to about 12.3 at a temperature of about 25° C.

TABLE 15

Preparation of Binder Ex. 51

| Action | Component | Amount (g) | Time (min) |
|---|---|---|---|
| add | water | 14.56 | — |
| add | PF resin | 60.76 | — |
| start mix | start agitator | — | — |
| add | wheat flour | 3.82 | 2-5 |
| add | corn flour | 2.54 | 2-5 |
| add | soda ash | 0.37 | 1 or less |
| add | nutshell flour | 3.27 | 2-5 |
| add | olive pit flour | 3.27 | 1-4 |
| add | surfactant | 0.13 | 1 or less |
| add | caustic solution (50 wt %) | 2.84 | 2-4 |
| mix | continue mixing | — | 2-3 |
| stop mix | stop agitator | — | — |
| add | pMDI resin | 4.23 | 1-3 |
| start mix | start agitator | — | — |
| add | water | 4.23 | 1-5 |
| stop mix | stop agitator | — | — |

Example 52—Plywood Preparation

Plywood was made with the binder formulation of Ex. 51. The plywood was made as five ply using radiata pine veneer that had a thickness of about 3.2 mm and a moisture content of about 7 wt % to about 16 wt %. The binder spread was about 15 g/ft$^2$ and the binder was applied using an extruder, available from Raute Corporation. Five plies of the veneer were stacked and pressed in a Wabash press with a platen temperature of about 120° C. to about 135° C., at a pressure of about 0 MPa to about 1.2 MPa, and for about 4 min to about 8 min to produce the plywood.

The plywood had an IB (vacuum) of about 1.6 N/mm$^2$, an IB (boil) of about 1.5 N/mm$^2$, a wood failure of about 89%, a MOR of about 65 N/mm$^2$, a MOE of about 7,000 N/mm$^2$, a moisture content of about 9%, and a density of about 515 kg/m$^3$.

Examples 53-59 and Comparative Examples 12-18

Preparation and properties of another 14 binders, i.e., Exs. 53-59 and CExs. 12-18, which included higher resin solids as compared to the Examples above were prepared. More particularly, the additional 14 binders were prepared by mixing one of five resins (Resin 1, 2, 3, 4, or 5), wheat flour as an extender, corn cob residue as a filler, sodium hydroxide as a base compound, water, and pMDI.

Synthesis of Resin 1 (2.25 F/P mole ratio, 43% total solids, 0% urea, and 6% resin alkalinity). Phenol (2,560.3 g), a 50% aqueous formaldehyde solution (1,307.2 g), and water (2,118.8 g) were added to a 2.5 gal reactor equipped with a mechanical stirrer, cooling coils, a thermocouple, a heating mantle, and a reflux condenser. The contents of the reactor were stirred and the temperature was adjusted to about 50° C. A 50% aqueous NaOH solution (400.0 g) was added evenly over 25 minutes while the reaction temperature was allowed to increase to a temperature of about 68° C. An additional amount of the 50% aqueous formaldehyde solution (2,369.2 g) was added evenly over 45 minutes while the temperature was allowed to exotherm to about 95° C. After the additional 50% aqueous formaldehyde solution was added to the reactor, the reaction was held at a temperature of about 95° C. until a Gardner-Holdt viscosity of "CD" was reached and was then cooled to a temperature of about 85° C. over 10 minutes. An additional amount of the 50% aqueous NaOH solution (400 g) was added over 5 minutes. The reaction was stirred at a temperature of about 85° C. until a Gardner-Holdt viscosity of "TU" was reached. An additional amount of the 50% aqueous NaOH solution (400 g) was added and the reaction was stirred until a Gardner-Holdt viscosity of "WX" was reached. The reaction mixture was cooled to a temperature of about 60° C. over an additional 20 minutes, and water (445.5 g) was added over 5 min and the reaction was cooled to 25° C. over an additional 15 minutes to afford a final viscosity of about 634 cP and a % caustic of about 5.94.

Synthesis of Resin 2 (2.25 F/P mole ratio, 43% total solids, 8% urea, and 6% resin alkalinity). Phenol (2,172.8 g), a 50% aqueous formaldehyde solution (1,109.3 g), and water (1,907.2 g) were added to a 2.5 gal reactor equipped with a mechanical stirrer, cooling coils, a thermocouple, a heating mantle, and a reflux condenser. The contents of the reactor were stirred and the temperature was adjusted to about 50° C. A 50% aqueous NaOH solution (400 g) was added evenly over 25 minutes while the reaction temperature was allowed to increase to about 68° C. An additional amount of the 50% aqueous formaldehyde solution (2,010.7 g) was added evenly over 45 minutes while allowing the temperature to exotherm to about 95° C. After the additional 50% aqueous formaldehyde solution was added to the reactor, the reaction was held at a temperature of about 95° C. until a Gardner-Holdt viscosity of "E" was reached and was then cooled to a temperature of about 85° C. over 10 minutes. An additional amount of the 50% aqueous NaOH solution (400 g) was added over 5 minutes. At this point, urea prill (400 g) and water (400 g) were added over 10 minutes. The reaction was stirred at a temperature of about 85° C. until a Gardner-Holdt viscosity of "UV" was reached. An additional amount of the 50% aqueous NaOH solution (400.0 g) was added and the reaction was allowed to stir until a Gardner-Holdt viscosity of "YZ" was reached. At this point, additional urea prill (400.0 g) and water (400.0 g) were added over 10 minutes while the reaction mixture was cooled to 60° C. over an additional 15 minutes. The reaction was cooled to 25° C. over an additional 20 minutes to afford a final viscosity of about 722 cP and a % caustic of about 6.12.

Synthesis of Resin 3 (2.25 F/P mole ratio, 43% total solids, 4% urea, and 6% resin alkalinity). Phenol (1,183.3 g), a 50% aqueous formaldehyde solution (604.2 g), and water (1,117.6 g) were added to a 1.25 gal reactor equipped with a mechanical stirrer, cooling coils, a thermocouple, a heating mantle, and a reflux condenser. The contents of the reactor were stirred and the temperature was adjusted to about 50° C. A 50% aqueous NaOH solution (200 g) was added evenly over 25 minutes while the reaction temperature was allowed to increase to a temperature of about 68° C. An additional amount of the 50% aqueous formaldehyde solution (1,095 g) was added evenly over 45 minutes while allowing the temperature to exotherm to about 95° C. After the additional 50% aqueous formaldehyde solution was added to the reactor, the reaction was held at a temperature of about 95° C. until a Gardner-Holdt viscosity of "C" was reached and was then cooled to a temperature of about 85° C. over 10 minutes. An additional amount of the 50% aqueous NaOH solution (200 g) was added over 5 minutes. At this point, urea prill (100 g) and water (100 g) were added over 10 minutes. The reaction was stirred at a temperature of about 85° C. until a Gardner-Holdt viscosity of "TU" was reached. An additional amount of the 50% aqueous NaOH solution (200 g) was added and the reaction was stirred until a Gardner-Holdt viscosity of "W" was reached. At this point, urea prill (100 g) and water (100 g) were added over 10 minutes while the reaction mixture was cooled to 60° C. over an additional 15 minutes. The reaction was cooled to 25° C. over an additional 20 minutes to afford a final viscosity of about 612 cP and a % caustic of about 6.10.

Synthesis of Resin 4 (2.25 F/P mole ratio, 43% total solids, 4% urea, and 6% resin alkalinity). Phenol (1,183.3 g), 50% aqueous formaldehyde solution (604.2 g), and water (895.3 g) were added to a 1.25 gal reactor equipped with a mechanical stirrer, cooling coils, a thermocouple, a heating mantle, and a reflux condenser. The contents of the reactor was stirred and the temperature was adjusted to about 50° C. A 50% aqueous NaOH solution (200 g) was added evenly over 25 minutes while the reaction temperature was allowed to increase to a temperature of about 68° C. An additional amount of the 50% aqueous formaldehyde solution (1,095 g) was added evenly over 45 minutes while the temperature was allowed to exotherm to about 95° C. After the additional 50% aqueous formaldehyde solution was added to the reactor, the reaction was held at a temperature of about 95° C. until a Gardner-Holdt viscosity of "E" was reached and was then cooled to a temperature of about 85° C. over 10 minutes. An additional amount of the 50% aqueous NaOH solution (200 g) was added over 5 minutes. At this point, urea prill (200.0 g) and water (200.0 g) were added over 10 minutes. The reaction was stirred at a temperature of about 85° C. until a Gardner-Holdt viscosity of "TU" was reached. An additional amount of the 50% aqueous NaOH solution (200.0 g) was added and the reaction was stirred until a Gardner-Holdt viscosity of "WX" was reached. At this point, water (222.3 g) was added over 5 minutes while the reaction mixture was cooled to 60° C. over an additional 15 minutes. The reaction was cooled to 25° C. over an additional 20 minutes to afford a final viscosity of about 623 cP and a % caustic of about 6.08.

Synthesis of Resin 5 (2.25 F/P mole ratio, 43% total solids, 4% urea, and 6% resin alkalinity). Phenol (1,183.3 g), a 50% aqueous formaldehyde solution (604.2 g), and water (1,117.6 g) was added to a 1.25 gal reactor equipped with a mechanical stirrer, cooling coils, a thermocouple, a heating mantle, and a reflux condenser. The contents of the reactor was stirred and the temperature was adjusted to 50° C. A 50% aqueous NaOH solution (200.0 g) was added evenly over 25 minutes while the reaction temperature was allowed to increase to a temperature of about 68° C. An additional amount of the 50% aqueous formaldehyde solution (1,095 g) was added evenly over 45 minutes while the temperature was allowed to exotherm to 95° C. After the additional 50% aqueous formaldehyde solution was added to the reactor, the reaction was held at a temperature of about 95° C. until a Gardner-Holdt viscosity of "C" was reached and then cooled to 85° C. over 10 minutes. An additional amount of the 50% aqueous NaOH solution (200.0 g) was added over 5 minutes.

The reaction was stirred at a temperature of about 85° C. until a Gardner-Holdt viscosity of "UV" was reached. An additional amount of the 50% aqueous NaOH solution (200.0 g) was added and the reaction stirred until a Gardner-Holdt viscosity of "YZ" was reached. At this point, urea prill (200.0 g) and water (200.0 g) were added over 5 minutes while the reaction mixture was cooled to 60° C. over an additional 15 minutes. The reaction was cooled to 25° C. over an additional 20 minutes to afford a final viscosity of about 622 cP and a % caustic of about 6.06.

The binders in Exs. 53-59 and CExs. 12-18 were then prepared according to the steps outlined in Tables 16 and 17.

TABLE 16

| Action | ING | CEx. 12 Amount (g) | CEx. 13 Amount (g) | Ex. 53 Amount (g) | Ex. 54 Amount (g) | CEx. 14 Amount (g) | CEx. 15 Amount (g) | Ex. 55 Amount (g) |
|---|---|---|---|---|---|---|---|---|
| Add | Resin | 400 of Resin 1 | 400 of Resin 1 | 600 of Resin 2 | 600 of Resin 2 | 250 of Resin 1 | 250 of Resin 1 | 500 of Resin 2 |
| Add | Wheat Flour | 52 | 52 | 52 | 52 | 28.7 | 28.7 | 28.7 |
| Mix (min) | | 5 | 5 | 10 | 10 | 5 | 5 | 5 |
| Add | Water | 108.8 | 112 | 0 | 0 | 29.1 | 32.5 | 29.1 |
| Mix (min) | | 2 | 2 | 0 | 0 | 2 | 2 | 2 |
| Add | Corn-Cob | 64.3 | 64.3 | 64.3 | 64.3 | 35.7 | 35.6 | 35.7 |
| Mix (min) | | 3 | 3 | 6 | 3 | 3 | 3 | 3 |
| Add | 50% NaOH | 34 | 34 | 10 | 10 | 26 | 26 | 16 |
| Mix (min) | | 10 | 15 | 2 | 3 | 15 | 15 | 10 |
| Add | Resin | 320.9 of Resin 1 | 297.7 of Resin 1 | 120.9 of Resin 2 | 97.7 of Resin 2 | 860.5 of Resin 1 | 587.2 of Resin 1 | 360.5 of Resin 2 |
| Mix (min) Stop Agitator | | 3 | 3 | 2 | 2 | 3 | 3 | 3 |
| Add | 50% NaOH | 0 | 0 | 24 | 24 | 0 | 0 | 10 |
| Add | Water | 10 | 20 | 118.8 | 132 | 10 | 20 | 10 |
| Add | pMDI | 10 | 20 | 10 | 20 | 10 | 20 | 10 |
| Mix (min) | | 0.5 | 0.5 | 0.5 | 0.5 | 0.5 | 0.5 | 0.5 |

TABLE 17

| Action | ING | Ex. 56 Amount (g) | Ex. 57 Amount (g) | Ex. 58 Amount (g) | Ex. 59 Amount (g) | CEx. 16 Amount (g) | CEx. 17 Amount (g) | CEx. 18 Amount (g) |
|---|---|---|---|---|---|---|---|---|
| Add | Resin | 500 of Resin 2 | 400 of Resin 3 | 400 of Resin 4 | 400 of Resin 5 | 400 of Resin 1 | 400 of Resin 1 | 250 of Resin 1 |
| Add | Wheat Flour | 28.7 | 40.5 | 40.5 | 40.5 | 52.0 | 40.5 | 28.7 |
| Mix (min) | | 5 | 5 | 5 | 5 | 5 | 5 | 5 |
| Add | Water | 32.4 | 70.6 | 70.6 | 70.6 | 105.5 | 65.7 | 25.9 |
| Mix (min) | | 2 | 2 | 2 | 2 | 2 | 2 | 2 |
| Add | Co-Cob | 35.7 | 49.9 | 49.9 | 49.9 | 64.3 | 49.9 | 35.7 |
| Mix (min) | | 3 | 3 | 3 | 3 | 3 | 3 | 3 |
| Add | 50% NaOH | 16.0 | 30.0 | 30.0 | 30.0 | 34.0 | 30.0 | 26.0 |
| Mix (min) | | 10 | 15 | 15 | 15 | 15 | 15 | 15 |
| Add | Resin | 337.2 of Resin 2 | 379.1 of Resin 3 | 379.1 of Resin 4 | 379.1 of Resin 5 | 344.2 of Resin 1 | 414 of Resin 1 | 633.7 of Resin 1 |
| Mix (min) Stop Agitator | | 3 | 3 | 3 | 3 | 3 | 3 | 3 |
| Add | 50% NaOH | 10.0 | 0.0 | 0.0 | 0.0 | 0.0 | 0.0 | 0.0 |

TABLE 17-continued

| Action | ING | Ex. 56 Amount (g) | Ex. 57 Amount (g) | Ex. 58 Amount (g) | Ex. 59 Amount (g) | CEx. 16 Amount (g) | CEx. 17 Amount (g) | CEx. 18 Amount (g) |
|---|---|---|---|---|---|---|---|---|
| Add | Water | 20.0 | 15.0 | 15.0 | 15.0 | 0.0 | 0.0 | 0.0 |
| Add | pMDI | 20.0 | 15.0 | 15.0 | 15.0 | 0.0 | 0.0 | 0.0 |
| Mix (min) | | 0.5 | 0.5 | 0.5 | 0.5 | 0.0 | 0.0 | 0.0 |

Table 18 summarizes the urea content and solids properties of Exs. 53-59 and CExs. 12-18. The "Resin % Urea" indicates the total concentration of urea. The term "CI" refers to the urea being at least partially "cooked in" to the resin by being reacted into the phenol-formaldehyde resin. More particularly, without wishing to be bound by theory, it is believed that when the urea was cooked in that the resin formed was a phenol-urea-formaldehyde resin. More particularly, it is believed that when the urea is cooked in that at least a portion of the urea formed a covalent bond with a carbon atom derived from the formaldehyde during synthesis of the resin. However, without wishing to be bound by theory, it is also believed that at least some of the urea could be decomposed under the reaction conditions to form ammonia that could also react with the phenol-formaldehyde oligomers to form benzylic amine linkages. Either scenario leads to greater molecular weight urea- or amino-modified phenol-formaldehyde resins.

The term "BA" refers to the urea having been "back added" such that the urea is initially "free" urea in the phenol-formaldehyde resin. In some embodiments, over time, at least a portion of the free urea can react with at least a portion of any residual free formaldehyde to produce methylol ureas, such as mono-methylol urea, di-methylol urea, or tri-methylol urea, or a mixture thereof.

As noted above, the term "% Total Mix Solids" is the sum of all solids in the resin. As such, as an example, Resin 1 that included 44% Total Mix Solids contained 56 wt % of water. As noted above, the Total MRS refers to the total amount of solids contributed only by the pMDI resin and either the phenol-formaldehyde resin or the urea-modified phenol-formaldehyde resin, i.e., all of the phenol, formaldehyde, urea (if used), and base compound used to make the phenol-formaldehyde or urea-modified phenol-formaldehyde resin. As shown, in Table 18 below, the phenol-formaldehyde resin and the urea-modified phenol-formaldehyde resin each had a Total MRS that ranged from 32 to 38 and the pMDI MRS ranged from 0 to 2.

In looking at Table 18, it can be seen that the binders in CExs. 12-18 all included Resin 1, which did not contain any urea. It can also be seen that CExs. 16-18 did not include any isocyanate-based resin and can be considered as "control" binders as opposed to comparative binders. It can also be seen that the binders in Exs. 53-59 each included one of Resins 2-5 that did contain urea and pMDI.

TABLE 18

Urea and Solids Properties

| Example | Base Resin | Resin % Urea | % Total Mix Solids | Total MRS | pMDI MRS | PF MRS |
|---|---|---|---|---|---|---|
| CEx. 12 | Resin 1 | 0 | 44.0 | 32 | 1 | 31 |
| CEx. 13 | Resin 1 | 0 | 44.0 | 32 | 2 | 30 |
| Ex. 53 | Resin 2 | 8 (4% CI/4% BA) | 44.0 | 32 | 1 | 31 |

TABLE 18-continued

Urea and Solids Properties

| Example | Base Resin | Resin % Urea | % Total Mix Solids | Total MRS | pMDI MRS | PF MRS |
|---|---|---|---|---|---|---|
| Ex. 54 | Resin 2 | 8 (4% CI/4% BA) | 44.0 | 32 | 2 | 30 |
| CEx. 14 | Resin 1 | 0 | 45.0 | 38 | 1 | 37 |
| CEx. 15 | Resin 1 | 0 | 45.0 | 38 | 2 | 36 |
| Ex. 55 | Resin 2 | 8 (4% CI/4% BA) | 45.0 | 38 | 1 | 37 |
| Ex. 56 | Resin 2 | 8 (4% CI/4% BA) | 45.0 | 38 | 2 | 36 |
| Ex. 57 | Resin 3 | 4 (2% CI/2% BA) | 44.5 | 35 | 1.5 | 33.5 |
| Ex. 58 | Resin 4 | 4 (CI) | 44.5 | 35 | 1.5 | 33.5 |
| Ex. 59 | Resin 5 | 4 (BA) | 44.5 | 35 | 1.5 | 33.5 |
| CEx. 16 | Resin 1 | 0 | 44.0 | 32 | 0 | 32 |
| CEx. 17 | Resin 1 | 0 | 44.5 | 35 | 0 | 35 |
| CEx. 18 | Resin 1 | 0 | 45.0 | 38 | 0 | 38 |

The viscosity stability of the binders in Exs. 53-59 and CExs. 12-18 were measured over time. The viscosity was measured and recorded at a temperature of 25° C. on the referenced days for each respective example, as listed in Tables 19 and 20, starting immediately after the binder was formed (Day 0). Accordingly, the viscosity values on Day 1 were measured 24 hours after the binder was formed, the viscosity values on Day 2 were measured 48 hours after the binder was formed, and so on with each subsequent day adding another 24 hours of time.

The viscosity of the binders in Exs. 53-59 and CExs 12-18 were determined at a temperature of about 25° C. using a Model DV-II+ viscometer, commercially available from Brookfield Company, Inc., with a number 3 spindle. The binders in Exs. 53-59 and CExs. 12-18 were maintained in at water bath at a temperature of about 25° C., during the days after the binders were formed and the viscosity was periodically measured and are shown in Tables 19 and 20 below. The binders were periodically stirred when stored to reduce or prevent phase separation of the respective binder.

TABLE 19

Viscosity (cP) Over Time

| Elapsed Time (days) | CEx. 12 | CEx. 13 | Ex. 53 | Ex. 54 | CEx. 14 | CEx. 15 | Ex. 55 |
|---|---|---|---|---|---|---|---|
| 0 | 865 | 785 | — | — | — | — | — |
| 1 | 1235 | 910 | 6580 | 8660 | 1570 | 1750 | 1770 |
| 2 | 1455 | 1210 | — | — | 1560 | 1715 | 1935 |
| 3 | 1550 | 1320 | — | — | — | — | 2010 |
| 4 | 1910 | 1315 | 6180 | 8060 | — | — | — |
| 5 | — | — | 6100 | 7104 | 1730 | 1945 | — |
| 6 | — | — | 6029 | 6899 | 1434 | 1690 | 2480 |
| 7 | 1870 | 1495 | — | — | 1472 | 1536 | 3034 |
| 8 | 1306 | 1242 | 5069 | 7590 | — | — | 2573 |
| 9 | 1229 | 1306 | — | — | 1472 | 1920 | — |
| 10 | — | — | — | — | — | — | 3110 |

TABLE 19-continued

Viscosity (cP) Over Time

| Elapsed Time (days) | CEx. 12 | CEx. 13 | Ex. 53 | Ex. 54 | CEx. 14 | CEx. 15 | Ex. 55 |
|---|---|---|---|---|---|---|---|
| 11 | 1434 | 1344 | 5773 | 9434 | — | — | — |
| 12 | — | — | 5850 | 9984 | 1760 | 2406 | — |
| 13 | — | — | 6144 | 10290 | 1907 | 2714 | 3780 |
| 14 | 1715 | 1626 | — | — | 2022 | 2931 | 4032 |
| 15 | 1779 | 1690 | — | — | — | — | 4544 |
| 16 | 1869 | 1779 | — | — | — | — | — |
| 17 | — | — | — | — | — | — | — |
| 18 | — | — | 7770 | 17540 | — | — | — |
| 19 | — | — | — | — | 2842 | 4851 | — |
| 20 | — | — | 8320 | 21300 | — | — | 5030 |
| 21 | 2470 | 2394 | 8525 | 22300 | 2554 | 5888 | — |
| 22 | — | — | 8845 | 28860 | — | — | 5568 |
| 23 | 2586 | 2458 | — | — | 3571 | 7091 | 5837 |

TABLE 20

Viscosity (cP) Over Time of Binders 8-14

| Elapsed Time (days) | Ex. 56 | Ex. 57 | Ex. 58 | Ex. 59 | CEx. 16 | CEx. 17 | CEx. 18 |
|---|---|---|---|---|---|---|---|
| 0 | — | — | — | — | — | — | — |
| 1 | 1710 | 1390 | 1017 | 1025 | 1055 | 785 | 1940 |
| 2 | 1930 | 1400 | 1230 | 1250 | 1270 | 930 | 1920 |
| 3 | 1995 | 1420 | 1275 | 1235 | 1255 | 940 | — |
| 4 | — | 1395 | 1270 | 1160 | 1235 | 950 | — |
| 5 | — | — | — | — | — | — | 2130 |
| 6 | 2435 | — | — | — | — | — | 1741 |
| 7 | 2995 | 1660 | 1500 | 1630 | 1400 | 1040 | 1715 |
| 8 | 2790 | 1715 | 1626 | 1280 | 1229 | 1075 | — |
| 9 | — | 1600 | 1331 | 1254 | 1242 | 1075 | 1754 |
| 10 | 3418 | — | — | — | — | — | — |
| 11 | — | 1754 | 1600 | 1331 | 1254 | 1114 | — |
| 12 | — | — | — | — | — | — | 1818 |
| 13 | 4134 | — | — | — | — | — | 1907 |
| 14 | 4352 | 1946 | 1779 | 1434 | 1267 | 1139 | 1971 |
| 15 | 4762 | 1958 | 1882 | 1485 | 1318 | 1165 | — |
| 16 | — | 2086 | 1958 | 1536 | 1357 | 1190 | — |
| 17 | — | — | — | — | — | — | — |
| 18 | — | — | — | — | — | — | — |
| 19 | — | — | — | — | — | — | 2355 |
| 20 | 6746 | — | — | — | — | — | — |
| 21 | — | 2547 | 2496 | 1818 | 1549 | 1344 | 2509 |
| 22 | 8640 | — | — | — | — | — | — |
| 23 | 8819 | 2790 | 2675 | 2010 | 1626 | 1472 | 2586 |

As can be seen in Tables 19 and 20, the binders of Exs. 53 and 55-59 each maintained a viscosity of less than 10,000 cP for the 23 days the viscosities were measured. As can also be seen, the binder of Ex. 54 maintained a viscosity of less than 10,000 cP for 12 days. Structural composite lumber can be manufactured with the inventive binders of Examples 53-59.

Embodiments of the present disclosure further relate to any one or more of the following paragraphs:

1. A binder for making composite lignocellulose products, comprising: about 70 wt % to about 99.7 wt % of at least one aldehyde-based resin; about 0.3 wt % to about 30 wt % of at least one isocyanate-based resin; about 10 wt % to about 63 wt % of at least one extender; and about 145 wt % to about 230 wt % of water, wherein all weight percent values are based on a combined solids weight of the aldehyde-based resin and the isocyanate-based resin, and wherein the binder has a viscosity of about 200 cP to about 3,500 cP at a temperature of about 25° C. for at least the first 12 hours after formation of the binder.

2. A method for making a composite product, comprising: combining a plurality of lignocellulose substrates and a binder to produce a resinated furnish, wherein the binder comprises about 70 wt % to about 99.7 wt % of at least one aldehyde-based resin; about 0.3 wt % to about 30 wt % of at least one isocyanate-based resin; about 10 wt % to about 63 wt % of at least one extender; and about 145 wt % to about 230 wt % of water, wherein all weight percent values are based on a combined solids weight of the aldehyde-based resin and the isocyanate-based resin; and heating the resinated furnish to a temperature of about 60° C. to about 300° C. to at least partially cure the binder to produce a composite lignocellulose product, wherein each of the plurality of lignocellulose substrates has a moisture content of at least 10 wt % to about 40 wt %, based on a dry weight of the plurality of lignocellulose substrates, when the resinated furnish is heated to the temperature of about 60° C. or greater.

3. A resinated furnish, comprising: a plurality of lignocellulose substrates and a binder, wherein each of the plurality of lignocellulose substrates has a water content of 10 wt % to about 40 wt %, based on a dried weight of the plurality of lignocellulose substrates, wherein the binder comprises about 70 wt % to about 99.7 wt % of at least one aldehyde-based resin; about 0.3 wt % to about 30 wt % of at least one isocyanate-based resin; about 10 wt % to about 63 wt % of at least one extender; and about 145 wt % to about 230 wt % of water, wherein all weight percent values are based on a combined solids weight of the aldehyde-based resin and the isocyanate-based resin, and wherein the binder has a viscosity of about 200 cP to about 3,500 cP at a temperature of about 25° C. for at least the first 12 hours after formation of the binder.

4. The binder, the method, or the resinated furnish according to any one of paragraphs 1 to 3, wherein the binder comprises about 71 wt % to about 99.7 wt % of the aldehyde-based resin; about 0.3 wt % to about 29 wt % of the isocyanate-based resin; about 10 wt % to about 63 wt % of the extender; and about 145 wt % to about 230 wt % of the water, wherein all weight percent values are based on the combined solids weight of the aldehyde-based resin and the isocyanate-based resin.

5. The binder, the method, or the resinated furnish according to any one of paragraphs 1 to 4, wherein the binder comprises about 79 wt % to about 98.5 wt % of the aldehyde-based resin; about 1.5 wt % to about 21 wt % of the isocyanate-based resin; about 13.5 wt % to about 51 wt % of the extender; and about 159 wt % to about 207 wt % of the water, wherein all weight percent values are based on the combined solids weight of the aldehyde-based resin and the isocyanate-based resin.

6. The binder, the method, or the resinated furnish according to any one of paragraphs 1 to 5, wherein the binder comprises about 85 wt % to about 97 wt % of the aldehyde-based resin; about 3 wt % to about 15 wt % of the isocyanate-based resin; about 14.5 wt % to about 26 wt % of the extender; and about 159 wt % to about 207 wt % of the water, wherein all weight percent values are based on the combined solids weight of the aldehyde-based resin and the isocyanate-based resin.

7. The binder, the method, or the resinated furnish according to any one of paragraphs 1 to 6, wherein the binder further comprises about 5.5 wt % to about 45 wt % of at least one filler, based on the combined solids weight of the aldehyde-based resin and the isocyanate-based resin.

8. The binder, the method, or the resinated furnish according to any one of paragraphs 1 to 6, wherein the binder further comprises about 8 wt % to about 37 wt % of at least one filler, based on the combined solids weight of the aldehyde-based resin and the isocyanate-based resin.

9. The binder, the method, or the resinated furnish according to any one of paragraphs 1 to 6, wherein the binder further comprises about 9 wt % to about 25 wt % of at least one filler, based on the combined solids weight of the aldehyde-based resin and the isocyanate-based resin.

10. The binder, the method, or the resinated furnish according to any one of paragraphs 1 to 6, wherein the binder further comprises about 10 wt % to about 19 wt % of at least one filler, based on the combined solids weight of the aldehyde-based resin and the isocyanate-based resin.

11. The binder, the method, or the resinated furnish according to any one of paragraphs 1 to 3, wherein the binder further comprises at least one filler, and wherein the binder comprises about 85.4 wt % to about 96.7 wt % of the aldehyde-based resin; about 3.3 wt % to about 14.6 wt % of the isocyanate-based resin; about 14.9 wt % to about 25.5 wt % of the extender; about 10.5 wt % to about 18.2 of the filler, and about 161.8 wt % to about 181.6 wt % of the water, wherein all weight percent values are based on the combined solids weight of the aldehyde-based resin and the isocyanate-based resin.

12. The binder, the method, or the resinated furnish according to any one of paragraphs 7 to 11, wherein the filler comprises nut shell media, corn media, furfural residues, seed shell media, fruit pit media, animal bones, milwhite, clays, glasses, inorganic oxides, wood flour, ground bark, or any mixture thereof.

13. The binder, the method, or the resinated furnish according to any one of paragraphs 7 to 11, wherein the filler comprises a nutshell flour, a fruit pit flour, or a mixture thereof.

14. The binder, the method, or the resinated furnish according to any one of paragraphs 7 to 11, wherein the filler comprises olive pit flour, walnut shell flour, or a mixture thereof.

15. The binder, the method, or the resinated furnish according to any one of paragraphs 1 to 14, wherein the extender comprises one or more flours, spray dried blood, or any mixture thereof.

16. The binder, the method, or the resinated furnish according to any one of paragraphs 1 to 15, wherein the extender comprises wheat flour, corn flour, or a mixture thereof.

17. The binder, the method, or the resinated furnish according to any one of paragraphs 1 to 16, wherein the aldehyde-based resin comprises a phenol-formaldehyde resin, a urea-formaldehyde resin, a melamine-formaldehyde resin, a melamine-urea-formaldehyde resin, a phenol-melamine-formaldehyde resin, a resorcinol-formaldehyde resin, a phenol-resorcinol-formaldehyde resin, or any mixture thereof.

18. The binder, the method, or the resinated furnish according to any one of paragraphs 1 to 17, wherein the isocyanate-based resin comprises polymeric methylene diphenyl diisocyanate.

19. The binder, the method, or the resinated furnish according to any one of paragraphs 1 to 18, wherein the aldehyde-based resin comprises a phenol-formaldehyde resin.

20. The binder, the method, or the resinated furnish according to any one of paragraphs 1 to 19, wherein the binder further comprises about 0.01 wt % to about 1 wt % of at least one surfactant, based on the combined solids weight of the aldehyde-based resin and the isocyanate-based resin.

21. The binder, the method, or the resinated furnish according to paragraph 20, wherein the surfactant comprises ethylene glycol, an acetylenic diol compound, or a mixture thereof.

22. The binder, the method, or the resinated furnish according to any one of paragraphs 1 to 21, wherein the binder has a free formaldehyde concentration of less than 0.2 wt %, based on the combined solids weight of the aldehyde-based resin and the isocyanate-based resin.

23. The binder, the method, or the resinated furnish according to any one of paragraphs 1 to 22, wherein the binder further comprises about 1 wt % to about 5 wt % of at least one hydroxide, based on the combined solids weight of the aldehyde-based resin and the isocyanate-based resin.

24. The binder, the method, or the resinated furnish according to paragraph 23, wherein the hydroxide comprises sodium hydroxide, potassium hydroxide, calcium hydroxide, lithium hydroxide, ammonium hydroxide, or any mixture thereof.

25. The binder, the method, or the resinated furnish according to any one of paragraphs 1 to 24, wherein the binder further comprises about 0.1 wt % to about 3 wt % of at least one carbonate, based on the combined solids weight of the aldehyde-based resin and the isocyanate-based resin.

26. The binder, the method, or the resinated furnish according to paragraph 25, wherein the carbonate comprises sodium carbonate, potassium carbonate, calcium carbonate, lithium carbonate, ammonium carbonate, or any mixture thereof.

27. The binder, the method, or the resinated furnish according to any one of paragraphs 1 to 26, wherein the binder has a pH of about 10.5 to about 13.0.

28. The binder, the method, or the resinated furnish according to any one of paragraphs 1 to 27, wherein the binder has a viscosity of about 200 cP to about 3,500 cP at a temperature of about 25° C. for at least 1 day to about 30 days after formation of the binder.

29. The binder, the method, or the resinated furnish according to any one of paragraphs 1 to 28, wherein the binder has a viscosity of about 300 cP to about 3,250 cP at a temperature of about 25° C. for at least 1 day to about 30 days after formation of the binder.

30. The binder, the method, or the resinated furnish according to any one of paragraphs 1 to 29, wherein the binder has a viscosity of about 400 cP to about 3,000 cP at a temperature of about 25° C. for about 2 days to about 30 days after formation of the binder.

31. The binder, the method, or the resinated furnish according to any one of paragraphs 1 to 27, wherein the binder has a viscosity of less than 3,500 cP for at least 1 day after formation of the binder.

32. The binder, the method, or the resinated furnish according to any one of paragraphs 1 to 27, wherein the binder has a viscosity of less than 3,500 cP for at least 3 days after formation of the binder.

33. The binder, the method, or the resinated furnish according to any one of paragraphs 1 to 27, wherein the binder has a viscosity of less than 3,500 cP for at least 5 days after formation of the binder.

34. The binder, the method, or the resinated furnish according to any one of paragraphs 1 to 27, wherein the binder has a viscosity of less than 3,500 cP for at least 8 days after formation of the binder.

35. The binder, the method, or the resinated furnish according to any one of paragraphs 1 to 27, wherein the binder has a viscosity of less than 3,500 cP for at least 12 days after formation of the binder.

36. The binder, the method, or the resinated furnish according to any one of paragraphs 1 to 27, wherein the binder has a viscosity of less than 3,500 cP for at least 15 days after formation of the binder.

37. The binder, the method, or the resinated furnish according to any one of paragraphs 1 to 27, wherein the binder has a viscosity of less than 3,500 cP for at least 18 days after formation of the binder.

38. The binder, the method, or the resinated furnish according to any one of paragraphs 1 to 27, wherein the binder has a viscosity of less than 3,500 cP for at least 20 days after formation of the binder.

39. The binder, the method, or the resinated furnish according to any one of paragraphs 1 to 27, wherein the binder has a viscosity of less than 3,500 cP for at least 23 days after formation of the binder.

40. The binder, the method, or the resinated furnish according to any one of paragraphs 1 to 27, wherein the binder has a viscosity of less than 3,500 cP for at least 25 days after formation of the binder.

41. The binder, the method, or the resinated furnish according to any one of paragraphs 1 to 27, wherein the binder has a viscosity of less than 3,500 cP for at least 27 days after formation of the binder.

42. The binder, the method, or the resinated furnish according to any one of paragraphs 1 to 27, wherein the binder has a viscosity of less than 3,500 cP for at least 30 days after formation of the binder.

43. The method or the resinated furnish according to any one of paragraphs 2 to 42, wherein each of the plurality of lignocellulose substrates has a water content of about 12 wt % to about 30 wt %, based on a dried weight of the lignocellulose substrates.

44. The method according to any one of paragraphs 2 and 4 to 42, wherein each of the plurality of lignocellulose substrates has a water content of about 12 wt % to about 30 wt %, based on a dried weight of the lignocellulose substrates when the resinated furnish is heated to the temperature of about 60° C. or greater.

45. The method or the resinated furnish according to any one of paragraphs 2 to 44, wherein the plurality of lignocellulose substrates comprise a core disposed between a first outer layer and a second outer layer; wherein a first amount of the binder is disposed between the core and the first outer layer, and wherein a second amount of the binder is disposed between the core and the second outer layer.

46. The method or the resinated furnish according to paragraph 45, wherein the core comprises a first veneer, the first outer layer comprises a second veneer, and the second outer layer comprises a third veneer.

47. A method for making a composite product, comprising: combining a plurality of lignocellulose substrates and a binder to produce a resinated furnish, wherein the plurality of lignocellulose substrates has a moisture content of at least 9 wt % to about 40 wt %, based on a dry weight of the plurality of lignocellulose substrates, and wherein the binder comprises about 70 wt % to about 99.7 wt % of an aldehyde-based resin; about 0.3 wt % to about 30 wt % of an isocyanate-based resin; about 10 wt % to about 63 wt % of an extender; and about 145 wt % to about 230 wt % of water, wherein the weight percent values of the aldehyde-based resin, the isocyanate-based resin, the extender, and the water are based on a combined solids weight of the aldehyde-based resin and the isocyanate-based resin; and heating the resinated furnish to a temperature of about 60° C. to about 300° C. to at least partially cure the binder to produce a composite lignocellulose product, wherein the moisture content of the plurality of lignocellulose substrates is at least 10 wt % to about 40 wt %, based on the dry weight of the plurality of lignocellulose substrates, when the resinated furnish is heated to the temperature of about 60° C. to about 300° C.

48. The method according to paragraph 47, wherein the moisture content of the plurality of lignocellulose substrates is about 12 wt % to about 40 wt %, based on the dry weight of the plurality of lignocellulose substrates, when the resinated furnish is heated to the temperature of about 60° C. to about 300° C.

49. The method according to paragraph 47 and 48, wherein the aldehyde-based resin comprises a phenol-formaldehyde resin, and wherein the isocyanate-based resin comprises polymeric methylene diphenyl diisocyanate.

50. The method according to any one of paragraphs 47 to 48, wherein the binder further comprises about 1 wt % to about 5 wt % of a hydroxide and about 0.1 wt % to about 3 wt % of a carbonate, based on the combined solids weight of the aldehyde-based resin and the isocyanate-based resin.

51. The method according to paragraph 50, wherein the hydroxide comprises sodium hydroxide, potassium hydroxide, calcium hydroxide, lithium hydroxide, ammonium hydroxide, or any mixture thereof.

52. The method according to any one of paragraphs 47 to 51, wherein the binder further comprises about 0.1 wt % to about 3 wt % of a carbonate, based on the combined solids weight of the aldehyde-based resin and the isocyanate-based resin.

53. The method according to paragraph 52, wherein the carbonate comprises sodium carbonate, potassium carbonate, calcium carbonate, lithium carbonate, ammonium carbonate, or any mixture thereof.

54. The method according to any one of paragraphs 47 to 53, wherein the extender comprises wheat flour, corn flour, or a mixture thereof.

55. The method according to any one of paragraphs 47 to 54, wherein the binder further comprises about 5.5 wt % to about 45 wt % of a filler, based on the combined solids weight of the aldehyde-based resin and the isocyanate-based resin.

56. The method according to any one of paragraphs 47 to 55, wherein the extender comprises wheat flour, corn flour, or a mixture thereof.

57. The method according to any one of paragraphs 47 to 56, wherein the aldehyde-based resin comprises a phenol-formaldehyde resin.

58. The method according to any one of paragraphs 47 to 57, wherein the isocyanate-based resin comprises polymeric methylene diphenyl diisocyanate.

59. The method according to any one of paragraphs 55 to 58, wherein the filler comprises a nutshell flour, olive pit flour, or a mixture thereof.

60. The method according to any one of paragraphs 55 to 59, wherein the binder comprises about 85 wt % to about 97 wt % of the aldehyde-based resin; about 3 wt % to about 15 wt % of the isocyanate-based resin; about 12 wt % to about 30 wt % of the extender; about 10 wt % to about 20 wt % of the filler, and about 150 wt % to about 190 wt % of water, wherein the weight percent values of the aldehyde-based resin, the isocyanate-based resin, the extender, the filler, and the water are based on a combined solids weight of the aldehyde-based resin and the isocyanate-based resin.

61. The method according to any one of paragraphs 47 to 60, wherein the aldehyde-based resin comprises a phenol-formaldehyde resin having a molar ratio of formaldehyde to phenol of about 2.1:1 to about 2.5:1.

62. The method according to any one of paragraphs 47 to 61, wherein isocyanate-based resin comprises polymeric methylene diphenyl diisocyanate.

63. The method according to any one of paragraphs 47 to 62, wherein extender comprises wheat flour, corn flour, or a mixture thereof.

64. The method according to any one of paragraphs 47 to 63, wherein the nutshell flour comprises walnut shell flour.

65. The method according to any one of paragraphs 47 to 64, wherein: the binder further comprises about 5.5 wt % to about 45 wt % of a filler, about 0.1 wt % to about 3 wt % of a carbonate, and about 0.1 wt % to about 2 wt % of a nonionic surfactant, wherein all weight percent values are based on a combined solids weight of the aldehyde-based resin and the isocyanate-based resin, the aldehyde-based resin comprises a phenol-formaldehyde resin having a molar ratio of formaldehyde to phenol of about 2.1:1 to about 2.5:1, the isocyanate-based resin comprises polymeric methylene diphenyl diisocyanate, the extender comprises wheat flour, corn flour, or a mixture thereof, the filler comprises olive pit flour, walnut shell flour, or a mixture thereof, the carbonate comprises sodium carbonate (e.g., soda ash), potassium carbonate, calcium carbonate.

66. The method according to any one of paragraphs 47 to 65, wherein the binder has a viscosity of about 200 cP to about 3,500 cP at a temperature of about 25° C. for at least 1 day to about 30 days after formation of the binder.

67. The method according to any one of paragraphs 47 to 65, wherein the binder has a viscosity of about 300 cP to about 3,250 cP at a temperature of about 25° C. for at least 1 day to about 30 days after formation of the binder.

68. The method according to any one of paragraphs 47 to 65, wherein the binder has a viscosity of about 400 cP to about 3,000 cP at a temperature of about 25° C. for about 2 days to about 30 days after formation of the binder.

69. The method according to any one of paragraphs 47 to 65, wherein the binder has a viscosity of less than 3,500 cP for at least 1 day after formation of the binder.

70. The method according to any one of paragraphs 47 to 65, wherein the binder has a viscosity of less than 3,500 cP for at least 3 days after formation of the binder.

71. The method according to any one of paragraphs 47 to 65, wherein the binder has a viscosity of less than 3,500 cP for at least 5 days after formation of the binder.

72. The method according to any one of paragraphs 47 to 65, wherein the binder has a viscosity of less than 3,500 cP for at least 8 days after formation of the binder.

73. The method according to any one of paragraphs 47 to 65, wherein the binder has a viscosity of less than 3,500 cP for at least 12 days after formation of the binder.

74. The method according to any one of paragraphs 47 to 65, wherein the binder has a viscosity of less than 3,500 cP for at least 15 days after formation of the binder.

75. The method according to any one of paragraphs 47 to 65, wherein the binder has a viscosity of less than 3,500 cP for at least 18 days after formation of the binder.

76. The method according to any one of paragraphs 47 to 65, wherein the binder has a viscosity of less than 3,500 cP for at least 20 days after formation of the binder.

77. The method according to any one of paragraphs 47 to 65, wherein the binder has a viscosity of less than 3,500 cP for at least 23 days after formation of the binder.

78. The method according to any one of paragraphs 47 to 65, wherein the binder has a viscosity of less than 3,500 cP for at least 25 days after formation of the binder.

79. The method according to any one of paragraphs 47 to 65, wherein the binder has a viscosity of less than 3,500 cP for at least 27 days after formation of the binder.

80. The method according to any one of paragraphs 47 to 65, wherein the binder has a viscosity of less than 3,500 cP for at least 30 days after formation of the binder.

81. The method according to any one of paragraphs 47 to 80, wherein the binder has a viscosity of about 200 cP to about 3,500 cP at a temperature of about 25° C. when combined with the plurality of lignocellulose substrates to produce the resinated furnish.

82. The method according to any one of paragraphs 47 to 81, wherein the binder is made at least the first 12 hours before the binder is combined with the plurality of lignocellulose substrates to produce the resinated furnish.

83. The method according to any one of paragraphs 47 to 80, wherein the binder has a viscosity of about 200 cP to about 3,500 cP at a temperature of about 25° C. when combined with the plurality of lignocellulose substrates to produce the resinated furnish, and wherein the binder is combined with the plurality of lignocellulose substrates at least 12 hours, at least 1 day, at least 2 days, or at least 3 days to about 10 days, about 15 days, about 20 days, or about 30 days after at least the aldehyde-based resin, the isocyanate-based resin, the extender, and the water are combined to produce the binder.

84. The binder, the method, or the resinated furnish according to any one of paragraphs 1 to 83, wherein the aldehyde-based resin is not protected or blocked.

85. The binder, the method, or the resinated furnish according to any one of paragraphs 1 to 84, wherein the isocyanate-based resin is not protected or blocked.

86. The binder, the method, or the resinated furnish according to any one of paragraphs 1 to 83, wherein the aldehyde-based resin is at least substantially free of any intentional chemical modification intended to protect or block functional groups thereof.

87. The binder, the method, or the resinated furnish according to any one of paragraphs 1 to 83 and 86, wherein the isocyanate-based resin is at least substantially free of any intentional chemical modification intended to protect or block functional groups thereof.

88. The binder, the method, or the resinated furnish according to any one of paragraphs 1 to 83, wherein the aldehyde-based resin is substantially free of any protected groups that can be deprotected under reactive conditions.

89. The binder, the method, or the resinated furnish according to any one of paragraphs 1 to 83 and 88, wherein the isocyanate-based resin is substantially free of any protected groups that can be deprotected under reactive conditions.

90. A binder for making composite lignocellulose products, comprising: about 30 wt % to about 40 wt % of solids comprising a urea-modified aldehyde-based resin; about 0.1 wt % to about 3 wt % of solids comprising an isocyanate-based resin; about 0.1 wt % to about 12 wt % of an extender; and about 50 wt % to about 62 wt % of a liquid medium, wherein all weight percent values are based on a total weight of the binder, and wherein the binder has a sodium hydroxide equivalent weight alkalinity of about 3 wt % to about 9 wt %.

91. A method for making a composite product, comprising: combining a plurality of lignocellulose substrates and a binder to produce a resinated furnish, wherein the binder comprises: about 30 wt % to about 40 wt % of solids comprising a urea-modified aldehyde-based resin; about 0.1 wt % to about 3 wt % of solids comprising an isocyanate-based resin; about 0.1 wt % to about 12 wt % of an extender; and about 50 wt % to about 62 wt % of a liquid medium, wherein all weight percent values are based on a total weight of the binder, and wherein the binder has a sodium hydroxide equivalent weight alkalinity of about 3 wt % to about 9 wt %; and heating the resinated furnish to a temperature of about 60° C. to about 300° C. to at least partially cure the binder to produce a composite lignocellulose product.

92. A method for making a binder, comprising: contacting solids comprising a urea-modified aldehyde-based resin, an isocyanate-based resin, an extender, and a liquid medium to produce the binder, wherein the binder comprises: about 30 wt % to about 40 wt % of solids comprising the urea-modified aldehyde-based resin; about 0.1 wt % to about 3 wt % of solids comprising the isocyanate-based resin; about 0.1 wt % to about 12 wt % of the extender; and about 50 wt % to about 62 wt % of the liquid medium, wherein all weight percent values are based on a total weight of the binder, and wherein the binder has a sodium hydroxide equivalent weight alkalinity of about 3 wt % to about 9 wt %.

93. The binder or method according to any one of paragraphs 90 to 92, wherein the binder comprises about 0.1 wt % to about 9.5 wt % of free urea, mono-methylol urea, di-methylol urea, tri-methylol urea, urea reacted into the aldehyde-based resin, or a mixture thereof, based on the total weight of the binder.

94. The binder or method according to any one of paragraphs 90 to 93, wherein at least a portion of urea in the urea-modified aldehyde-based resin is in the form of free urea, mono-methylol urea, di-methylol urea, or tri-methylol urea, or a mixture thereof.

95. The binder or method according to any one of paragraphs 90 to 94, wherein at least a portion of the urea in the urea-modified aldehyde-based resin is covalently bonded with a carbon atom derived from the aldehyde during synthesis of the urea-modified aldehyde-based resin.

96. The binder or method according to any one of paragraphs 90 to 95, wherein the urea-modified aldehyde-based resin comprises a urea-modified phenol-formaldehyde resin, a urea-modified melamine-formaldehyde resin, a urea-modified phenol-melamine-formaldehyde resin, a urea-modified resorcinol-formaldehyde resin, a urea-modified phenol-resorcinol-formaldehyde resin, or any mixture thereof.

97. The binder or method according to any one of paragraphs 90 to 96, wherein the urea-modified aldehyde-based resin comprises a urea-modified phenol-formaldehyde resin having a formaldehyde to phenol molar ratio of about 1.8:1 to about 2.6:1, and wherein the binder comprises: about 32 wt % to about 38 wt % of the solids comprising the urea-modified aldehyde-based resin, about 1 wt % to about 2 wt % of the solids comprising the isocyanate-based resin, about 2.9 wt % to about 5.2 wt % of the extender, and about 53 wt % to about 58 wt % of the liquid medium, wherein all weight percent values are based on the total weight of the binder, and wherein the sodium hydroxide equivalent weight alkalinity of the binder is about 4.5 wt % to about 7.5 wt %.

98. The binder or method according to any one of paragraphs 90 to 97, wherein at least a portion of urea in the urea-modified phenol-aldehyde resin is covalently bonded with a carbon atom derived from the aldehyde during synthesis of the urea-modified aldehyde-based resin and wherein at least a portion of urea in the urea-modified phenol-aldehyde resin is: (i) in the form of free urea, (ii) in the form of mono-methylol urea, (iii) in the form of di-methylol urea, (iv) in the form of tri-methylol urea, or (v) a mixture thereof.

99. The binder or method according to any one of paragraphs 90 to 98, wherein the binder comprises sodium hydroxide, potassium hydroxide, lithium hydroxide, sodium carbonate, potassium carbonate, calcium carbonate, sodium borate, potassium borate, calcium borate, and zinc borate, or a mixture thereof.

100. The binder or method according to any one of paragraphs 90 to 99, wherein the binder has a viscosity of ≤8,500 cP when maintained at a temperature of about 25° C. for at least 8 days after formation of the binder.

101. The binder or method according to any one of paragraphs 90 to 100, wherein the binder has a pH of about 11.5 to about 12.5.

102. The binder or method according to any one of paragraphs 90 to 101, wherein the extender comprises wheat flour, corn flour, or a mixture thereof, a 103. The binder or method according to any one of paragraphs 90 to 102, wherein the binder further comprises about 0.1 wt % to about 12 wt % of a filler, based on the total weight of the binder.

104. The binder or method according to paragraph 103, wherein the filler comprises corn cob residue, a nutshell flour, a fruit pit flour, or a mixture thereof.

105. The binder or method according to any one of paragraphs 90 to 104, wherein the sodium hydroxide equivalent weight alkalinity of the binder is about 5.5% to about 7%.

106. The binder or method according to any one of paragraphs 90 to 105, wherein the binder further comprises about 0.01 wt % to about 0.5 wt % of a surfactant, based on the total weight of the binder.

107. The binder or method according to any one of paragraphs 90 to 106, wherein the binder further comprises a salt.

108. The binder or method according to paragraph 107, wherein the binder comprises about 0.05 wt % to about 3.5 wt % of the salt, based on the total weight of the binder.

109. The binder or method of paragraph 107 or 108, wherein the salt comprises sodium chloride, potassium chloride, calcium chloride, sodium sulfate, potassium sulfate, calcium sulfate, magnesium sulfate, or a mixture thereof.

110. The binder or method according to any of paragraphs 90 to 109, further comprising about 0.1 wt % to about 12 wt % of a filler, based on the total weight of the binder, wherein: the urea-modified aldehyde-based resin comprises a urea-modified phenol-formaldehyde resin having a formaldehyde to phenol molar ratio of about 1.8:1 to about 2.6:1, at least a portion of urea in the urea-modified phenol-formaldehyde resin is: (i) covalently bonded with a carbon atom derived from the aldehyde during synthesis of the urea-modified aldehyde-based resin, (ii) in the form of mono-methylol urea, (iii) in the form of di-methylol urea, (iv) in the form of tri-methylol urea, or (v) a mixture thereof.

111. The binder or method according to any of paragraphs 90 to 110, wherein the urea-modified aldehyde-based resin comprises a phenol-urea-formaldehyde resin having a formaldehyde to phenol molar ratio of about 1.2:1 to about 4:1.

112. The binder or method according to any of paragraphs 90 to 111, wherein the urea-modified aldehyde-based resin comprises a phenol-urea-formaldehyde resin having a formaldehyde to urea molar ratio of about 3.7:1 to about 150:1.

113. The binder or method according to any of paragraphs 90 to 112, wherein the urea-modified aldehyde-based resin comprises a phenol-urea-formaldehyde resin having a phenol to urea molar ratio of about 1.5:1 to about 163.4:1.

114. The binder or method according to any of paragraphs 90 to 113, wherein the liquid medium comprises water, an alcohol, an ether, or a mixture thereof.

115. The binder or method according to any of paragraphs 90 to 114, wherein the liquid medium comprises water.

116. The binder or method according to any of paragraphs 90 to 115, wherein the urea-modified aldehyde-based resin comprises a urea-modified phenol-formaldehyde resin, and wherein during synthesis of the urea-modified phenol-formaldehyde resin at least a portion of the urea decomposes to produce ammonia, and wherein at least a portion of the ammonia reacts with phenol-formaldehyde oligomers to form benzylic amine linkages.

117. The binder or method according to any of paragraphs 90 to 116, wherein the isocyanate-based resin comprises polymeric methylene diphenyl diisocyanate.

118. The method according to any of paragraphs 91 or 93 to 117, wherein the composite lignocellulose product comprises structural composite lumber.

119. The method according to paragraph 118, wherein the structural composite lumber comprises laminated veneer lumber, parallel strand lumber, laminated strand lumber, or oriented strand lumber.

120. The method according to paragraph 118 or 119, wherein the structural composite lumber satisfies the properties as measured according to ASTM D5456-19.

121. The method according to any of paragraphs 91 or 93 to 120, wherein the plurality of lignocellulose substrates comprises at least 10 wt %, at least 12 wt %, at least 14 wt %, at least 16 wt %, at least 18 wt %, at least 20 wt %, or at least 22 wt % to about 30 wt %, about 35 wt %, or about 40 wt % of water, based on a dry weight of the plurality of lignocellulose substrates.

Certain embodiments and features have been described using a set of numerical upper limits and a set of numerical lower limits. It should be appreciated that ranges including the combination of any two values, e.g., the combination of any lower value with any upper value, the combination of any two lower values, and/or the combination of any two upper values are contemplated unless otherwise indicated. Certain lower limits, upper limits and ranges appear in one or more claims below. All numerical values are "about" or "approximately" the indicated value, and take into account experimental error and variations that would be expected by a person having ordinary skill in the art.

Various terms have been defined above. To the extent a term used in a claim is not defined above, it should be given the broadest definition persons in the pertinent art have given that term as reflected in at least one printed publication or issued patent. Furthermore, all patents, test procedures, and other documents cited in this application are fully incorporated by reference to the extent such disclosure is not inconsistent with this application and for all jurisdictions in which such incorporation is permitted.

While the foregoing is directed to embodiments of the present invention, other and further embodiments of the invention may be devised without departing from the basic scope thereof, and the scope thereof is determined by the claims that follow.

What is claimed is:

1. A binder for making composite lignocellulose products, comprising:
    about 32 wt % to about 38 wt % of solids comprising a urea-modified aldehyde-based resin, wherein the urea-modified aldehyde-based resin comprises a urea-modified phenol-formaldehyde resin having a formaldehyde to phenol molar ratio of about 1.8:1 to about 2.6:1;
    about 1 wt % to about 2 wt % of solids comprising an isocyanate-based resin;
    about 2.9 wt % to about 5.2 wt % of an extender; and
    about 53 wt % to about 58 wt % of a liquid medium, wherein the binder comprises 4 wt % to about 9.5 wt % of free urea, mono-methylol urea, di-methylol urea, tri-methylol urea, urea covalently bonded with a carbon atom derived from an aldehyde during synthesis of the urea-modified aldehyde-based resin, or a mixture thereof, wherein all weight percent values are based on a total weight of the binder, wherein the binder has a sodium hydroxide equivalent weight alkalinity of about 4.5 wt % to about 7.5 wt %, and wherein the binder is free of a surfactant.

2. The binder of claim 1, wherein at least a portion of urea in the urea-modified aldehyde-based resin is in the form of free urea, mono-methylol urea, di-methylol urea, or tri-methylol urea, or a mixture thereof.

3. The binder of claim 1, wherein at least a portion of urea in the urea-modified aldehyde-based resin is covalently bonded with a carbon atom derived from an aldehyde during synthesis of the urea-modified aldehyde-based resin.

4. The binder of claim 1, wherein the urea-modified aldehyde-based resin further comprises a urea-modified melamine-formaldehyde resin, a urea-modified phenol-melamine-formaldehyde resin, a urea-modified resorcinol-formaldehyde resin, a urea-modified phenol-resorcinol-formaldehyde resin, or any mixture thereof.

5. The binder of claim 1, wherein the binder comprises sodium hydroxide, potassium hydroxide, lithium hydroxide, sodium carbonate, potassium carbonate, calcium carbonate, sodium borate, potassium borate, calcium borate, and zinc borate or a mixture thereof.

6. The binder of claim 1, wherein the binder has a viscosity of ≤8,500 cP when maintained at a temperature of about 25° C. for at least 8 days after formation of the binder.

7. The binder of claim 1, further comprising about 0.1 wt % to about 12 wt % of a filler, based on the total weight of the binder.

8. The binder of claim 7, wherein the extender comprises wheat flour, corn flour, or a mixture thereof, and wherein the filler comprises corn cob residue, a nutshell flour, a fruit pit flour, or a mixture thereof.

9. A binder for making composite lignocellulose products, comprising:
    about 32 wt % to about 38 wt % of solids comprising a urea-modified aldehyde-based resin, wherein the urea-modified aldehyde-based resin comprises a urea-modified phenol-formaldehyde resin having a formaldehyde to phenol molar ratio of about 1.8:1 to about 2.6:1;
    about 1 wt % to about 2 wt % of solids comprising an isocyanate-based resin;
    about 2.9 wt % to about 5.2 wt % of an extender;
    about 0.01 wt % to about 0.5 wt % of a surfactant, wherein the surfactant comprises an acetylenic diol compound, ethylene glycol, or a mixture thereof; and
    about 53 wt % to about 58 wt % of a liquid medium, wherein the binder comprises 4 wt % to about 9.5 wt % of free urea, mono-methylol urea, di-methylol urea, tri-methylol urea, urea covalently bonded with a carbon atom derived from an aldehyde during synthesis of the urea-modified aldehyde-based resin, or a mixture thereof, wherein all weight percent values are based on a total weight of the binder, and wherein the binder has a sodium hydroxide equivalent weight alkalinity of about 4.5 wt % to about 7.5 wt %.

10. The binder of claim 1, further comprising about 0.05 wt % to about 3.5 wt % of a salt, based on the total weight of the binder, and wherein the salt comprises sodium chloride, potassium chloride, calcium chloride, sodium sulfate, potassium sulfate, calcium sulfate, magnesium sulfate, or a mixture thereof.

11. The binder of claim 1, wherein the liquid medium comprises water.

12. The binder of claim 1, further comprising about 0.1 wt % to about 12 wt % of a filler, based on the total weight of the binder, wherein at least a portion of the urea in the urea-modified phenol-formaldehyde resin is covalently bonded with a carbon atom derived from an aldehyde during synthesis of the urea-modified aldehyde-based resin, and at least a portion of the urea in the urea-modified phenol-formaldehyde resin is in the form of mono-methylol urea, in the form of di-methylol urea, or in the form of tri-methylol urea.

13. The binder of claim 1, wherein:
- a first portion of urea in the urea-modified aldehyde-based resin is covalently bonded with a carbon atom derived from an aldehyde during synthesis of the urea-modified aldehyde-based resin by adding the first portion of urea as a reactant during the synthesis of the urea-modified aldehyde-based resin, and
- a second portion of urea in the urea-modified phenol-aldehyde resin is in the form of free urea added after the urea-modified aldehyde-based resin is synthesized.

14. The binder of claim 13, wherein:
- an amount of the first portion of urea added during the synthesis of the urea-modified aldehyde resin is at least 2 wt %, based on the total weight of the binder, and
- an amount of the second portion of urea added after the urea-modified aldehyde-based resin is synthesized is at least 2 wt %, based on the total weight of the binder.

15. The binder of claim 1, wherein the binder comprises 6 wt % to about 7.5 wt % of free urea, mono-methylol urea, di-methylol urea, tri-methylol urea, urea covalently bonded with a carbon atom derived from an aldehyde during synthesis of the urea-modified aldehyde-based resin, or a mixture thereof, based on the total weight of the binder.

16. A method for making a composite product, comprising:
- combining a plurality of lignocellulose substrates and a binder to produce a resinated furnish, wherein the binder comprises:
  - about 32 wt % to about 38 wt % of solids comprising a urea-modified aldehyde-based resin, wherein the urea-modified aldehyde-based resin comprises a urea-modified phenol-formaldehyde resin having a formaldehyde to phenol molar ratio of about 1.8:1 to about 2.6:1;
  - about 1 wt % to about 2 wt % of solids comprising an isocyanate-based resin;
  - about 2.9 wt % to about 5.2 wt % of an extender; and
  - about 53 wt % to about 58 wt % of a liquid medium, wherein the binder comprises 4 wt % to about 9.5 wt % of free urea, mono-methylol urea, di-methylol urea, tri-methylol urea, urea covalently bonded with a carbon atom derived from an aldehyde during synthesis of the urea-modified aldehyde-based resin, or a mixture thereof, wherein all weight percent values are based on a total weight of the binder, wherein the binder has a sodium hydroxide equivalent weight alkalinity of about 4.5 wt % to about 7.5 wt %, and wherein the binder is free of a surfactant; and
- heating the resinated furnish to a temperature of about 60° C. to about 300° C. to at least partially cure the binder to produce a composite lignocellulose product.

* * * * *